US009501157B2

(12) United States Patent
Soffer

(10) Patent No.: US 9,501,157 B2
(45) Date of Patent: Nov. 22, 2016

(54) SECURE KVM SYSTEM HAVING MULTIPLE EMULATED EDID FUNCTIONS

(75) Inventor: Aviv Soffer, Geva Carmel (IL)

(73) Assignee: HIGH SEC LABS LTD., Yokneam Industrial Zone (IL)

( * ) Notice: Subject to any disclaimer, the term of this patent is extended or adjusted under 35 U.S.C. 154(b) by 1136 days.

(21) Appl. No.: 13/509,193

(22) PCT Filed: Nov. 10, 2010

(86) PCT No.: PCT/IL2010/000930
§ 371 (c)(1),
(2), (4) Date: Oct. 1, 2012

(87) PCT Pub. No.: WO2011/058552
PCT Pub. Date: May 19, 2011

(65) Prior Publication Data
US 2013/0050084 A1 Feb. 28, 2013

Related U.S. Application Data

(60) Provisional application No. 61/259,692, filed on Nov. 10, 2009.

(51) Int. Cl.
*G06F 9/455* (2006.01)
*G06F 3/023* (2006.01)
(Continued)

(52) U.S. Cl.
CPC ............... *G06F 3/023* (2013.01); *G06F 3/14* (2013.01); *G06F 21/32* (2013.01); *G06F 21/34* (2013.01);
(Continued)

(58) Field of Classification Search
CPC ............ G06F 21/83; G06F 3/023; G06F 3/14; G06G 21/85; G09G 2370/047; G09G 2370/24
(Continued)

(56) References Cited

U.S. PATENT DOCUMENTS 7,502,878 B1 * 3/2009 Wright ................ G06F 13/4022
710/37
2005/0044266 A1 * 2/2005 O'Neil .................... G06F 3/038
709/238
(Continued)

FOREIGN PATENT DOCUMENTS

| CN | 1940828 A | 4/2007 |
|---|---|---|
| CN | 101324834 A | 12/2008 |
| GB | 2346465 A | 8/2000 |

(Continued)

OTHER PUBLICATIONS

APC User's Guide (KVM switch), 2003 (40 pages)).*

Primary Examiner — Kandasamy Thangavelu
Assistant Examiner — Andre Pierre Louis
(74) Attorney, Agent, or Firm — Browdy and Neimark, PLLC

(57) ABSTRACT

The present invention discloses a KVM (Keyboard Video Mouse) device for operation in high security environments. More specifically, this invention discloses a secure KVM built to prevent data leakages between two or more coupled computer hosts. The invention also discloses methods of operation of the secure KVM. Further more particularly, the invention presents a special secure KVM device for interacting with computers using a single user console, while preventing data leakage between the connected computers and attached networks.

19 Claims, 38 Drawing Sheets

(51) Int. Cl.
*G06F 3/14* (2006.01)
*G06F 21/83* (2013.01)
*G06F 21/85* (2013.01)
*G06F 21/32* (2013.01)
*G06F 21/34* (2013.01)

(52) U.S. Cl.
CPC ............... *G06F 21/83* (2013.01); *G06F 21/85* (2013.01); *G09G 2358/00* (2013.01); *G09G 2370/047* (2013.01); *G09G 2370/24* (2013.01)

(58) Field of Classification Search
USPC ............................................. 703/21, 22, 23
See application file for complete search history.

(56) References Cited

U.S. PATENT DOCUMENTS

| | | |
|---|---|---|
| 2006/0123182 A1 | 6/2006 | Sandulescu et al. |
| 2006/0280068 A1* | 12/2006 | Weirauch ............... G11B 19/04 369/47.1 |
| 2007/0070042 A1 | 3/2007 | Lin et al. |
| 2008/0309584 A1 | 12/2008 | Zhang |
| 2010/0100652 A1* | 4/2010 | Lin ........................ G06F 3/023 710/73 |

FOREIGN PATENT DOCUMENTS

WO    9918493 A1    4/1999

* cited by examiner

Figure 1 (art)

Figure 2 (art)

Figure 4 (art)

Figure 5 (art)

SECURE KVM SYSTEM HAVING MULTIPLE EMULATED EDID FUNCTIONS

FIELD OF THE INVENTION

The present invention is related generally to a KVM (Keyboard Video Mouse) device for operation in high security environments. More specifically, this invention relates to a secure KVM built to prevent data leakages between two or more coupled computer hosts. This invention also relates to the methods of operation of the same. Furthermore particularly, the invention presents a special secure KVM device for interacting with computers using a single user console, while preventing data leakage between the connected computers and attached networks.

BACKGROUND OF THE INVENTION

Computer networks in many organizations are continuously challenged by various security threats. The popularity of the internet and the availability of portable mass-storage devices introduce severe internal and external threats to most organizations. Defense and government organizations with higher security networks are forced to isolate their secure networks from other less secure networks thus creating a situation that a single organization or a single employee need to operate in several different isolated networks having different security levels. Isolation between these networks is a key concern as a small leakage of data between two networks may cause catastrophic results to the organization involved.

In the past several years many of the traditional and new isolation methods became ineffective and therefore today the physical separation between networks is growing in popularity among high security organizations. The concept of multiple highly isolated networks is gaining popularity in defense and government organizations. This concept requires either multiple user consoles or a KVM switch.

There are several disadvantages for equipping a user with multiple consoles:
  Desktop space required (especially for more than 2 networks and with multiple displays for each host)
  Cost of peripherals
  Security issues caused by user's confusion
  Lack of unified working environment—causing user inefficiencies and stress KVM offers an improvement compared to multiple user consoles approach. KVM enables a single set of user keyboard, mouse and display to be switched between isolated hosts. Commercial KVMs are common low-cost peripheral product available from many vendors for many years now. There are many information security risks in commercial KVMs and in the past few years these products are regarded as unsafe for high security networks.

The main information security risks in commercial KVMs are:
  Proper isolation between hosts cannot be guarantied—hosts may leak to other hosts attached to same KVMs
  Firmware may be tampered or replaced
  Product may be tampered or completely replaced
  Product may have buffers of keyboard strokes that may be used to create a leakage
  Display Plug and Play channel may be abused to cause data leakages
  USB ports may be used for unauthorized peripheral devices such as mass storage devices.

In general as commercial KVM were not designed to cope with secure networks and networks isolation they are assumed to be unsafe.

It should be noted that as networks become isolated, KVMs become a target for attacks. There are several reasons for that:
  KVMs are almost the only point in the IT system that isolated networks are getting close.
  There are large numbers of similar KVMs—larger opportunity to attack. Better chance for success.
  Products are readily available in the market and are easy to reverse engineer.
  KVMs may be easier attack target compared to firewalls or crypto equipment. Attacker will always prefer the weakest link to attack.
  Many organizations not fully understand the vulnerabilities of commercial KVMs.
  Once a KVM had been tampered or leaked—it would be very hard to detect it. Secret information may easily leak through the internet.

In the recent 10 years, a new class of KVMs appeared in the market—secure KVMs. These secure KVMs were designed specifically with network isolation in mind. Some of these products gained Common Criteria security accreditation to EAL-4 augmented.

Product appeared in the art, featured the following security functions compared to commercial KVMs:
  Always-active anti-tampering sub-system to detect potential enclosure intrusion and deactivate the device. Most anti-tampering systems are battery powered and use a single micro-switch as a sensor.
  Read only firmware residing on OTP (One Time Programming) or ROM (Read Only Memory).
  Buffer reset when switching between hosts to prevent data leakage through keyboard channel.
  Tamper-evident labels to indicate mechanical tampering.
  Electrical isolation between host ports.
  Some basic isolation in EDID (Display Plug & Play) channel
  Government approval through Common Criteria or TEMPEST evaluation.

While existing secure KVMs are better than commercial KVMs, still they are vulnerable to sophisticated attackers and becoming less effective against intruders.

The risks involved with existing secure KVMs are:
  Sophisticated code changes
  Tampering without activating the basic anti-tampering system
  Abuse of EDID channels in creative ways to cause leakage through fast or slow switching between hosts.
  Abuse of audio channels to cause leakages Therefore there is a need for secure KVMs that will be more robust and safe against sophisticated attacks and provide better confidence for high security organizations with the ease of use of KVM.

There is a need for a KVM that can demonstrate through careful design and analysis that even if major components in that device are being attacked and tampered, it will still keep hosts isolated. There is a need for a KVM that will assure that USB traffic will flow in a unidirectional way only between the user peripheral devices and the selected host.

Available Products

For example, CIS Secure Computing, Inc. of Dulles, Va. 20166, USA the web site "cissecure.com", provides some secure solutions.

Referenced Patents and Applications

US Application 20050216620 A1, titled: "KVM and USB peripheral switch"; to Francisc; et al. discloses a system and method for switching KVM and peripheral interfaces between host interfaces. Provided is a KVM switch where a keyboard and a mouse are emulated at host interfaces of the KVM switch and hosts are emulated at keyboard and mouse interfaces of the KVM switch. In addition, the KVM switch provided is capable of switching, either independently or concurrently with a keyboard and mouse, additional peripherals, such as USB peripherals.

US application 20060123182; titled: "Distributed KVM and peripheral switch"; to Francisc; et al.; discloses a system and method for switching keyboard and mouse devices and video displays, as well as USB peripheral devices, between USB hosts and video sources over extended distances. Provided is a distributed KVM and peripheral switch where a USB keyboard and mouse is emulated to the host interfaces of the KVM and peripheral switch and a USB host is emulated to keyboard and mouse interfaces of the KVM and peripheral switch. In addition, the keyboard, mouse, display and peripheral devices are separated from the hosts and video sources by a non-USB communications channel.

US application 20070242062; titled: "EDID pass through via serial channel"; to: Guo; Yong; et al.; discloses techniques for passing Extended Display Identification Data (EDID) or Enhanced-EDID (E-EDID) in an uncompressed multimedia communication system including a video sink side communicatively coupled to a video source side. An EDID AVAILABLE packet is communicated via a serial backward channel from the video sink side. A REQUEST is communicated to the video sink side via a serial forward channel to indicate the video sink side can send the EDID data. The EDID data is then communicated to the video sink side via the serial backward channel.

U.S. Pat. No. 6,263,440; titled: "Tracking and protection of display monitors by reporting their identity"; to Pruett, et al.; a method, system and computer readable medium (the present invention) for reporting information related to a monitor attached to a computer which includes a system memory. The present invention includes electronically reading the information from the monitor and storing the monitor information in the system memory. The present invention further includes retrieving the monitor information from the system memory and providing the monitor information to a display via a browser. The monitor information comprises electronically readable information including its identity. One aspect of the present invention further includes comparing the monitor information with corresponding last known information, wherein a mismatch indicates that the monitor has been changed. Another aspect of the present invention further includes copying the monitor information to a radio frequency (RF) enabled memory, wherein the monitor information can be logged utilizing an RF reader device. The RF reader device may be included in an RF gate and/or a hand held device. Computer systems with Radio Frequency Identification (RFID) technology configured in accordance with the present invention enable automated electronic tracking of computer assets such as the monitors as they pass through the RF gate in or out of a portal. Computer systems with the RFID technology also enable the automated electronic tracking of the monitors or other computer assets via the hand held device. In either case, no direct contact with the monitor is needed for the tracking and reporting.

U.S. Pat. No. 7,231,402; titled: "Video switch for analog and digital video signals"; Dickens, et al.; discloses a video switching circuitry for use in a KVM switch and similar devices. Video signal switching circuitry can supply video signals from a one of a plurality of video sources connected to the circuit to a display device connected to the circuit. The high data signaling rate signals are converted into a greater number of lower data signaling rate signals for switching by a bus architecture. Also provided are video display systems in which analogue and digital video signals are switched synchronously to allow them to be displayed on common or separate display devices. Also described is a high-resolution monitor digital video data switching device.

U.S. Pat. No. 7,559,092; titled "Secured KVM switch"; to Anson, et al.; discloses method that supports secure input/output (I/O) communications between an I/O device and a data processing system via a keyboard, video, and mouse (KVM) switch. An example embodiment includes the operations of establishing a first secure communication channel between the KVM switch and the I/O device and establishing a second secure communication channel between the KVM switch and the data processing system. In addition, I/O data may be received at the KVM switch from the I/O device via the first secure communication channel. In response to receipt of the I/O data from the I/O device, the I/O data may be transmitted from the KVM switch to the data processing system via the second secure communication channel. Embodiments may also include support for non-secure channels between the KVM switch and nonsecured I/O devices, nonsecured data processing systems, or both.

SUMMARY OF THE INVENTION

It is an aspect of the current invention to provide a secure KVM device for supporting a plurality of n host computers isolation while providing: m user displays, user peripheral devices, a keyboard, and a mouse comprising:
  a controller function;
  m Display Plug and Play Emulated Memory (DPPEM) devices assigned to each one of n hosts;
  a switching matrix capable of enabling connection of said m DPPEM devices to each one of n hosts; and
  a circuitry capable of switching said m×n DPPEM devices from said controller function to switching matrix,
wherein said secure KVM device performs a method comprising the steps of:
  a) reading display Plug and Play data from a first display by the said controller function;
  b) repeating step a until controller function has completed reading m displays Plug and Play data;
  c) switching all said DPPEM devices from said switching matrix to said controller function;
  d) disabling said DPPEM devices write protection;
  e) writing said first display Plug and Play data into said first host first display DPPEM device;
  f) repeating step e for other said display Plug and Plays until writing all m display DPPEM device of first host;
  g) repeating steps e and f for all n hosts DPPEM;
  h) enabling all DPPEM devices write protection;
  i) switching all said DPPEM devices to said switching matrix;
  j) switching first display to first user selected host;
  k) switching said switching matrix to connect first user selected host to first display DPPEM device;
  l) repeating steps j and k for all said m display;
  and,
  m) switching said user peripheral devices to user selected host.

In some embodiments the controller function is integrated with other KVM control functions.

In some embodiments the controller function implementation is selectable from the group consisting of: Programmable Logic Device (PLD), microcontroller, PLD, FPGA and discrete logic circuitry.

In some embodiments the host's audio output signals are one of: switched or mixed by a device circuitry in parallel to said peripheral switch to increase the volume of selected host audio.

In some embodiments said audio switching or mixing circuitry further comprises a host microphone input switching function.

In some embodiments said audio switching or mixing circuitry further comprises a freeze switch to enable user selection of freeze mode wherein host selected for audio is different from host selected by the user for KVM interaction.

In some embodiments the device further comprising a display mountable secure KVM indicator capable of clearly indicating user selected channel for each display and wherein said indicator is selected from a group consisting of: colored lamps, colored LEDs, LCD panel, Multi-color LEDs and white LEDs with colored filters.

In some embodiments said display mountable secure KVM indicator of claim further comprises an ambient light sensor capable of to enabling automatic indicator lighting level adjustment based on ambient lighting conditions.

In some embodiments said display mountable secure KVM indicator said indicator further comprises at least one of: switches and rotary encoders to enable user interaction with secure KVM.

In some embodiments the device further comprises at least one or cascading connectors, and support circuitry to enable serial cascading of at least two secure KVM devices to enable extend number of connected hosts.

In some embodiments the device further comprises at least one On Screen Display (OSD) generators to provide the user with on-screen indication of the host selected and secure KVM status.

It is another aspect of the current invention to provide a secure KVM device for supporting a plurality of n host computers isolation while providing: m user displays, user peripheral devices, a keyboard, and a mouse comprising:
  a controller function;
  m Display Plug and Play Emulated Memory (DPPEM) devices assigned to each one of n hosts;
  a switching matrix capable of enabling connection of said m DPPEM devices to each one of n hosts; and
  a circuitry capable of switching said m×n DPPEM devices from said controller function to switching matrix,
  wherein said secure KVM device performs a method comprising the steps of:
    reading display Plug and Play data from first said display by the said controller function;
    switching all said DPPEM devices from said switching matrix to said controller function and disabling all DPPEM write protection;
    writing said first display Plug and Play data into said first host first display DPPEM device;
    repeating previous step for all n hosts DPPEM devices;
    repeating previous four steps until completed writing m display x n host DPPEM devices;
    switching all said DPPEM devices to said switching matrix isolating it from controller function;
    enabling all said DPPEM write protection;
    switching first display to first user selectable host;
    switching said switching matrix to connect first user selectable host to first display DPPEM device;
    repeating last two steps until m display.
    and,
    switching said user peripheral devices to user selectable host from above user selectable hosts.

It is another aspect of the current invention to provide a method for supporting a plurality of host computers isolation while providing: user display, user peripheral devices, a keyboard and a mouse in a secure KVM device, comprising:
  a controller function; and
  a Display Plug and Play Emulated Memory (DPPEM) assigned for each host, the method comprising the steps of:
performing preparation sequence comprising the steps of:
  reading display Plug and Play data from the display by the controller function in the device;
  switching the DPPEM in the device to connect to said controller function;
  writing display Plug and Play data into said DPPEM;
  switching DPPEM devices to hosts to enable host reading of said written display Plug and Play data;
  and
  entering normal mode by repeating the steps of:
  waiting for user selection of host channel; and,
  coupling selected host to user display and user peripherals.

It is anther aspect of the current invention to provide a method for supporting host computers isolation while providing: two user displays, user peripheral devices, a secure keyboard, and a mouse in a secure KVM device comprising:
  a controller function;
  two Display Plug and Play Emulated Memories (DPPEMs) assigned for each host;
  two video inputs for each coupled host computer; and
  two display video ports coupled to two user displays;
the method comprising the steps of:
  system preparation comprising:
    reading display Plug and Play data from said first display by the said controller function;
    reading display Plug and Play data from said second display by the said controller function;
    switching said DPPEM devices to connect to said controller function;
    writing said first display Plug and Play data into said first display DPPEM device of each host port;
    writing said second display Plug and Play data into said second display DPPEM device of each host port;
    switching DPPEM to hosts to enable host reading of said written display Plug and Play data; and
  entering normal mode comprising repeating the steps of:
    n) waiting for user selection of host channel; and,
    o) coupling selected host to user display and user peripherals.

It is yet another aspect of the current invention to provide a method for supporting n host computers isolation while providing: m user displays, user peripheral devices, a keyboard, and a mouse in a secure KVM device, comprising:
  a controller function;
  one Display Plug and Play Emulated Memory (DPPEM) device assigned to each one of n hosts;
  a selector to switch n DPPEM devices from said controller function to coupled hosts the method comprising the steps of:
    reading display Plug and Play data from first said display by the said controller function;

repeating previous step until controller function has completed reading m displays Plug and Play data;
switching all n said DPPEM devices from said hosts to said controller function;
disabling said DPPEM devices write protection;
writing any display Plug and Play data into said first DPPEM device;
repeating previous step until controller function has completed writing n DPPEM device;
enabling all n DPPEM devices write-protection;
switching all n DPPEM devices to coupled hosts;
receiving user selection of selectable host to selectable display;
checking by controller function if DPPEM at user selectable host port is programmed with user selectable display Plug and Play data: if not controller function performs the next five steps and if yes controller function skips the next five steps;
controller function switching user selectable host port DPPEM device from host to controller function;
controller function disabling user selectable host port DPPEM device write-protection;
controller function writing selectable display Plug and Play information into user selectable host port DPPEM device;
controller function disabling user selectable host port DPPEM device write-protection;
controller function switching user selectable host port DPPEM device from controller function back to user selectable host port;
controller function switching user selectable display to user selectable host;
receiving user selection of display to enable selected host to interact with user mouse and keyboard;
controller switching user mouse and keyboard to selectable host;
and,
repeating last ten steps for every user's selectable display and host.

In some embodiments each of said DPPEM is coupled to mode select switch logic to enable selection between:
p) one of: said hosts and said switching matrix;
or:
q) said controller function mode select In some embodiments all said mode select switch logic for all said DPPEM are electrically tied together to assure synchronous operation.

In some embodiments said DPPEM is write-protected when DPPEM is switched to one of: said hosts or said switching matrix.

In some embodiments said DPPEM is further write-protected when controller function is reading said display plug and play data from said display.

In some embodiments the circuitry in said secure KVM assures that when DPPEM is switched to hosts it is write-protected and not switched to the controller function.

In some embodiments said assurance is achieved through a single controller function output that controls the said DPPEM mode select switch logic and the said DPPEM write-protection.

In some embodiments circuitry in said secure KVM electrically isolates said controller from display when controller function is writing said display Plug and Play data into said DPPEM.

In some embodiments said electrical isolation of display is achieved by driving isolation circuitry from a single controller function output that controls the said DPPEM mode select switch logic and the said DPPEM write-protection.

In some embodiments said electrical isolation of display Plug and Play is achieved by driving isolation circuitry from a single controller function output that controls the said DPPEM mode select switch logic and the said DPPEM write-protection.

In some embodiments all DPPEM are coupled to the said controller function through a selector switch logic controlled by the said controller function to enable all DPPEM to be coupled to a single controller function bus.

In some embodiments said selector switch logic is controlled by the same KVM channel selection lines that control video and peripheral selection.

In some embodiments all DPPEM are coupled to the said controller through a single bus and wherein DPPEM address is controlled by said controller function to enable addressed access to each DPPEM.

In some embodiments while secure KVM is performing said preparation sequence steps, video and peripheral switching are disabled.

In some embodiments after controller function reading of display Plug and Play data, and prior to writing it into the DPPEM, said controller function checks the validity of the data and stops if data found invalid.

In some embodiments said secure KVM is further comprises at least one host emulator coupled to said user peripheral devices.

In some embodiments said secure KVM is further comprises of device emulators coupled to each said host and coupled to said at least one host emulator.

In some embodiments said secure KVM is further comprises of unidirectional data flow enforcing devices connected between said at least one host emulator and said device emulators to enforce peripheral data flow from at least one host emulator to device emulators only.

In some embodiments said secure KVM is further comprises of channel selection circuitry between the said at least one host emulator and said device emulators to enable user selection of desired host.

In some embodiments said secure KVM is further comprises of circuitry to detect pre-programmed user keyboard key combinations to enable user selection of desired host.

In some embodiments said secure KVM is further comprises selectors such as rotary switch and push-buttons for user selection of desired host.

In some embodiments said secure KVM further comprises one or more anti-tampering means for detection of unauthorized enclosure opening which triggers one of: irreversible KVM functional changes, user indication and KVM functional disabling.

In some embodiments said secure KVM is further comprises of independent power source selectable from the list of: battery and super-capacitor, to enable said anti-tampering device to be active while KVM is un-powered.

In some embodiments said secure KVM is further comprises of at least one additional dedicated peripheral port to enable connection of a pre-defined peripheral device such as smart-card reader.

In some embodiments said dedicated peripheral port is coupled to a mode select switching circuitry to select between: a qualification function to qualify connected peripheral device and when properly qualified to command said mode select switching circuitry to switch to use mode; or a channel select switch function to enable selection of one connected host peripheral port.

In some embodiments said channel select switch function is further coupled to a peripheral disconnect detection function to detect peripheral device disconnect from KVM port and reconnect said mode select switching circuitry to qualification function. In some embodiments said dedicated peripheral port is having a freeze switch to enable user to temporarily stop dedicated peripheral port channel switching.

More details and features of the current invention and its embodiments may be found in the description and the attached drawings.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 33 illustrates a simplified diagram of the front panel of the preferred embodiment of the present invention similar to the 4-host channels and dual-heads Secure KVM embodiment illustrated in FIGS. 31 to 33 above.

DETAILED DESCRIPTION OF THE DRAWINGS

Figure 1:
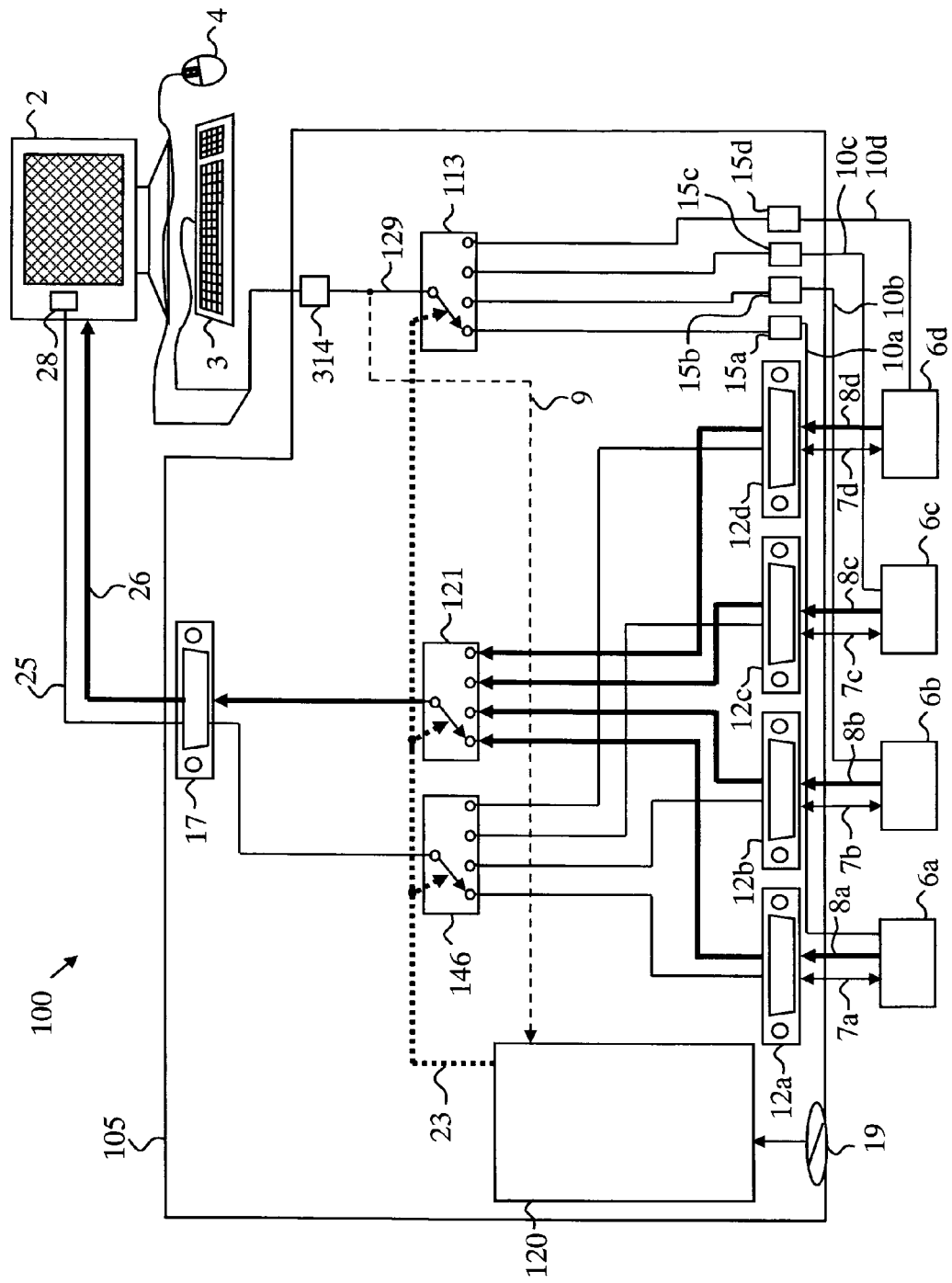
FIG. 1 illustrates a high-level block-diagram of a prior art system that enables a computer user to access multiple networks using a direct switching KVM and multiple host computers.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

In the drawings, some logical connections are drawn as arrows indicating the direction of data flow. Some connections are specifically marked with to ends arrow to indicate bi-directional data flow. However, some bidirectional data connections are drawn without arrow heads as to not crowd the drawings. Video data channels may be drawn in heavy lines to indicate the higher bandwidth of these channels. Arrows drawn within switches boxes should not be interpreted as indicating direction of data flow.

In discussion of the various figures described herein below, like numbers refer to like parts. For clarity, non-essential elements were omitted from some of the drawings.

FIG. 1 illustrates a high-level block diagram presenting an example of a prior-art multiple hosts and KVM system 100. This system implementation lack the security features that typically required in applications where hosts must be isolated due to security reasons.

User display 2 keyboard 3 and mouse 4 are connected to the KVM 105. KVM 105 is further connected to four host computers 6a to 6d through various cables. KVM 105 enables user selection of one of the four attached host computers allowing the user to comfortably interact with the selected host from a single console. Selector switch or push-buttons 19 enable user selection of desired host. It should be noted that many KVM devices detect keyboard key combinations to as user input.

Host Computers 6a, 6b, 6c and 6d are connected to the KVM 105 through four host video ports 12a, 12b, 12c and 12d respectively. Host computers are also connected to KVM 105 through four peripheral cables 10a, 10b, 10c and 10d to host peripheral ports 15a, 15b, 15c and 15d respectively.

To better illustrate display interfaces, in this and in the following figures the EDID (Display Data Channel or Display Plug and Play) lines were separated from the host video cables 8a, 8b, 8c and 8d and designated as 7a, 7b, 7c and 7d. Host video ports 12a, 12b, 12c and 12d may be analog video (For example VGA—Video Graphics Array), DVI-I (Digital Visual Interface), DVI-D, HDMI (High-Definition Multimedia Interface), Display Port or any other suitable display interface protocol. Similarly, user display 2 is connected to the KVM 105 through video cable 26 and Extended Display Identification Data (EDID) lines 25 connected to the KVM display video output port 17.

It should be noted that in many of the older prior-art KVM devices the EDID lines are not connected at all. While disconnected EDID lines may be advantageous from security perspective, it may cause severe operational problems with modern computers and software. Modern computer operating systems and display card drivers may adjust display resolution to default settings if no display EDID detected and in some cases computers may not generate video signals at all.

To further explain the system 100 the following text describes the internal parts of KVM 105 and their functions.

Selector switch or push-buttons 19 is typically connected to the controller function 120. Controller function 120 manages the KVM device functionality through pre-programmed state-machine or firmware. Controller function 120 may be implemented by microprocessor, a programmable logic device such as Programmable Logic Device (PLD) or Field-Programmable Gate Array (FPGA) or by simple discrete logic or an Application Specific Integrated Circuit (ASIC) circuitry. KVM channel select line/s 23 serves as address (selection) lines for the host channels. When the user selects a host channel through selector switch or push-buttons 19 or through key combinations, the controller function 120 changes the KVM channel select line/lines 23 to properly set the coupled switches 121, 146 and 113 to the selected host. Controller function 120 may be also coupled with user keyboard 3 through user peripherals port 314 and line 9 to enable KVM switching through predefined keyboard combinations. Controller function 120 detects preprogrammed key patterns to trigger certain functions such as channel switching in addition to push-buttons 19 or as stand-alone function.

The four host video ports 12a, 12b, 12c and 12d are connected inside the KVM 105 to the video switch or multiplexer 121 that is controlled by controller function 120. When the user select a channel (or host to interact with), the selection is passed to the video switch or multiplexer 121 to couple the appropriate KVM video input port to the display video output port 17. Video output port 17 is connected through a video cable 26 to the user display 2 to display the user selected video channel. Typically video switch or multiplexer 121 comprises of several parallel switches either single ended or differential to enable switching of full analog RGB (Red Green Blue) or digital LVDS (Low-Voltage Differential Signaling) video signals. Host video ports 12a, 12b, 12c and 12d may be analog video, DVI-I, DVI-D, HDMI, Display Port or any other suitable display interface protocol.

The EDID switch 146 switches the user display EDID EEPROM (Electrically Erasable Programmable Read Only Memory) 28 connected to the KVM 105 through EDID lines 25 and display video output port 17. Controller function 120 passes commands or address to EDID switch 146 to connect EDID lines to the selected host through host vide ports 12a, 12b, 12c or 12d and EDID lines 7a, 7b, 7c and 7d. Typically the EDID switch comprises of two poles to enable simultaneous switching of data and clock signals as defined by $I^2C$ (Inter-Integrated Circuit) protocol.

The peripheral switch 113 connected to the KVM peripheral output ports 314 through lines 129 and to hosts peripheral ports 15a, 15b, 15c and 15d enables connection of the user keyboard 3 and mouse 4 to one host computer at a time based on commands (or address) from controller function 120. User keyboard signals may be passed to controller function 120 to detect pre-programmed key combinations and thus to enable user control of KVM 105 through user keyboard 3.

It should be noted that in this figure and in all following figures switches symbols are used to clearly show function. In reality various multiplexers, discrete components, integrated circuits and various logical circuits may be used to achieve similar or same functionality.

One disadvantage of this system 100 is its security vulnerability to EDID leaks. The use of common display with single EDID EEPROM 28 can cause undesired data leakages between hosts. The following example will further explain the potential security vulnerability of this system.

In case that an intruder intrudes into the unclassified network attached to host 6a and install malicious code on that host. Same or other intruder installs another malicious code on secret network attached to host 6b, there is a possibility that secret data will leak from host 6b to host 6a and from there it will be transmitted to the intruder somewhere in the internet. While KVM switches between host 6a and host 6b, some characteristics of the EDID EEPROM may be used to store a single state bit. After many switching cycles, it is possible to pass bytes, characters and long streams of data.

Figure 2:
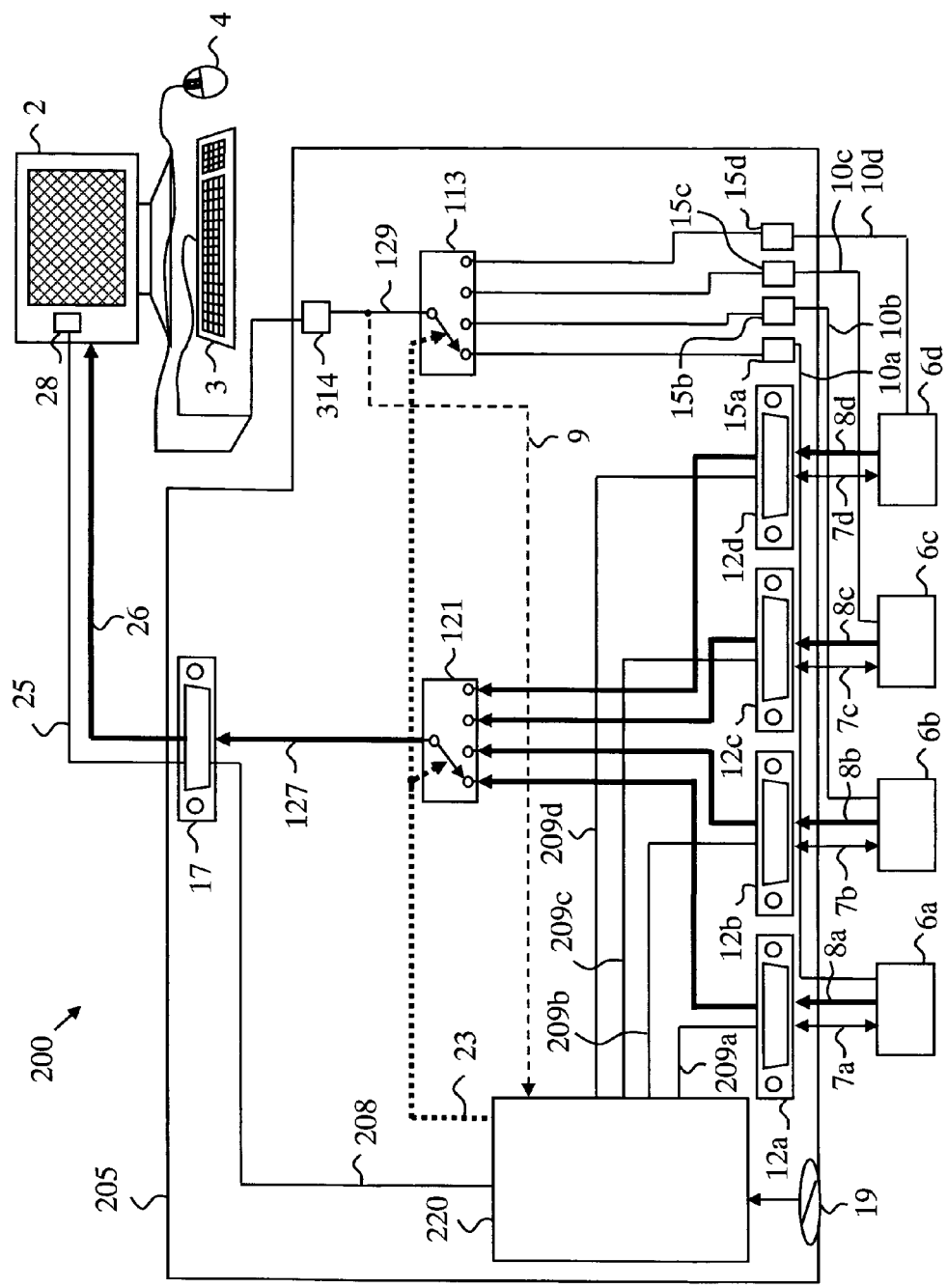
FIG. 2 illustrates a high-level block-diagram of yet another prior art system that enables a computer user to access several hosts through a KVM. The prior art KVM shown in this figure is having EDID function emulated by a microcontroller.

FIG. 2 illustrates a high-level block diagram presenting another example of a prior art multiple hosts and KVM system 200 similar to the system 100 of FIG. 1 above. In this 4-ports KVM implementation 205, the EDID memory is emulated by controller function 220.

In some secure KVM prior art products EDID controller function is separated from main controller function 220 to add an additional layer of security.

During KVM power up or when display 2 is first connected to KVM, controller function 220 reads the display EDID EEPROM 28 through display EDID lines 25, display video output port 17 and internal EDID lines 208. To enable direct interface with EDID lines 208 controller function 220 typically have dedicated $I^2C$ port. This port may be shared by other $I^2C$ devices having address other than EDID standard—address 00.

When user selects a host, the received EDID data is passed to that host through lines 209a, 209b, 209c and 209d and through host video ports 12a, 12b, 12c and 12d.

While this KVM EDID data handling method isolates the hosts from a common display EDID EPROM 28, it exposes the hosts to a common controller function 220. Similar attacks may exploit the controller function 220 to leak data between hosts.

It should be noted that in some cases the controller function 220 is being separated into multiple controllers (one for each KVM port) to avoid the common controller problem. Still this method is vulnerable to EDID related attacks and leakages.

Figure 3:
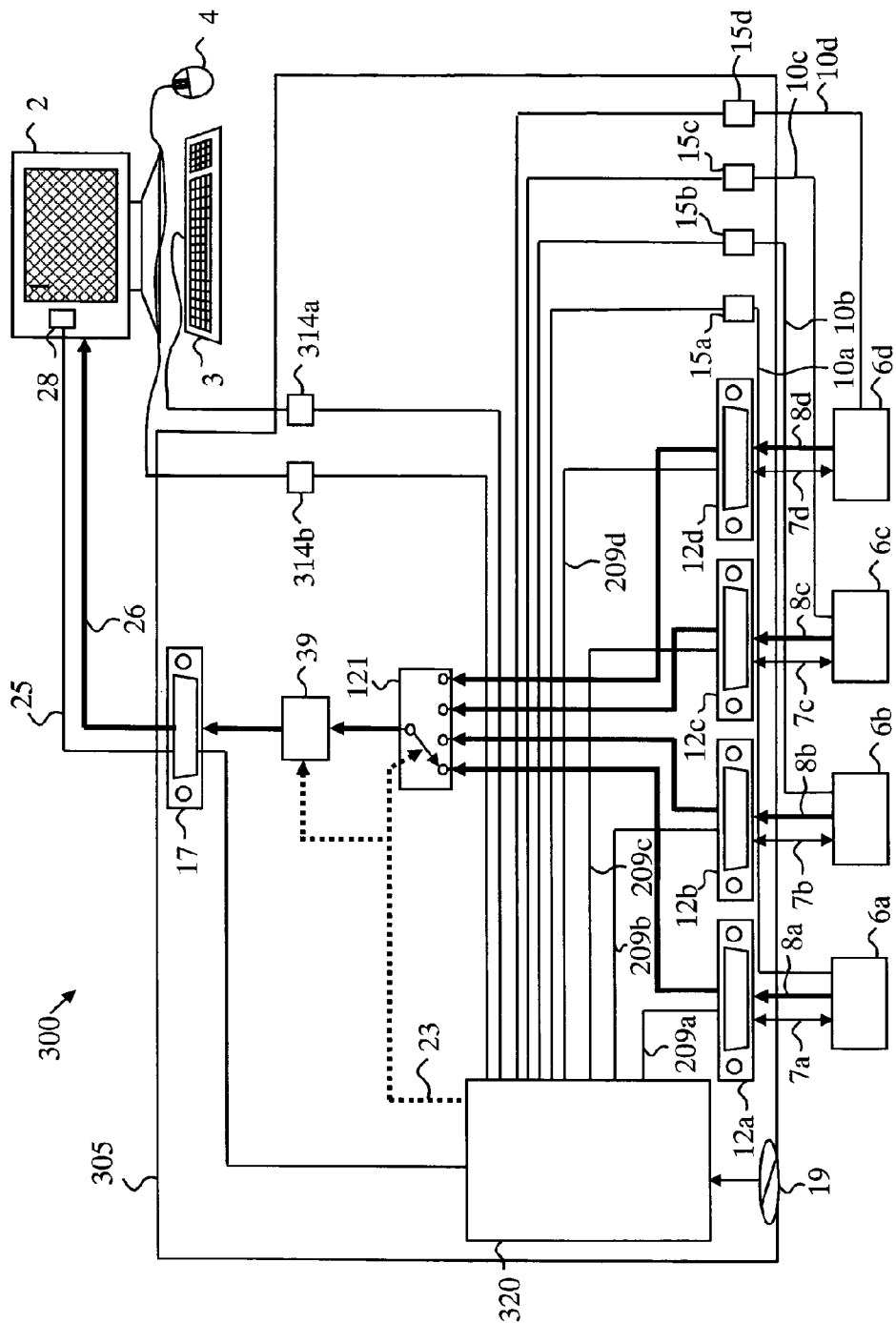
FIG. 3 illustrates a high-level block-diagram of yet another prior art system that enables a computer user to access several hosts through a KVM. The prior art KVM shown in this figure is having EDID, peripheral devices and peripherals host emulated by a single microcontroller.

FIG. 3 illustrates a high-level block diagram presenting another example of a prior-art multiple hosts and KVM system 300 similar to the systems 100 and 200 of FIGS. 1 and 2 above.

In this 4-ports KVM implementation 305, the peripheral switching function is performed by the controller function 320. This arrangement is popular today as modern peripherals are USB compatible and requires keep-alive signals to properly boot and function. Controller function 320 is used to route USB signals to selected host and to generate required keep-alive packets to all unselected hosts.

Controller function 420 also is emulating a host to the connected keyboard 3 and mouse 4 through keyboard port 314a and mouse port 314b respectively.

Video output signal from video switch or multiplexer 121 may be passed trough the optional On Screen Display (OSD) generator 39 to increase user situation awareness. OSD generator 39 overlays a colored frame or channel number on the video output based on KVM channel select line/s 23 to provide a clear indication to the user of the current selected channel.

Similar to the system 200 of FIG. 2 above, this KVM may be vulnerable to EDID attacks and to controller function 320 leakages. Unlike KVM 205 of FIG. 2 above, this KVM implementation 305 may also leak data between EDID and peripheral channels due to the common controller 320 that handles both streams. Therefore this particular implementation is less secured that the other prior-art options shown above.

Figure 4:
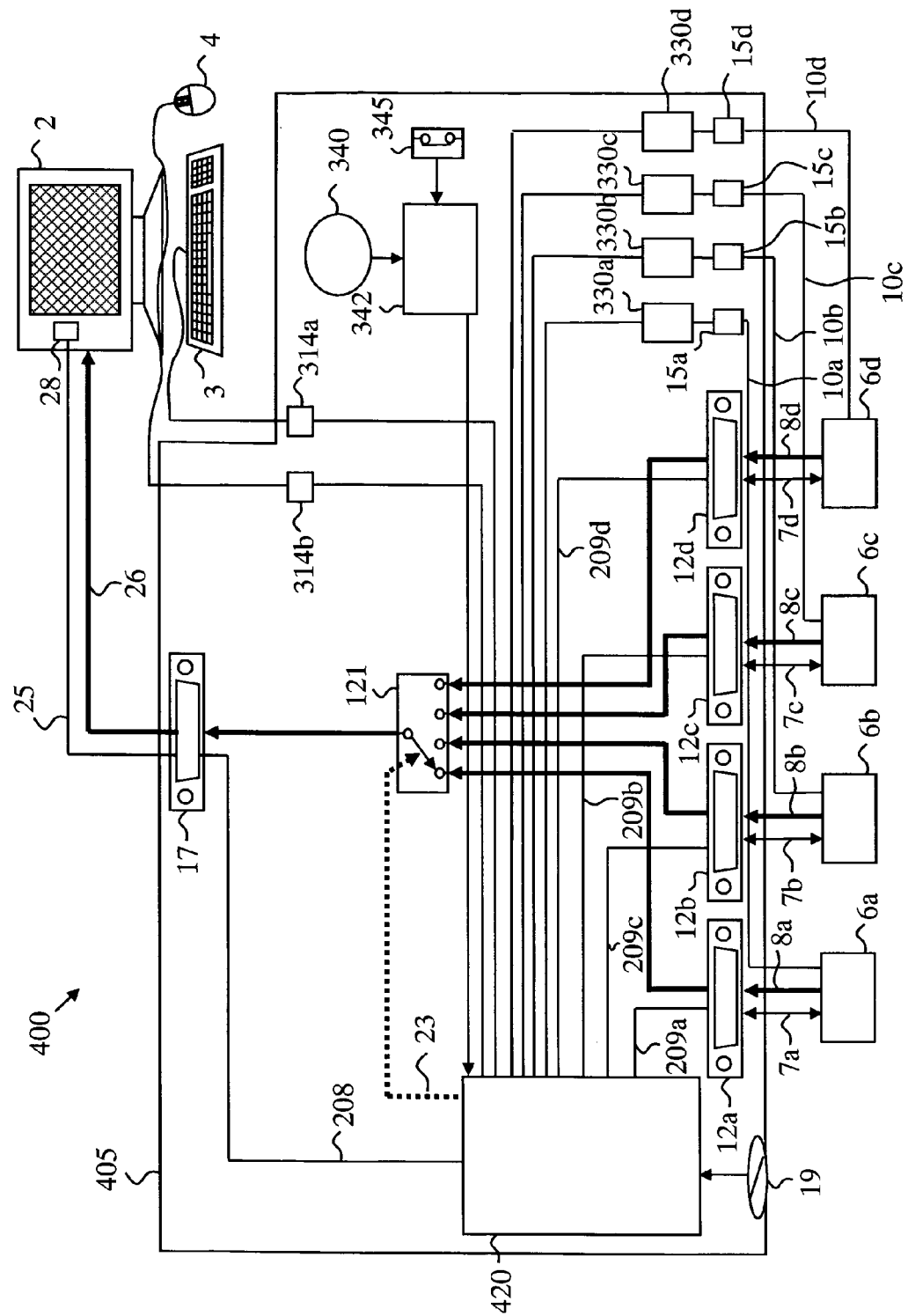
FIG. 4 illustrates a high-level block-diagram of yet another prior art system that enables a computer user to access several hosts through a KVM. The prior art secure KVM shown in this figure is having EDID and peripherals host emulated by a single microcontroller and peripheral devices emulated by four separate microcontrollers.

FIG. 4 illustrates a high-level block diagram presenting another example of a prior-art multiple hosts and a secure KVM system 400 similar to the systems 100, 200 and 300 of FIGS. 1, 2 and 3 above.

In this 4-ports secure KVM implementation 405, each of the host peripheral ports 15a, 15b, 15c and 15d is connected to a dedicated peripheral device emulator 330a, 330b, 330c and 330d respectively.

Device emulators are independent microcontrollers running a code that emulates a connected keyboard and mouse to the connected host. Device emulators 330 are further connected to the controller 420 to receive data from user keyboard 3 and mouse 4.

Controller function 420 also is emulating host to the connected keyboard 3 and mouse 4 through keyboard port 314a and mouse port 314b respectively.

EDID emulation is done by controller 420 and is similar to the configuration shown in FIG. 3 above.

Emulation of host and devices enables full control of connected peripherals and reduces the risks involved with USB ports.

Some prior-art product also including anti-tampering means shown in this figure to reduce the risk that products will be tampered to change their functionality and cause data leakages.

Anti-tampering controller 342 may be implemented using simple flip-flop or other logical circuits, may be a Programmable Logic Device (PLD), FPGA or microcontroller. Anti-tampering controller 342 is always powered by coin battery 340. A tampering micro-switch 345 mechanically coupled to the device enclosure is designed to open whenever the device enclosure is being opened or when screws are removed. The tampering micro-switch 345 signals the Anti-tampering controller 342 that tampering event has happened to permanently modify product functionality through controller function 420. Tampering micro-switch 345 is an example of simple mechanical detection. In higher security product, anti-tampering detection may include: multiple switches, thermal sensors, shock sensors, light sensors, X-Ray sensors, shield continuity sensors etc.

Tamper-evident means may include holographic labels that change their appearance if removed from product enclosure or other mechanical means.

This type of KVM implementation some times presented as secure KVM is more secured than other KVMs described above but still suffers from significant security vulnerabilities. Although controller 420 is isolated from hosts at the peripheral ports, it is not isolated at the EDID lines. Attacker may still exploit controller 420 to cause data leakages between hosts.

Figure 5:
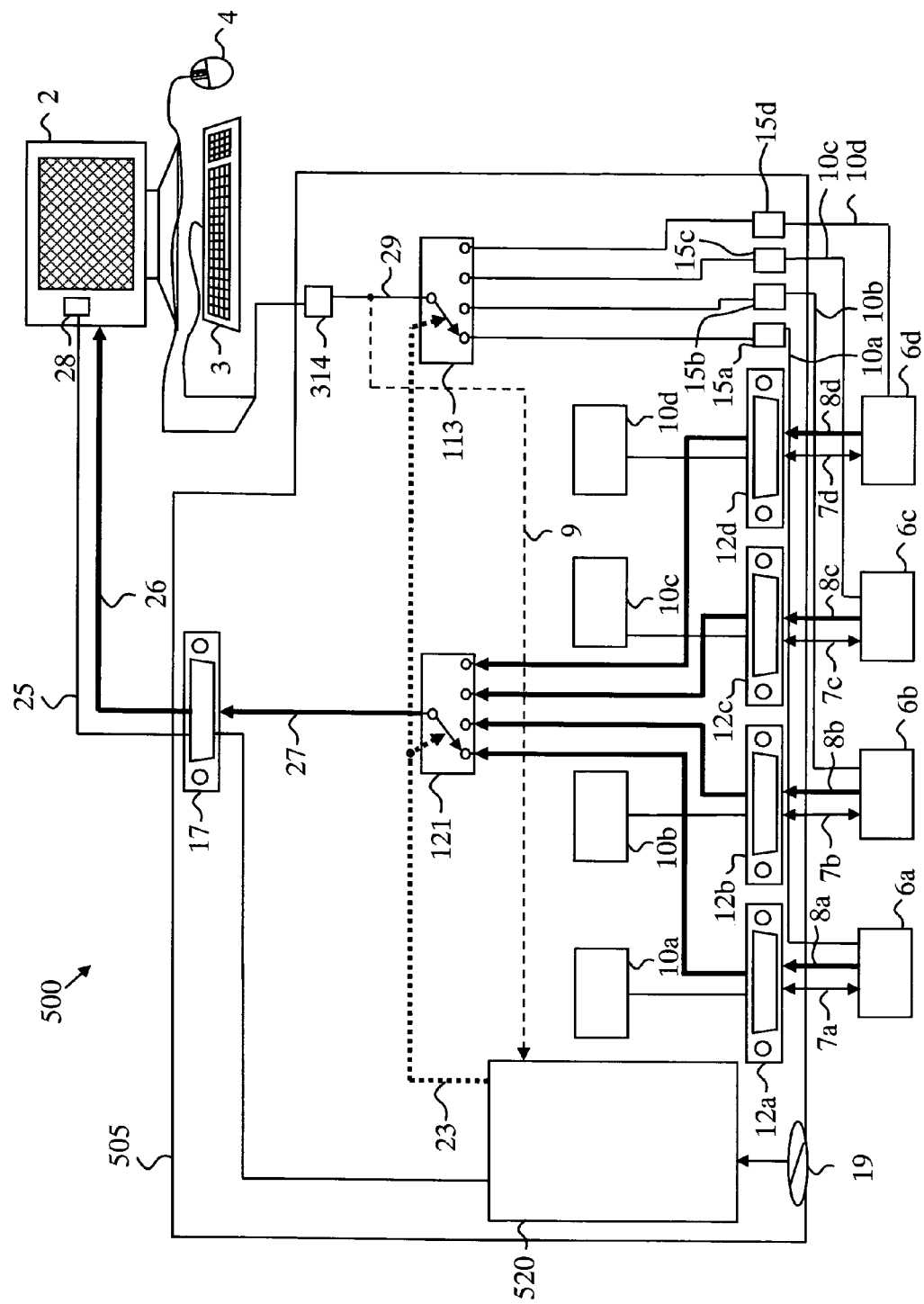
FIG. 5 illustrates a high-level block-diagram of yet another prior art system that enables a computer user to access several hosts through a KVM. The prior art secure KVM shown in this figure is having EDID emulated by four independent fixed content memory chips.

FIG. 5 illustrates a high-level block diagram of yet another example of a prior-art multiple hosts and KVM system 500 similar to the systems 100, 200, 300 and 400 of FIGS. 1, 2, 3 and 4 above.

In this 4-ports KVM implementation 505, host video ports 12a, 12b, 12c and 12d are permanently connected to EDID EEPROM devices 10a, 10b, 10, c and 10d. Special programmer is used during KVM manufacturing or maintenance to program these EEPROM devices with required data.

From security standpoint this secure KVM implementation is more robust and isolated compared to other prior art systems. Nevertheless as data in EDID EEPROM is fixed and should match connected display 2, this system will not adapt to display changes.

Figure 6:
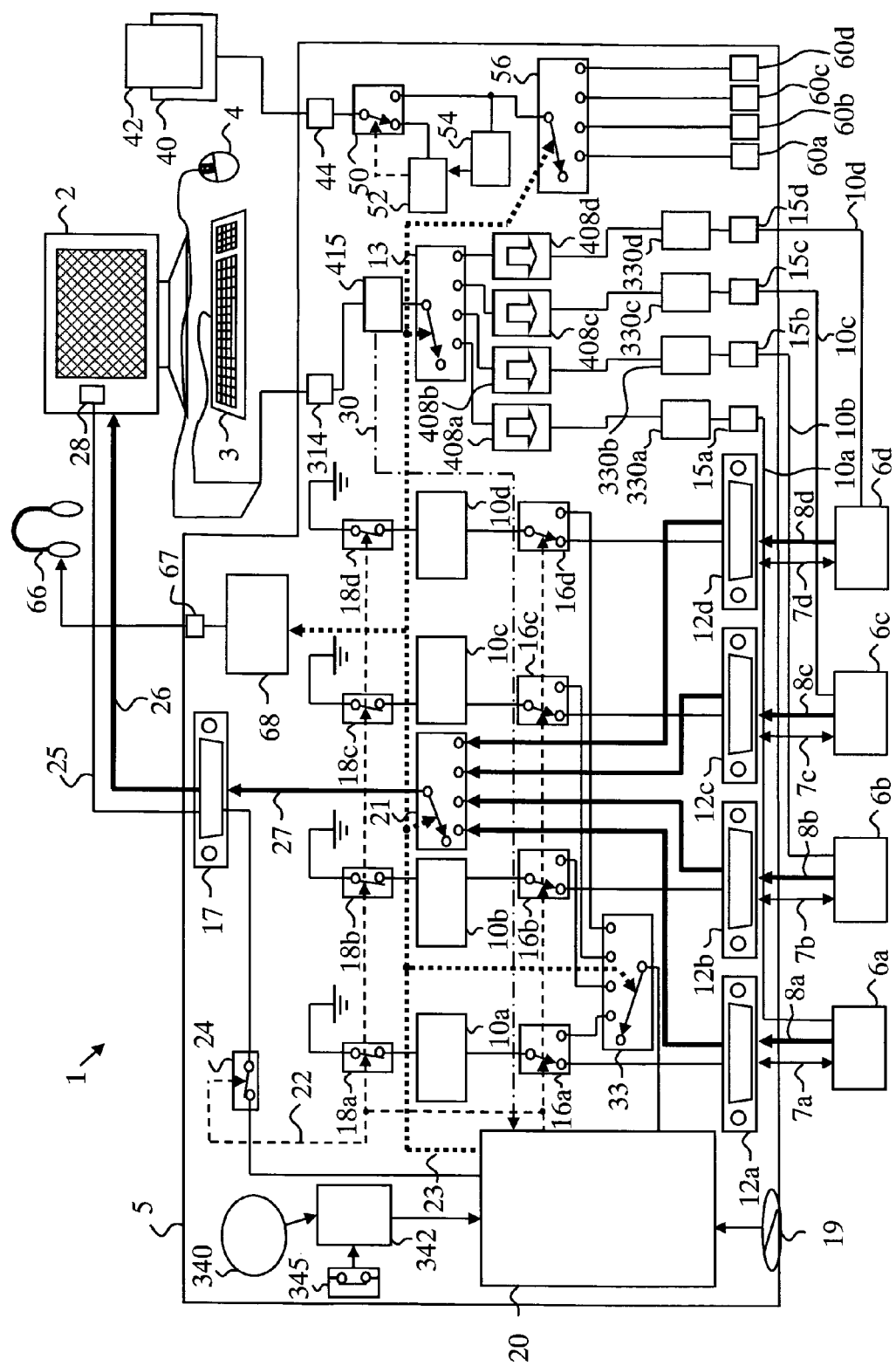
FIG. 6 illustrates a high-level block-diagram of a preferred embodiment of the present invention that enables a computer user to securely access multiple isolated networks using four host computers and a secure KVM device. The secure KVM shown in this figure is in Read Mode reading display EDID information.

FIG. 6 illustrates a high-level block diagram of an example of multiple hosts and a secure KVM system 1 of the present invention.

While this system is similar in its functionality to the system in FIGS. 1 to 5 above, the design of the secure KVM 5 of the present invention makes it less vulnerable to information security risks.

Controller function 20 controls the secure KVM 5 states by driving two outputs:
KVM Mode Select line 22 that control the state of:
The four Host EDID mode select switches 16a to 16d;
The EDID Read switch 24 and,
The four DPPEM devices 10a to 10d write-protect switches 18a, 18b, 18c and 18d.

In Normal Mode—all Host EDID switches 18 are positioned to switch each host to its respective fully isolated DPPEM device 10; Display EDID read switch 24 is closed to enable reading, and the four write-protecting switches 18a to 18d are switched to write-protect to avoid host writing into their DPPEM devices.

In Write Mode all Host EDID mode select switches 16a to 16d are positioned to the right, to isolate the hosts 6a to 6d from their respective DPPEM device 10a to 10d and to switch them to the controller function 20 through write selector switch 33; Display EDID read switch 24 is opened to isolate the attached display 2 from controller function 20 and hosts 6 and the four write-protect switches 18a to 18d are opened to enable controller function 20 writing of each DPPEM device 10a to 10d.

KVM Channel Select line/s 23 serve as address lines for the channels. Typically there are 2 or 3 bit lines for 4-ports KVM. These lines are used to select the required channel (host) during Normal Mode. It is also used to select the DPPEM device 10a to 10d that the controller function is writing to in Write Mode through write selector switch 33. DPPEM devices 10a to 10d may be powered by attached hosts during Normal Mode and then may be powered by the secure KVM device power supply during Write Mode. Optionally secure KVM device 5 may comprises of anti-tampering means to reduce the risk that products will be tampered to change their intended functionality and potentially causing data leakages.

Anti-tampering controller 342 may be implemented using a simple flip-flop or other logic circuits, a PLD, an FPGA or a microcontroller. Anti-tampering controller 342 is always powered on by coin battery 340 even when secure KVM 5 is powered off. A tampering micro-switch 345 mechanically coupled to the device enclosure is designed to open whenever the device enclosure is being opened or when screws are removed. The tampering micro-switch 345 signals the Anti-tampering controller 342 that tampering event has happened to permanently modify product functionality through controller function 20. Tampering micro-switch 345 is an example of simple mechanical detection. In higher security product, anti-tampering detection may include: multiple switches, thermal sensors, shock sensors, vibration sensor, tilt sensor, light sensors, X-Ray sensors, shield continuity sensors etc. Functionality change may completely disable KVM video output or cause it to blink to notify user of tampering event and to prevent normal operation. Recovery from tampering event typically requires product restoration by the product manufacturer.

Additional tamper-evident means may include holographic labels that change their appearance if removed from product enclosure or other mechanical means.

Optionally product may also comprise of an additional dedicated peripheral port to enable connection of a predefined device such as: smart-card reader, USB token or secure mass-storage device. The peripheral device may be integrated inside the secure KVM 5 enclosure. In this FIG. 6 the user smart-card 42 is inserted into the smart-card reader 40 attached to the secure KVM device 5 through a dedicated peripheral port 44. Secure KVM 5 is pre-programmed to accept only smart-card reader 42 in the peripheral port 44. An attempt to connect a different device or to switch peripheral devices connected to dedicated peripheral port 44 preferably disable that port and may initiate a tampering alert.

Inside secure KVM 5, dedicated peripheral port 44 is coupled to a switching circuitry 50 to enable selection between:
- a qualification function 52 while peripheral device is being initially qualified (Peripheral Qualification Mode);
- a channel select switch function 56 while peripheral device is being used by the user (Peripheral Use Mode).

Qualification function 52 interacts with the connected peripheral device to determine if the device matches a set of pre-programmed qualification characteristics. For example the qualification function 52 can qualify the connected peripheral device based on: device class, device model, device vendor ID, device unique ID etc. Once a connected peripheral device has passed the pre-programmed qualification process then qualification function 52 commands the switching circuitry 50 to switch to Peripheral Use Mode. In Peripheral Use Mode the peripheral device port 44 is routed to the channel select switch function 56 to select one host from attached hosts 6a to 6d.

In Peripheral Use Mode, peripheral port activity may be monitored by a continuous monitoring function 54 to continuously monitor peripheral device type and disconnect from KVM 5 and trigger said switching circuitry back to qualification function if needed. Continuous monitoring function 54 may be implemented using a USB hub wherein hub LEDs outputs are sampled by qualification function 52 to detect peripheral device disconnection. The use of a USB hub as the continuous monitoring function 54 reduces the risk that the user will first connect a proper device and once it is qualified will switch to a different (unauthorized) device.

The channel select switch function 56 is coupled to four matching dedicated host peripheral ports 60a to 60d. Dedicated peripheral cables (not shown in this figure) connecting the dedicated peripheral ports 60a to 60d to hosts 6a to 6d.

It should be noted that the dedicated peripheral port modes are not synchronized with the KVM modes described above.

Controller function 120 may be optionally coupled with the keyboard and mouse host emulators 415 through line 30 to enable KVM switching through predefined keyboard combinations. Controller function 120 detects preprogrammed key patterns to trigger certain functions such as channel switching in addition to push-buttons 19 or as stand-alone function.

FIG. 6 is showing the secure KVM 5 in its first state immediately following power stabilization and after power-up or after the reset line (not shown in these figures for clarity) is released.

This Read Mode state is similar to the Normal Mode and is used for a short while enabling the controller function 20 to read connected display 2 EDID data.

To enter the Read Mode controller function 20 drives the KVM Mode Select line 22 to perform the following:
1. The four Host EDID mode select switches 16a, 16b, 16c and 16d are positioned to switch each host 6a, 6b, 6c and 6d to its respective fully isolated DPPEM devices 10a, 10b, 10c and 10d respectively;
2. The display EDID read switch 24 is closed to enable reading of display 2 EDID EEPROM 28
3. The four write-protect switches 18a, 18b, 18c and 18d are switched to write protect to avoid host writing into their respective DPPEM device.

At this state hosts may read older and incorrect EDID data content from their DPPEM devices and therefore other circuitry or signals from controller function 20 is used to disable EDID reading by host at this stage. For example if video display interface is DVI or HDMI, Hot Plug Detect (HPDET) line may be pulled to signal hosts that display is not ready. In this figure video selector switch 21 and peripheral switch 13 are positioned at non-connected position to avoid any video or peripheral activities.

Prior to the transition to the next mode controller function 20 may check the integrity and the validity of the attached display EDID data.

Figure 7:
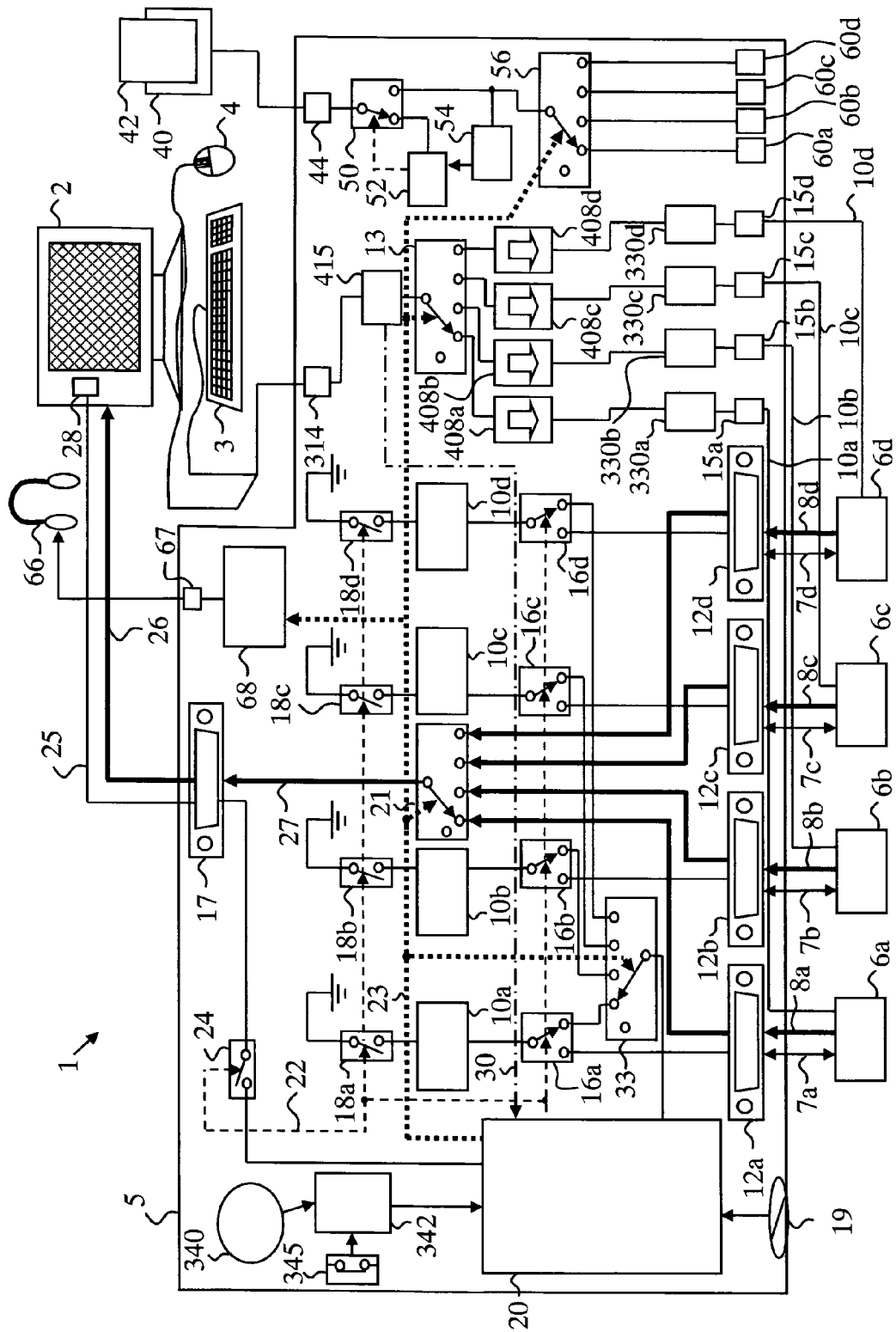
FIG. 7 illustrates a high-level block-diagram of the same preferred embodiment of the present invention illustrated in FIG. 6 above. In this figure the secure KVM is shown in Write Mode.

After the controller function 20 has completed the reading/validating the connected display 2 EDID, it is switching the KVM to Write Mode as shown in FIG. 7 bellow to program the EDID data into the four DPPEM devices 10a, 10b, 10c and 10d.

FIG. 7 illustrates a block diagram of the same Secure KVM 5 of FIG. 6 above in Write Mode.

To enter the Write Mode controller function 20 drives the KVM Mode Select line 22 to perform the following:
1. Change the four Host EDID mode select switches 16a to 16d are positioned to isolate the hosts 6a to 6d from their respective DPPEM devices 10a to 10d and to switch them to the controller function 20
2. Open the display EDID read switch 24 is to isolate the attached display 2 from controller function 20
3. Open the four write-protect switches 18a to 18d to enable controller function 20 writing of each DPPEM devices 10a to 10d.

To write EDID content into the First DPPEM device 10a, controller function 20 first selects the first channel using KVM Select line/lines 23 and write select switch 33. Once first DPPEM device is selected, controller function 20 may write data into device as write-protect switch 18a is open. The same process is repeated for the three other devices 10b, 10c and 10d. When all four DPPEM devices are programmed, controller function 20 may change the KVM to Normal Mode as shown in FIG. 8 bellow.

FIG. 7 is illustrating the state when the last DPPEM device 10*d* is being programmed. Upon completion of programming the four DPPEM devices 10*a* to 10*d*, controller function 20 switches to Normal Mode.

Figure 8:
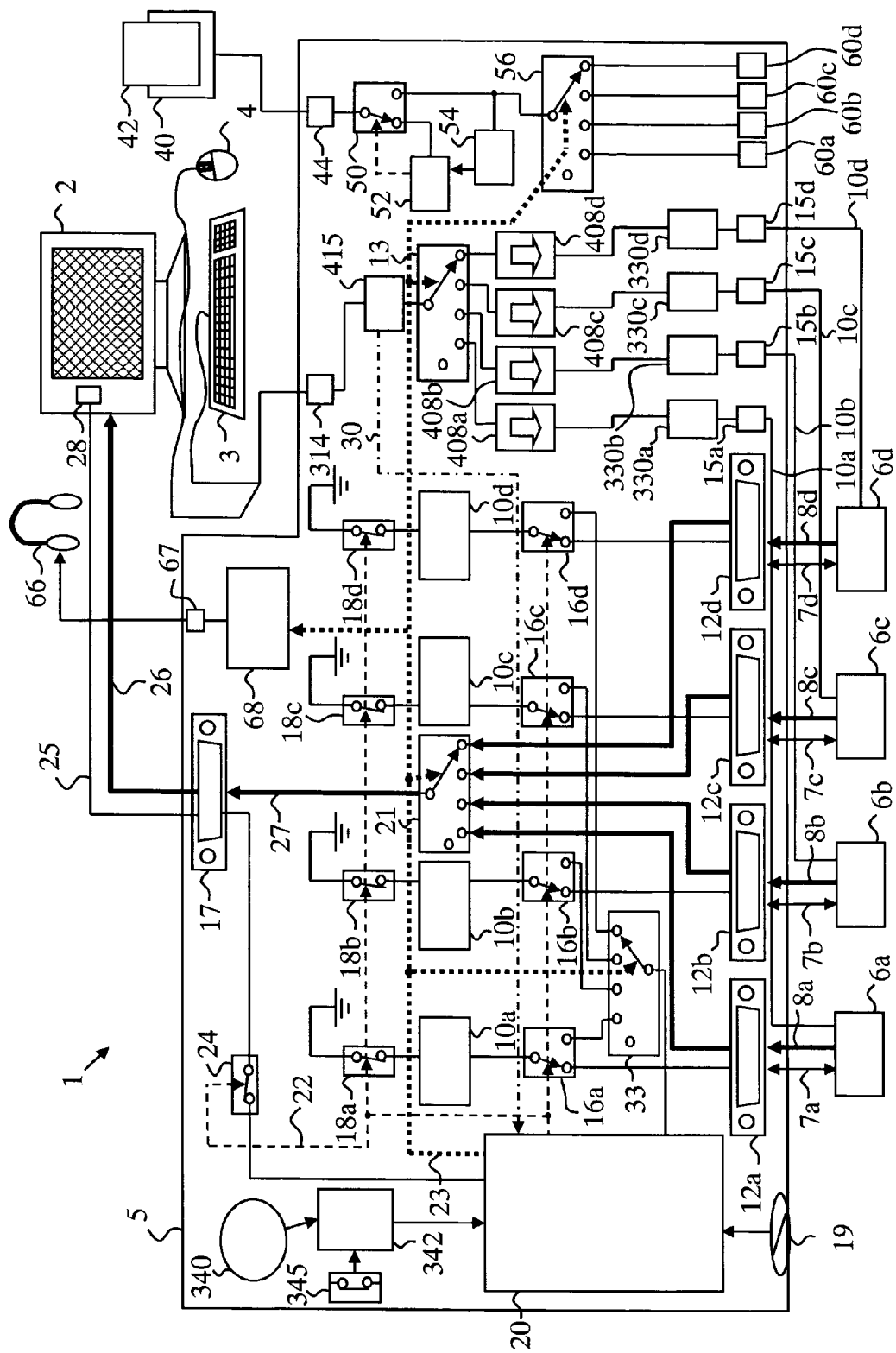
FIG. 8 illustrates a high-level block-diagram of the same preferred embodiment of the present invention illustrated in FIGS. 6 and 7 above. The secure KVM shown in this figure is in Normal Mode.

FIG. 8 illustrates a high-level block diagram of the same Secure KVM 5 of FIGS. 6 and 7 above in Normal Mode.

To enter the Normal Mode controller function 20 drive the KVM Mode Select line 22 to perform the following:

4. The four Host EDID mode select switches 16*a*, 16*b*, 16*c* and 16*d* are positioned to switch each host 6*a*, 6*b*, 6*c* and 6*d* to its respective fully isolated DPPEM devices 10*a*, 10*b*, 10*c* and 10*d* respectively;
5. The display EDID read switch 24 is closed to enable reading of display 2 EDID EEPROM 28. In the exemplary embodiment of the invention, two logical states are used in the system preparation stage: reading (write protection is activated); and writing (write protection is disabled and writing is possible). In normal operation, state of write protection is not critical. To simplify the circuit it is left it connected in Normal mode
   In other embodiments of the current invention, added safety may be achieved by not to connecting the write protection it back, as the display 2 was not changed. This marginal increase in safety may be achieved by a slightly more complex system.
6. The four write-protect switches 18*a*, 18*b*, 18*c* and 18*d* are switched to write protect to avoid host writing into their respective DPPEM device.

Once in Normal Mode, the user may select host channel by push-buttons or selector 19 connected to the controller function 20. Optional line 30 connects the keyboard and mouse host emulators 415 to the controller function 20 to enable optional support for pre-programmed keys recognition as an alternative mode to user selection of host via push buttons 19. The manual selection through push buttons 19 may be added to keyboard detection selection or only one method may be implemented. Mouse and keyboard host emulators 415 connected to the user keyboard 3 and mouse 4 through user peripherals ports 314 to enable receiving user inputs and converting it to four unidirectional data streams routed through peripheral selector switch 13. Peripheral selector switch 13 controlled by controller function 20 KVM channel select line/lines 23 to route just one peripheral data stream through unidirectional data diode devices 408*a* to 408*d* into the device emulators 330*a* to 330*d* respectively. Device emulators 330*a*, 330*b*, 330*c* and 330*d* are emulating standard keyboard and mouse to the attached hosts 6*a*, 6*b*, 6*c* and 6*d* respectively. Device emulators 330*a* to 330*d* also generate the required keep-alive packets to the hosts 6*a* to 6*d*. Keep-alive signals are preferably be maintained while a host is not selected. In this FIG. 8 host 6*d* was selected by the user.

Figure 12:
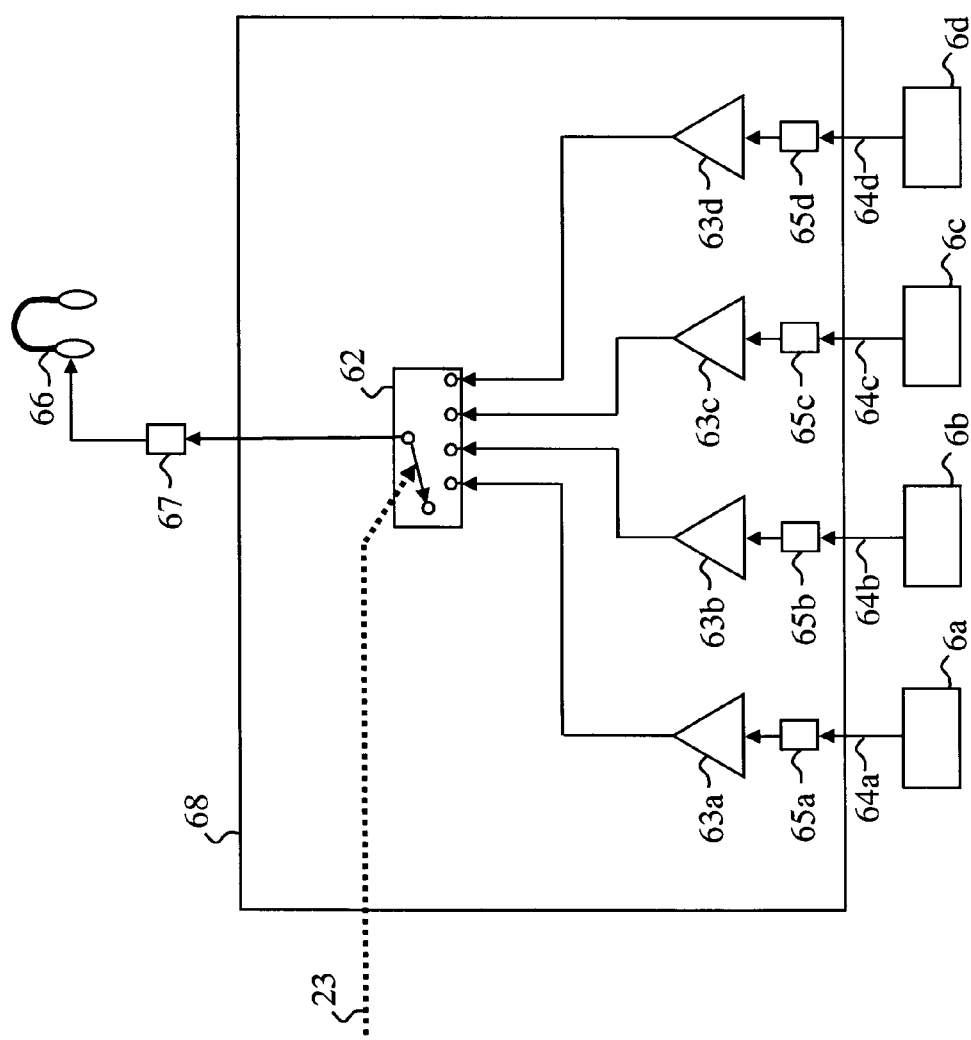
FIG. 12 illustrates a high-level block diagram of the optional audio out switching function according to an exemplary preferred implementation of the present invention.
Figure 13:
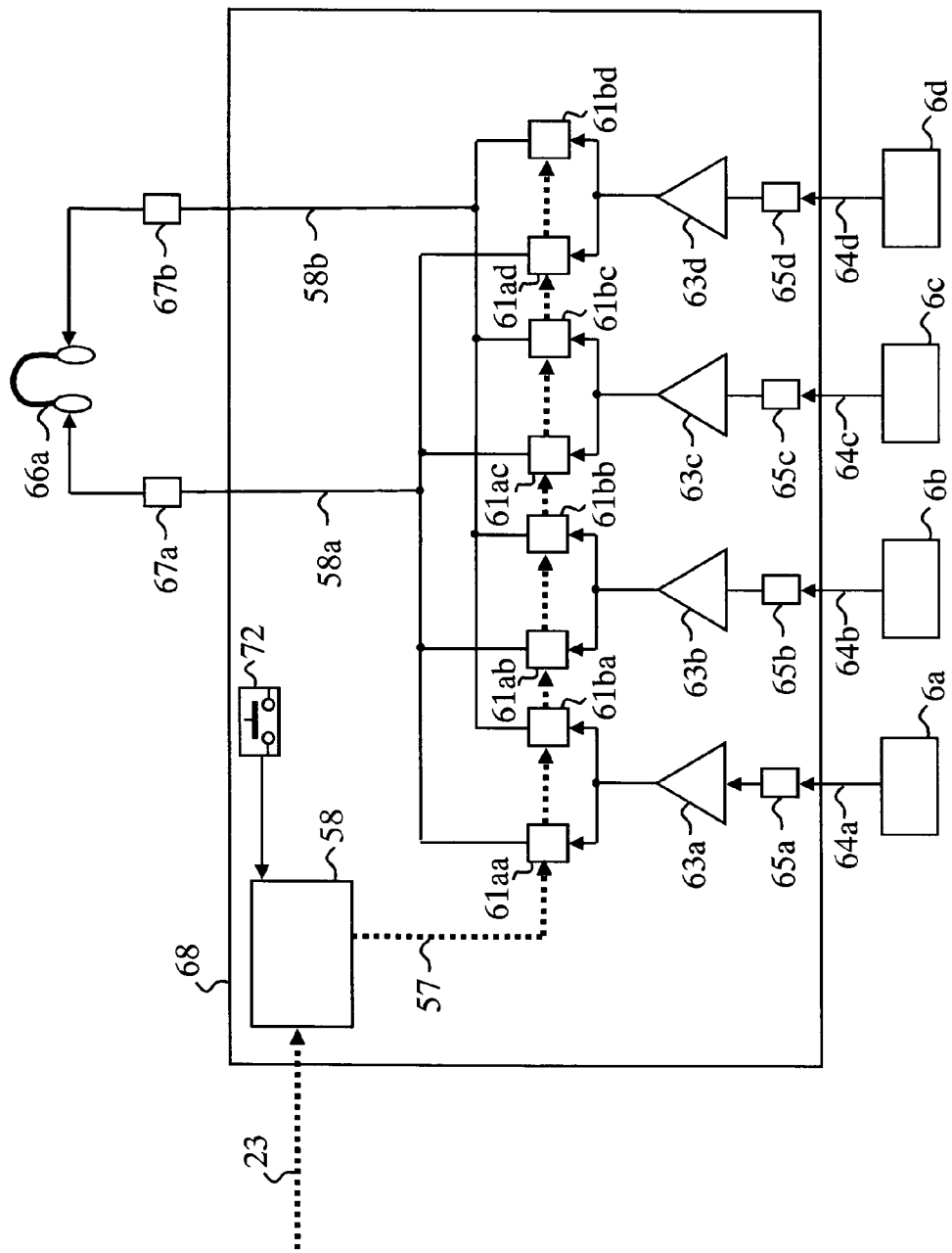
FIG. 13 illustrates a high-level block diagram of yet another optional audio out switching function according to an exemplary preferred implementation of the present invention having stereo audio mixing functionality.

Optional audio out switching function 68 is coupled to user headset or speakers 66 through audio output port 67. It is also coupled to the hosts 6*a* to 6*d* through audio cables and audio input ports not shown here. KVM Channel select line/s 23 preferably controls the audio out switching function 68 host selection. More detailed block diagram of a preferred implementations of the optional audio switching sub-system are illustrated in FIGS. 12 and 13 bellow.

One major advantage of this implementation of the current invention is that a firmware tampering in any controller other than host emulator 415, cannot cause data leakage between attached hosts 6*a* to 6*d*. Since host emulator 415 can only be attacked by the keyboard 3 and since keyboard 3 is considered as a trusted device by most security analysis, the resulted KVM device 5 of the present invention is considered as considerably less vulnerable to remote attacks. It can be shown that only physical tampering may cause data leakage risks between attached hosts.

Figure 9:
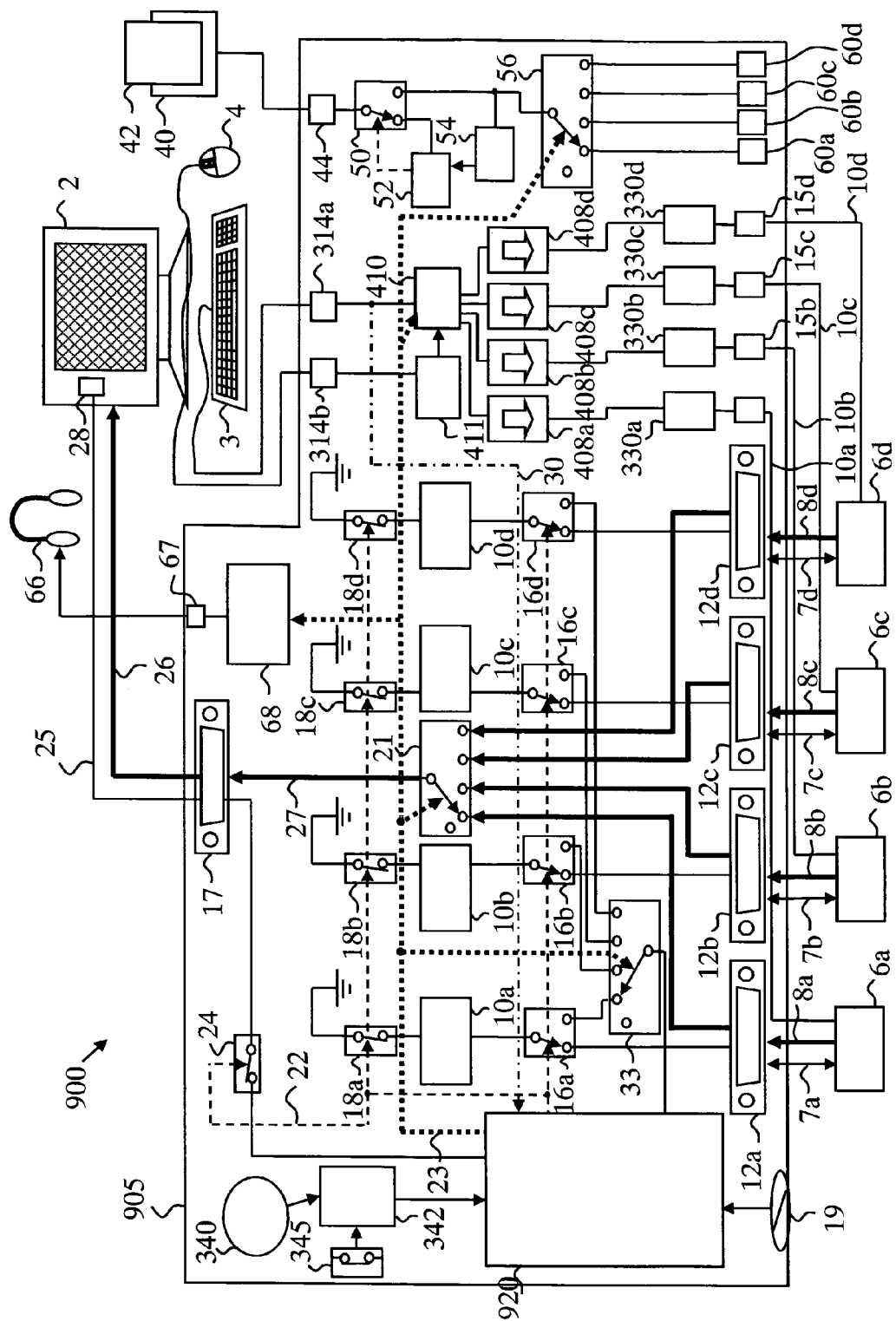
FIG. 9 illustrates a high-level block-diagram of a similar preferred embodiment of the present invention having peripheral switching function embedded in the keyboard host emulator controller.

FIG. 9 illustrates a similar high-level block diagram of a preferred system 900 and Secure KVM embodiment 905 of the present invention. In this implementation the peripheral sub-system is based on forced unidirectional data flow with separate keyboard and mouse host emulators to further improve KVM security. Another difference in this preferred embodiment is the integration of the peripheral switching function 13 of FIGS. 6 to 8 above inside the keyboard host emulator function 410.

User mouse 4 is connected to the Secure KVM mouse host emulator 411 through mouse port 314*b*. User keyboard 3 is connected to the Secure KVM keyboard host emulator 410 through keyboard port 314*a*. Mouse host emulator 411 is coupled to keyboard host emulator 410 passing mouse 4 commands to combine with keyboard 3 commands. Combined data stream from keyboard host emulator is unidirectional and passed to data diodes 408*a*, 408*b*, 408*c* and 408*d* based on channel selection commands from controller function 920 through KVM channel select line/lines 23. If host 6*a* is selected as shown in the illustration, keyboard and mouse data is passed through data diode 408*a* to first device emulator 330*a*. Device emulators 330*a* to 330*d* emulate standard keyboard and mouse and converting the incoming keyboard and mouse stream into standard bi-directional host peripheral protocols such as USB or PS/2.

Host peripheral ports 15*a*, 15*b*, 15*c* and 15*d* are connected to isolated device emulators 330*a*, 330*b*, 330*c* and 330*d* respectively.

From security standpoint the combination of secured peripheral sub-system with secured display Plug and Play provides a robust KVM with minimum vulnerability to peripheral and EDID leakage risks.

Figure 10:
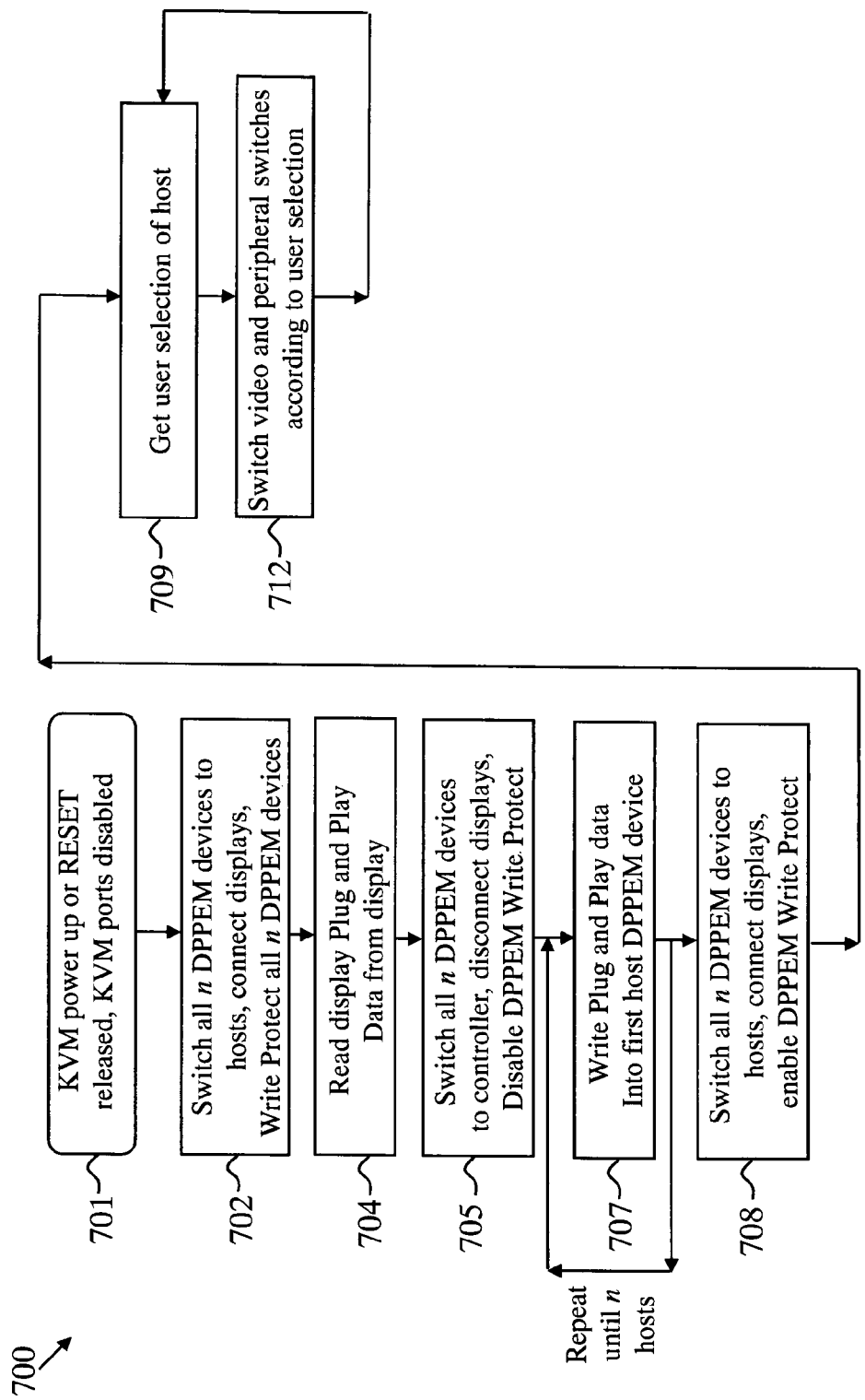
FIG. 10 illustrates a simplified method of operation flowchart of the preferred embodiment of the present invention similar to the 4-host channels embodiment illustrated in FIGS. 6 to 9.

FIG. 10 illustrates a simplified method of operation flowchart of the preferred embodiment of the present invention similar to the 4 host channel embodiment illustrated in FIGS. 6 to 9.

The method 700 illustrated in this figure is adaptable to Secure KVM devices having a single display and n host channels and wherein n>2.

When KVM is powered up all KVM inputs and outputs are disabled (step 701). Display and peripheral devices are isolated from the hosts.

Following step 701, in step 702 the controller function:
1. Switch all n DPPEM devices to host video ports;
2. Connect the display EDID lines to the controller function; and
3. Enable all n DPPEM write protection Controller function may drive the three actions mentioned above simultaneously through a single control line—the KVM Mode Select line.

Following step 702 controller function reads display Plug and Play data from connected display (step 704). Controller function may check the validity of data read from display before it proceeds to the next step.

Steps 701 to 704 defined here as Read Mode.

Following step 704 controller function switches all n DPPEM devices to controller function, disconnect display Plug and Play lines to controller function and disable DPPEM write protection (step 705). Similarly to step 702 above, controller function may trigger these three actions simultaneously through a single control line—KVM Mode Select line.

Following step 705 controller function writes Display Plug and Play data into the first host DPPEM device (step 707) and repeat this step until all n DPPEM devices are written. Controller function access to each DPPEM device may be implemented through various options such as: a common bus and manipulated address or through switching circuitry to enable programming of one device at a time.

Steps 705 to 707 defined here as Write Mode.

Following step 707 controller function switches all n DPPEM devices to their respective hosts reconnect display Plug and Play lines to controller function and enable all n DPPEM write protection (step 708). Similarly to step 705 above, controller function may drive these three actions simultaneously through a single control line—the KVM Mode Select line. Once DPPEM devices connected to their respective hosts, host will probably read EDID data and adjust display settings as needed.

Controller function waits for user selection in step 709. When user selects a channel through push button or through pre-programmed keys combination, controller function switches the video and the peripheral switches to the required channel in step 712. Steps 708 to 710 defined here as Normal Mode.

During all modes if one or more of the following events occurs, the secure KVM may be programmed to become inactive while optionally indicating "tempering alert", for example by blinking the LEDs, or using other alerts such as sounding a buzzer:

1. If a display was physically connected or disconnected to the secure KVM
2. If display EDID information found invalid
3. If tampering event was detected In case of tampering event, the inactive state may be irreversible (permanent).

Figure 11:
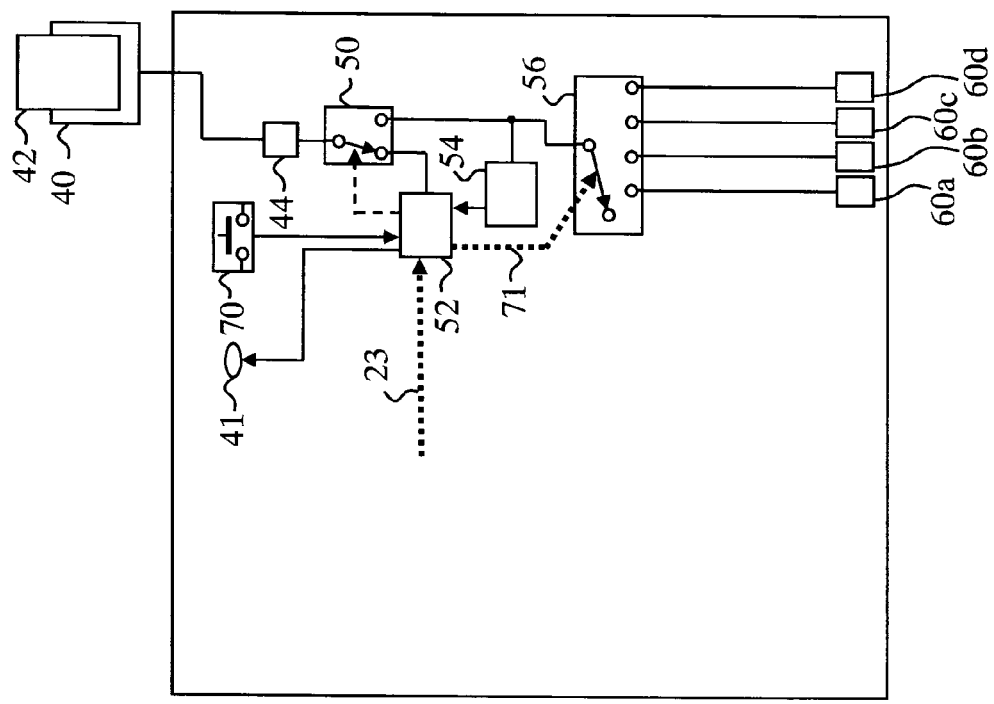
FIG. 11 illustrates a more detailed block diagram of the dedicated peripheral port sub-system with freeze function of the preferred embodiment of this invention.

FIG. 11 illustrates a high-level block diagram of the optional freeze function implementation of the present invention. To better illustrate this function other non related blocks were removed from this drawing.

One major disadvantage of the dedicated peripheral port sub-system shown in FIGS. 6 to 8 above is peripheral device disconnect whenever the user switches the Secure KVM. If the dedicated peripheral port is used for example to support smart-card reader as shown in FIGS. 6 to 8 above and in this FIG. 11, user may authenticate at one host and then switch the Secure KVM away from that host. When the user switches away from that host, the authentication session with first host will terminate. This behavior causes operational inefficiencies due to the frequent user authentication required. The optional freeze function enables the user to freeze the host selection after authentication and as a result user may switch hosts without the need to re-authenticate.

Smart-card 42 is inserted by user into the smart-card reader 40. Smart-card reader 40 is plugged into the secure KVM dedicated peripheral port 44. When reader 40 is connected or when the secured KVM is powered on switching function 50 couples the peripheral port 44 to the qualification function 52. Qualification function 52 interacts with the connected peripheral device 40 to determine if the device matches a set of pre-programmed qualification characteristics. Once a connected peripheral device has passed the pre-programmed qualification process then qualification function 52 commands the switching circuitry 50 to switch to Peripheral Use Mode. In Peripheral Use Mode the peripheral device port 44 is routed to the channel select switch function 56 to select one host. Unlike the dedicated peripheral port of FIGS. 6 to 8 above, in this embodiment of the present invention the KVM channel select line/s 23 is connected to the qualification function 52. The qualification function 52 is further connected to the freeze switch 70 and to the channel select switch function 56.

In Peripheral Use Mode, peripheral port activity may be monitored by a continuous monitoring function 54 to continuously monitor peripheral device type and disconnect from KVM 5 and trigger said switching circuitry back to qualification function if needed. In Peripheral Use Mode before the user presses the freeze switch 70 KVM channel select line 23 is passed through the qualification function 52 into the channel select switch function 56. Once the user presses the freeze switch 70 the dedicated peripheral subsystem enters Freeze Mode. In Freeze Mode the qualification function 52 fixes the channel select line 71 connected to the channel select switch function 56 and thus fixes the attached host port selected prior to entering the Freeze Mode. This freeze mode enables user authentication through a smart-card reader or biometric sensor in front of one selected host. Once authenticated and entered the freeze mode, the user is free to use the KVM and all other hosts without disconnecting the authentication session. Once the user wants to switch the smart-card reader 40 or biometric sensor to another host he/she may un-freeze the port 44 by pressing the switch 70 again and the smart-card reader 40 or biometric sensor will be switched to other hosts as needed.

Without freeze mode function if the user switches to a different channel, the disconnection of the card reader from the host may cause session disconnect and require new authentication process.

When the user presses again the freeze switch 70 the Secure KVM changes back to Peripheral Use Mode and KVM channel select line 23 is passed again through the qualification function 52 into the channel select switch function 56.

LED 41 connected to qualification function 52 to indicate the dedicated peripheral status. Indicated status (through colors or blinking) may indicate mode and failure to qualify. It should be noted that smart card authentication may be a highly complex bi-directional protocol. It may not be possible to emulate the host or filter the traffic during authentication process, as is done in the case of keyboard and mouse. Host may need to write and read from reader 40 for performing authentication. This process may take some time, and repeated processes may slow the normal user work.

FIG. 12 illustrates a high-level block diagram of the optional audio out switching function 68 according to an exemplary preferred implementation of the present invention. To better illustrate this function other non-related blocks were removed from this drawing.

Audio out switching function 68 is externally coupled to user headset or speakers 66 through audio output port 67. It is also externally coupled to hosts 6a to 6d through audio cables 64a to 64d and audio input ports 65a to 65d respectively.

Host audio output is coupled into the optional audio amplifier or isolated buffer 63 to assure unidirectional audio signal flow from host to KVM audio selector switch 62. The audio selector switch 62 uses the KVM channel select line/s 23 to select only one channel at a time to drive the user headset or speakers 66. It is possible to add in a similar manner a microphone switching function with optional audio amplifiers or isolated buffers in reversed position. The addition of microphone switching is less desirable from security standpoint as microphone input may leak analog or even digital noise into other computer audio cards. For this reason most high security KVM combiners do not contain microphone input switching function though a microphone may be connected directly to the hosts.

Left most position in audio selector switch 62 (idle position) may be used to disable audio output during Read Mode and if device was tampered.

In some optional embodiments, a separate audio selector is different than the display selector such that the user may listen and view different hosts.

FIG. 13 illustrates another high-level block diagram of the optional audio out switching function 68 preferred implementation of the present invention. To better illustrate this function other non related blocks were removed from this drawing.

In some application it may be desirable to enable the user to hear not only the selected channel but also the non-selected channels at the background. An example for use of this feature is an operations room employee who needs to monitor calls from different networks. To avoid user confusion the physical attributes of the non-selected channels may be modified to enable user recognition of the source (selected as opposed to non-selected source). For example:
1. Selected source audio may be routed to the left audio channel while non selected channels may be routed to the right audio channel using a stereo headset.
2. Another example—the selected source audio may be passed through while non-selected sources audio may be attenuated.

FIG. 13 illustrates a block diagram of the optional audio switching function 68 capable of performing above mentioned audio modifications or mixing.

Audio out switching function 68 is externally coupled to an optional stereo user headset or speakers 66a through left and right audio output ports 67a and 67b respectively. It is also externally coupled to hosts 6a to 6d through audio cables 64a to 64d and audio input ports 65a to 65d respectively.

Host audio output is coupled into the optional audio amplifier or isolated buffer 63 to assure unidirectional audio signal flow from host to KVM. An audio controller logic function 58 applies predefined or pre-programmed audio command based on coupled KVM channel select line/s 23. Audio mixing bus 57 controlled by the audio controller logic function 58 controls the eight variable gain amplifiers or programmable attenuators 61aa to 61bd. Each host audio output is feeding two variable gain amplifiers or programmable attenuators 61 to enable mixing control of the Audio mixing bus 57 of signal contribution to left audio out line 58a or right audio out line 58b that driving the headset 66a left and right audio transducers respectively.

For example if host channel 2 was selected by the user.

Variable gain amplifiers or programmable attenuators 61ab and 61bb may be programmed to deliver 100% volume to both right and left audio lines 58.

All other variable gain amplifiers or programmable attenuators 61 may be programmed to deliver only 20% of the volume to both right and left audio lines 58.

Similarly it is also possible to use left audio line for the selected channel and right audio line for the non-selected channels to further differentiate audio sources.

An optional Audio freeze push button 72 may be added to enable the user to work on one host while listen to another host (similar to the smart-card freeze function described above). A status LED may be further added to indicate audio switching function status.

It is also possible to add in a similar manner a microphone switching function as described above.

Figure 14:
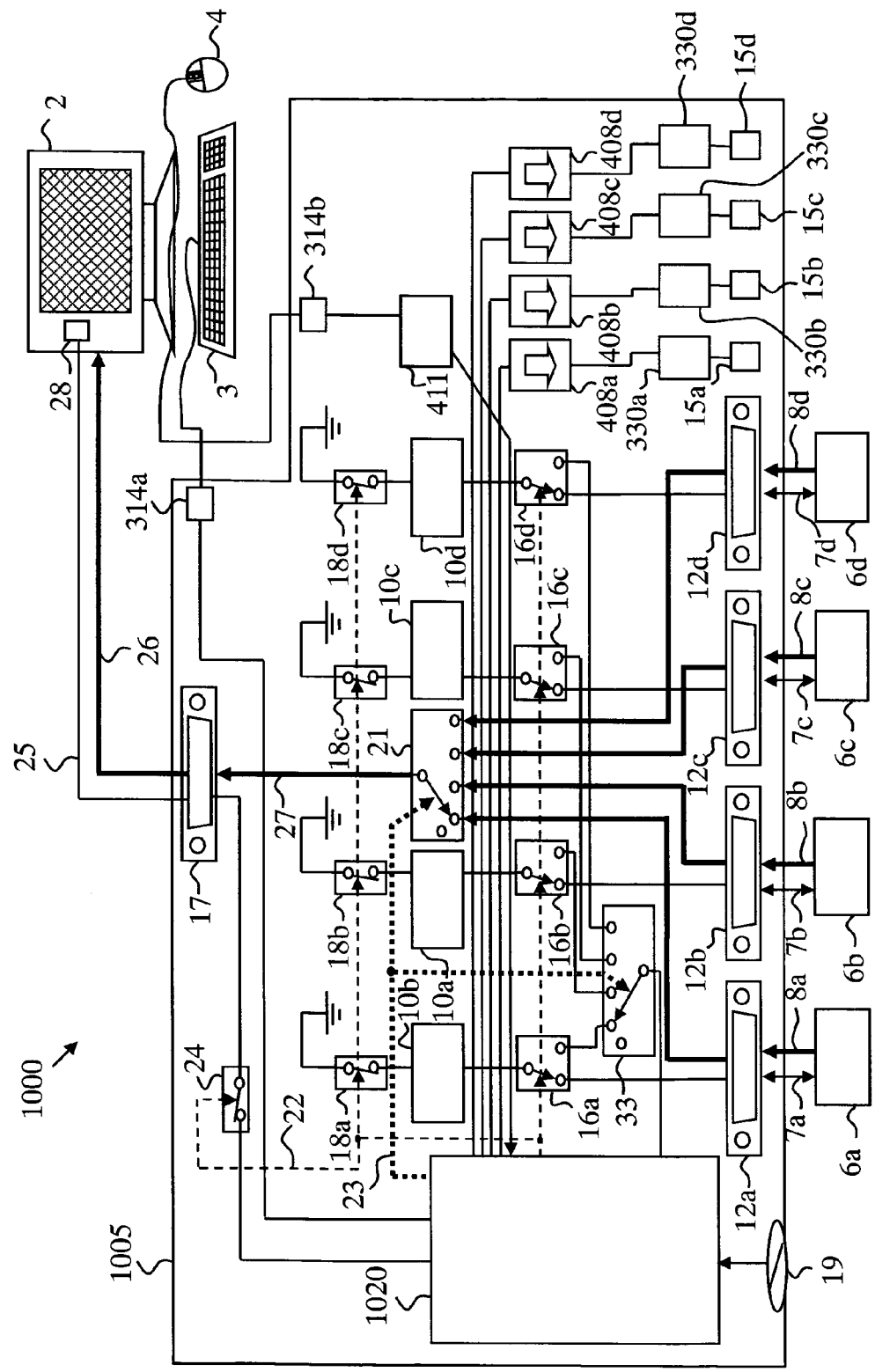
FIG. 14 illustrates a high-level block-diagram of another preferred embodiment of the present invention having peripheral switching function and mouse host emulator function embedded in the controller function. The secure KVM shown in this figure is in Normal Mode while host #1 is selected.

FIG. 14 illustrates yet another similar high-level block diagram of a preferred system 1000 and Secure KVM embodiment 1005 of the present invention.

In this implementation the keyboard host emulator controller 410 of FIG. 9 above was integrated into the controller function 920 of the same figure (designated as 1020 in FIG. 14). This implementation of the present invention reduces product parts and cost without significant effect on system security. In this FIG. 14, secure KVM device 1005 is shown in Normal Mode while host #1 (host 6a) was selected by the user. ?

Figure 15:
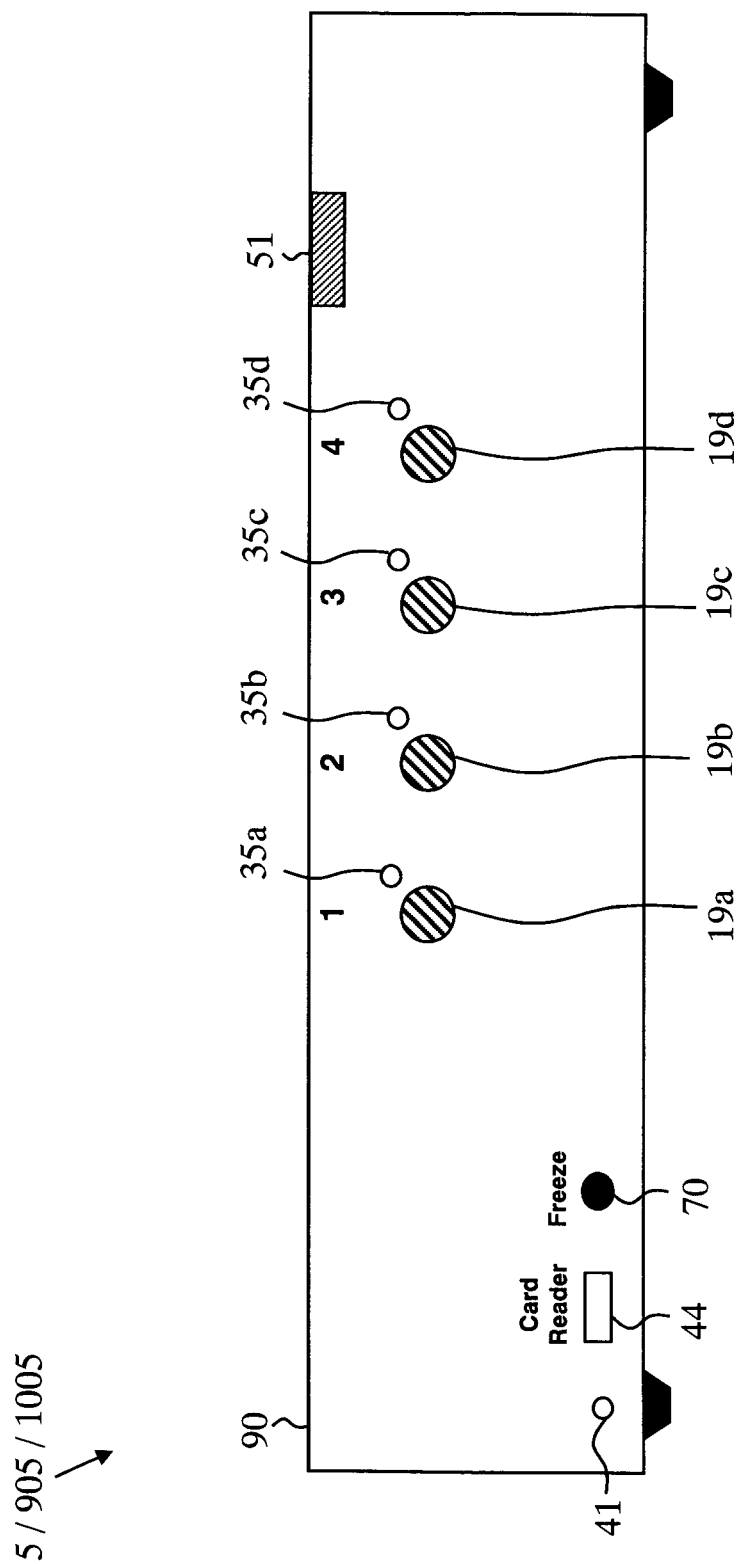
FIG. 15 illustrates a simplified diagram of the front panel of the preferred embodiment of the present invention similar to the 4-host channels Secure KVM embodiment illustrated in FIGS. 6 to 14 above.

FIG. 15 illustrates a front panel 90 of the Secure KVM of the secure KVM 5, 905 and 1005 of the preferred embodiment shown in FIGS. 6 to 14 above.

In this figure host channel select push buttons 19a, 19b, 19c and 19d enables user selection of hosts 6a, 6b, 6c and 6d respectively. Push buttons may be omitted from the front panel design to increase system security by forcing the user to clear keyboard entries buffer prior to switching between channels using pre-programmed keyboard combinations to select hosts. LEDs indicators 35a, 35b, 35c and 35d indicate the selected host channel. Bi-color LEDs may be used to indicate attached host status. LEDs indicators 35a, 35b, 35c and 35d may be further used to indicate that KVM is disabled due to suspected tampering event. This indication may be provided to the user through a synchronized blinking of all LEDs 35.

Card reader or dedicated peripheral port 44 located near the freeze switch 70. Dedicated peripheral port status LED 41 located near the port jack 44 to indicate port status.

Front panel 90 may optionally also have audio out jack 67 (instead or in addition to the audio out jack seen on back panned 92) and audio freeze push button 72 (not seen here for simplicity) and status LED.

Optional tamper evident label 51 located between the front panel surface and the enclosure cover to indicate possible tampering attempt.

Figure 16:
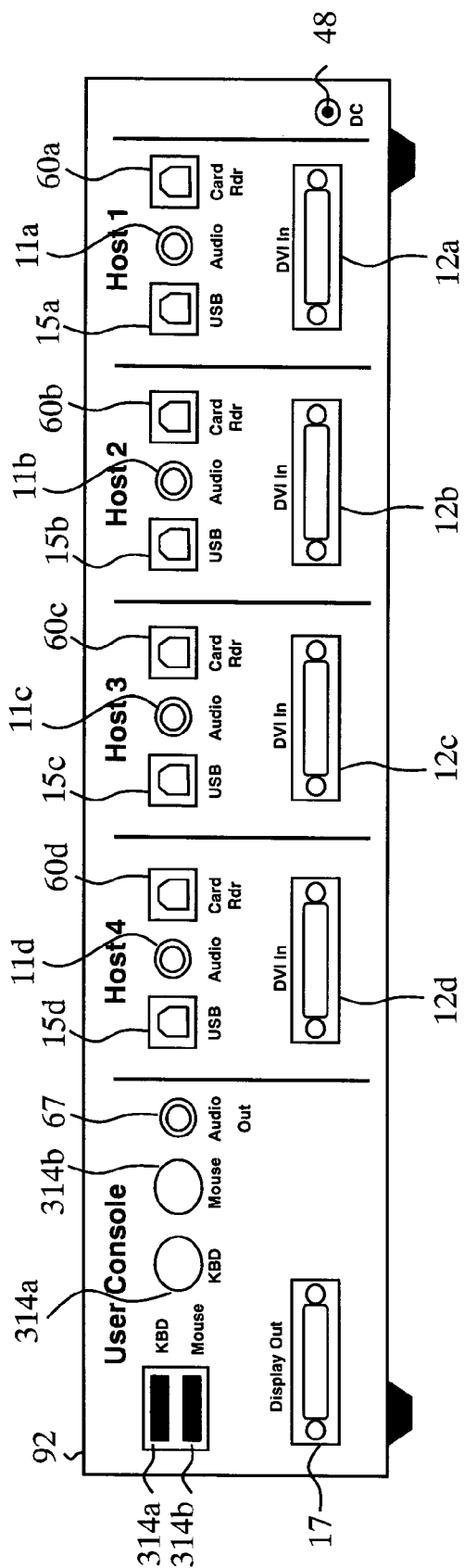
FIG. 16 illustrates a simplified diagram of the rear panel of the preferred embodiment of the present invention similar to the 4-host channels Secure KVM embodiment illustrated in FIGS. 6 to 14 above.

According to the exemplary embodiment of the invention, the KVM device is expected to be used primarily in its normal mode. Thus, reset and "on/off" switches were eliminated and power-up mode is entered by unplugging and re-plugging the power cord. However, should be noted that these functions may be added, FIG. 16 illustrates a rear panel 92 of the Secure KVM of the preferred embodiment shown in FIGS. 6 to 14 above.

In this figure, host interfaces comprises of host video ports 12a, 12b, 12c and 12d; host peripheral ports 15a, 15b, 15c and 15d; audio input jacks 11a, 11b, 11c and 11d; and optional card reader ports 60a, 60b, 60c and 60d are coupled to hosts 6a, 6b, 6c and 6d respectively.

User console panel area comprises of:
  keyboard and mouse stacked USB jacks comprises of:
    USB keyboard jack 314a; and
    USB mouse jack 314b;
  PS/2 keyboards jack 314a;
  PS/2 mouse jack 314b;
  audio out jack 67 and
  display video output port 17.
  DC or AC power jack 48 also located at the rear panel.

Figure 17:
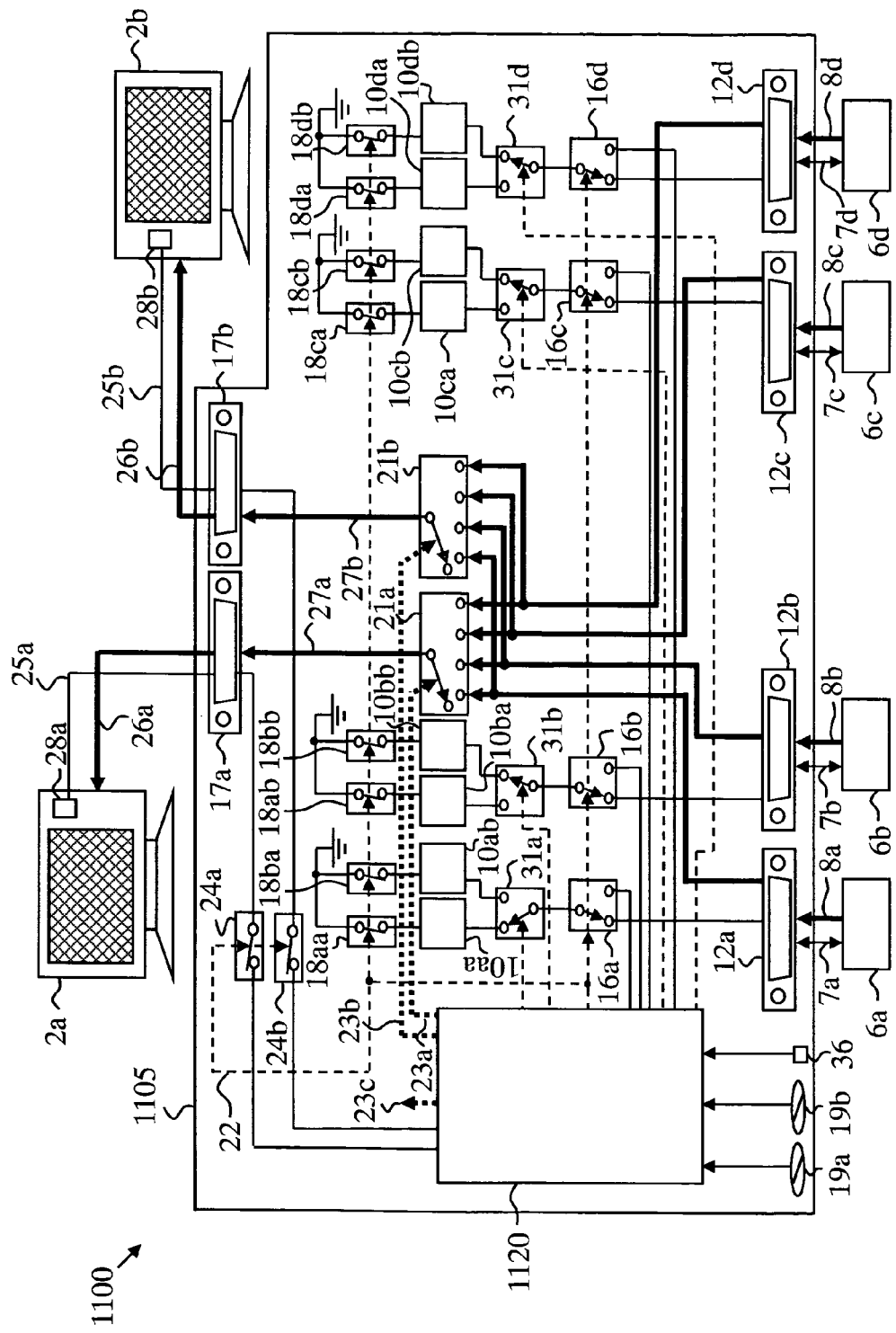
FIG. 17 illustrates a high-level block-diagram of yet another preferred embodiment of the present invention having a secure KVM, four hosts and dual displays. The secure KVM shown in this figure is in Normal Mode.

FIG. 17 illustrates a high-level block diagram of another preferred embodiment of the present invention having two user displays and two Plug and Play emulated memory devices per host channel.

In this FIG. 17 system 1100 is a 4-ports Secure KVM embodiment 1105 of the present invention attached to two displays (2a and 2b) simultaneously. In this FIG. 15 and in the following FIGS. 18 to 20, 22, 23,27 and 28, the peripheral sub-system is not shown for drawing clarity. Peripheral sub-system implementation is similar to the secure KVM 5, 905 or 1005 of FIGS. 6, 9 and 14 respectively.

User may select host source to display on user display 2a using selector switch or push-buttons 19a and host source to display on user display 2b using selector switch or push-buttons 19b. Host selection may be done also through pre-programmed key combinations detected by controller function 1120.

The four host video ports 12a, 12b, 12c and 12d are connected in parallel to two video switches or multiplexers 21a and 21b to allow video signal switches from each host to one of the connected displays 2a and 2b. Video switch or multiplexer 21a is connected through display video output port 17a to user display 2a and video switch or multiplexer 21b is connected through display video output port 17b to user display 2b. The two video switches or multiplexers 21a and 21b are independently controlled by the controller function 1120 through two separate channel select lines to enable independent selection of host source for the two user displays.

EDID sub-system is similar to the EDID sub-system of the Secure KVM 5 of FIGS. 6 to 8 above, but is partially duplicated to support dual displays of different types. The four EDID mode select switches 16a, 16b, 16c and 16d can switch the DPPEM devices to the controller function 1120 or to the four host video ports 12a, 12b, 12c and 12d respectively. The four EDID mode select switches 16a, 16b, 16c and 16d are connected to their respective DPPEM devices through right-left selector switches 31a, 31b, 31c and 31d respectively. Right-left selector switch selects between left DPPEM 10aa and right DPPEM 10ab based on commands from controller function 1120.

There are eight write-protect switches 18 in this embodiment to support the two independent DPPEM devices 10xa and 10xb of each port. For example DPPEM device 10ab is connected to mode switch 16ab and write-protect switch 18ab etc.

In this FIG. 17, the secure KVM 1105 is in Read Mode.

To enter Read Mode the controller function 1120 drives the KVM mode select line 22 to perform the following:
1. Switch all mode switches to the left position—DPPEM devices 10aa to 10db are connected to left-right switches 31 and disconnected from controller function 1120.
2. Close all eight write-protect switches 18aa to 18db to protect the DPPEM devices from writing attempts.
3. Close the two EDID Read switches 24a and 24b to enable controller function 1120 reading displays 2a and 2b EDID EEPROM 28a and 28b.

The Secure KVM 1105 in this figure is shown in Read Mode. The Secure KVM 1105 enters this mode at initial power on or when displays are connected for the first time. In this mode the controller function 1120 is reading the two EDID EEPROM devices 28a and 28b. Both video switches 21a and 21b and the peripheral switch (not shown here) are positioned to KVM inactive state. When reading is completed, controller function 1120 switches the secure KVM 1105 to Write Mode as shown in FIG. 18 below.

Figure 18:
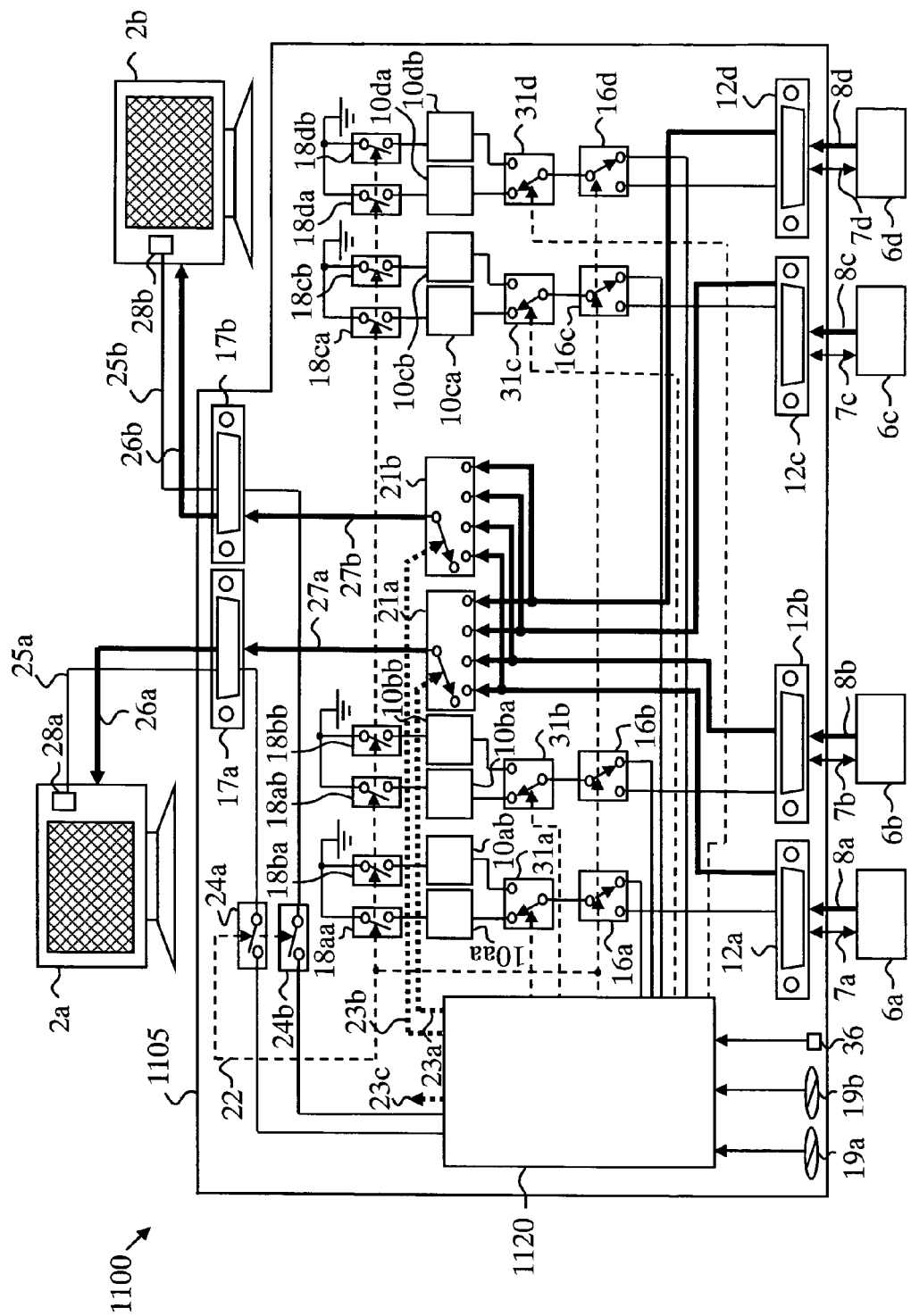
FIG. 18 illustrates a high-level block-diagram of the same preferred embodiment of the present invention illustrated in FIG. 17 above shown in this figure is in Write Mode.

FIG. 18 illustrates a high-level block diagram of the same preferred embodiment of the present invention illustrated in FIG. 17 above in Write Mode.

To enter Write Mode the controller function 1120 drives the KVM mode select line 22 to perform the following:
1. Switch the four EDID mode select switches 16a to 16b to isolate the eight DPPEM devices 10aa to 10db from the host video ports 12a to 12d and connect them to the controller function 1120 I²C ports.
2. Open the eight write-protect switches 18aa to 18db to enable DPPEM 10 writing.
3. Open the two EDID read switches 24a and 24b to isolate the display EDID EEPROM 28a and 28b from the controller function 1120.

Controller function 1120 may now access all eight DPPEM simultaneously through dedicated clock and data lines or access it sequentially to write left and right displays EDID data to each port DPPEM devices. Controller function 1120 writes to DPPEM devices 10aa, 10ba, 10ca and 10da the EDID information that it was previously read from EDID EEPROM 28a of left display 2a. Similarly, controller function 1120 writes to DPPEM devices 10ab, 10bb, 10cb and 10db the EDID information that it was previously read from EDID EEPROM 28b of right display 2b. Once all eight DPPEM devices 10 has been written and optionally read and compared for verification, the controller function 1120 switches the Secure KVM device 1105 to Normal Mode.

During Write Mode all Secure KVM peripheral and video functions are disabled.

Figure 19:
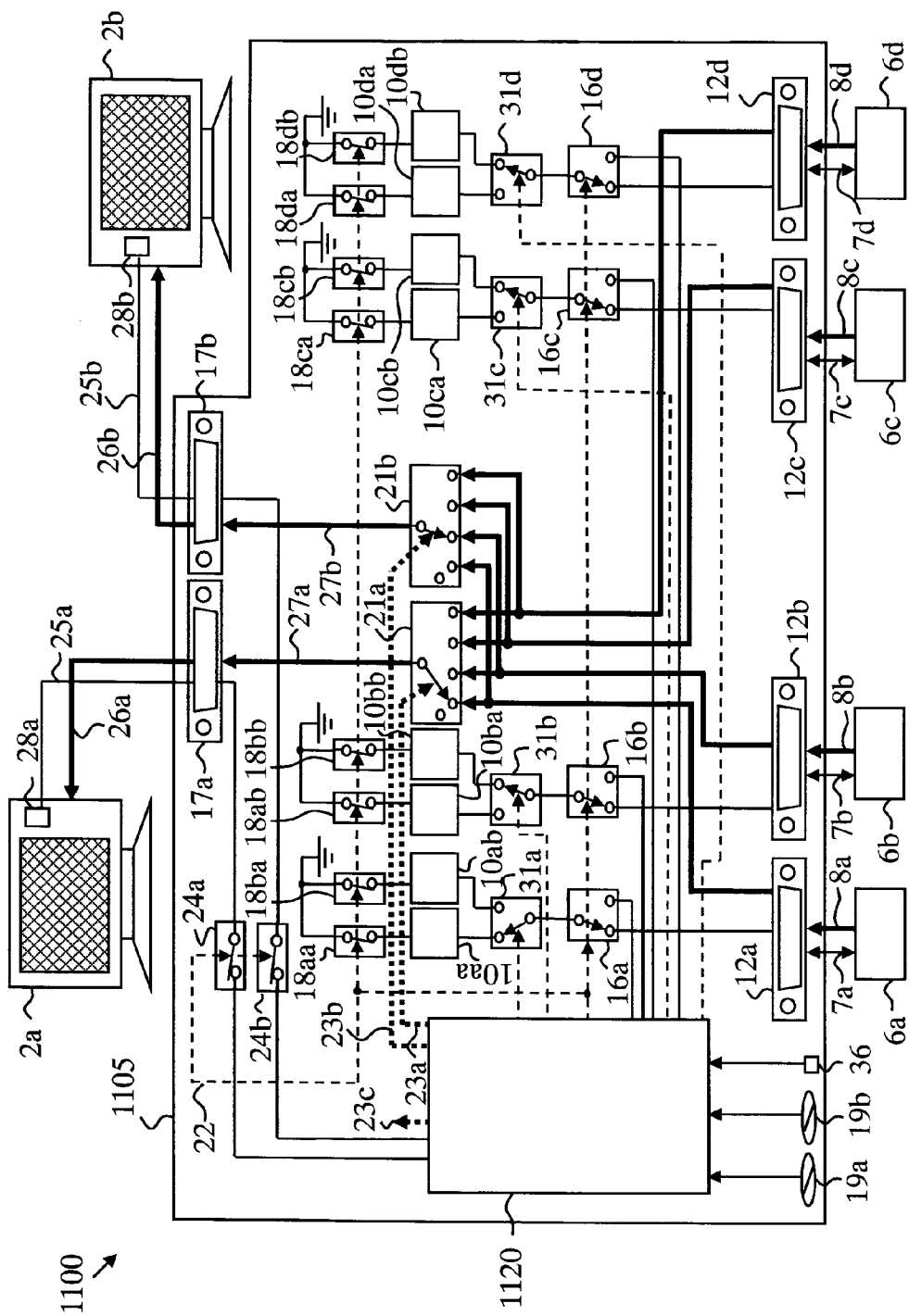
FIG. 19 illustrates a high-level block-diagram of the same preferred embodiment of the present invention illustrated in FIGS. 17 and 18 above shown in this figure is in Normal Mode.

FIG. 19 illustrates a high-level block diagram of the same preferred embodiment of the present invention illustrated in FIGS. 17 and 18 above in Normal Mode.

To enter this mode the controller function 1120 drives the KVM Mode select line 22 to perform the following:
1. Switch the four EDID mode select switches 16a to 16b to connect the eight DPPEM devices 10aa to 10db back to the host video ports 12a to 12d and to isolate all DPPEM devices from the controller function 1120 I²C ports.
2. Switch respective DPPEM devices write-protect switches 18aa to 18db to switch to protected state to disable writing attempts.
3. Close the two EDID Read switches 24a and 24b to connect back displays EDID EEPROM 28a and 28b to controller function 1120.

User may select left display host through selectors or push-buttons 19a and right display host through selectors or push-buttons 19b. User may also toggle the keyboard and mouse through peripheral toggle switch or push buttons 36. This switch allows the user to work (using the mouse and keyboard) on the right display selected host or left display selected host.

User may use pre-programmed keys combination to toggle between displays or change hosts for each display. Controller function 1120 uses separate channel select lines 23a, 23b and 23c to control left video switch 21a, right video switch 21b and peripheral switch respectively.

For example in this figure, assuming that display 2a and 2b are different type:
Host 6a is reading left DPPEM device 10aa reflecting display 2a EDID;
Host 6b is reading right DPPEM device 10bb reflecting display 2b EDID;
Host 6c is reading right DPPEM device 10cb reflecting display 2b EDID;
Host 6d is reading right DPPEM device 10db reflecting display 2b EDID;

In this figure, left display 2a is connected to first host 6a and right display is connected to second host 6b. Controller function 1120 control the four left-right select switches 31a, 31b, 31c and 31d. The control algorithm in controller function 1120 may reduce display changes for attached hosts by leaving last source selected for non-selected hosts. In this figure the two non-selected hosts 6c and 6d are switched to the right DPPEM devices 10cb and 10db respectively.

It is possible to design a similar dual display secure KVM apparatus of the present invention having less controller function I²C lines or only one DPPEM device per port as shown in next figures.

Figure 20:
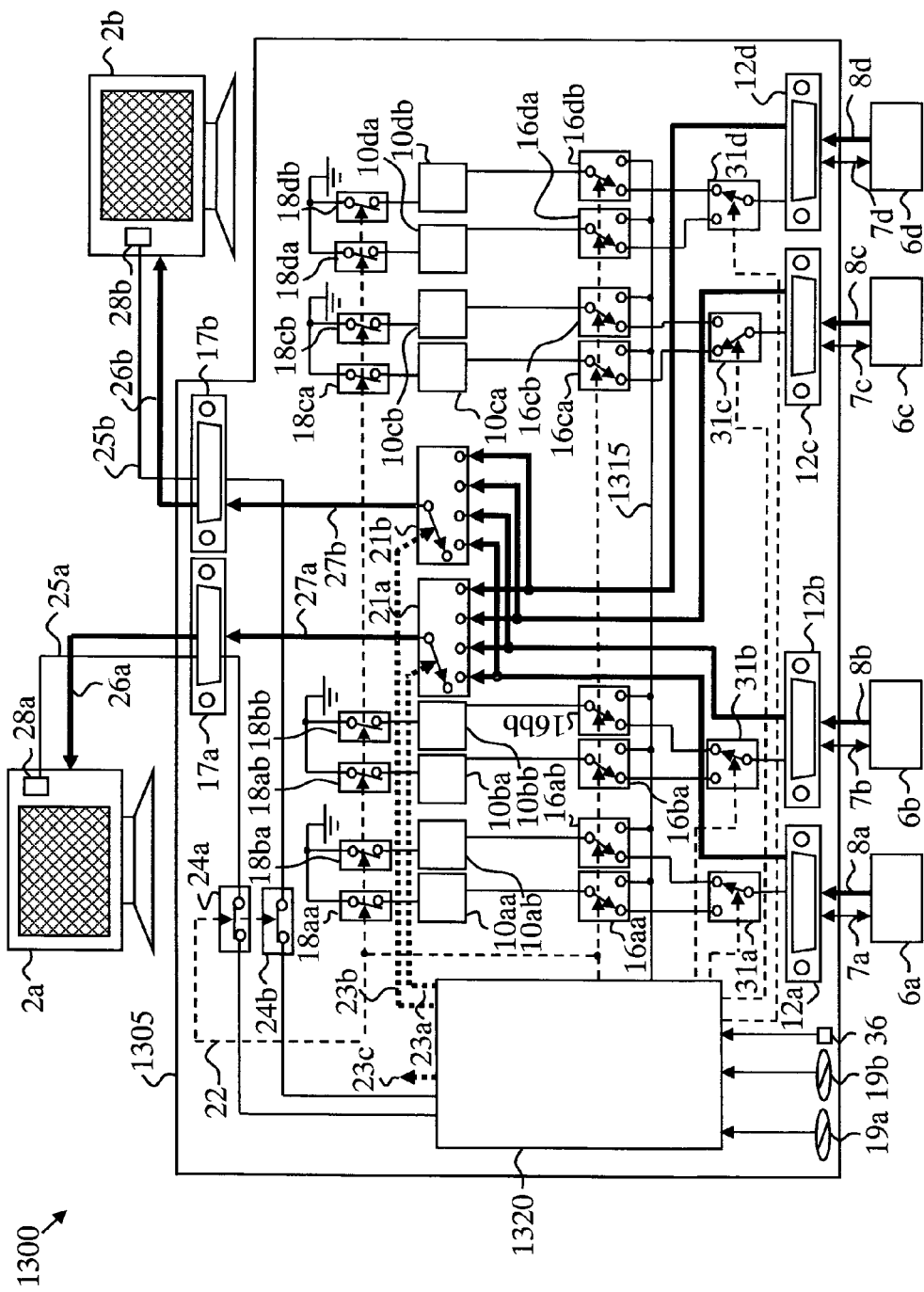
FIG. 20 illustrates a high-level block-diagram of yet another preferred embodiment of the present invention having a secure KVM, four hosts and dual displays and having 8 EDID emulated memory devices with address change logic. The secure KVM shown in this figure is in Read Mode.

FIG. 20 illustrates a high-level block diagram of yet another preferred embodiment of the present invention having two user displays. In this figure system 1300 is a 4-ports Secure KVM embodiment 1305 of the present invention attached to two displays (2a and 2b) simultaneously and having two DPPEM devices per port having address change logic. In this figure the peripheral sub-system is not shown for drawing clarity. Peripheral sub-system implementation is similar to the secure KVM 1105 of FIGS. 17 to 19 above. This secure KVM implementation 1305 of the present invention is similar to the KVM 1105 of the previous drawings but in this implementation all eight DPPEM devices are sharing the same I²C bus 1315 in Write Mode to reduce controller function 1320 complexity, pin-count and cost.

Figure 23:
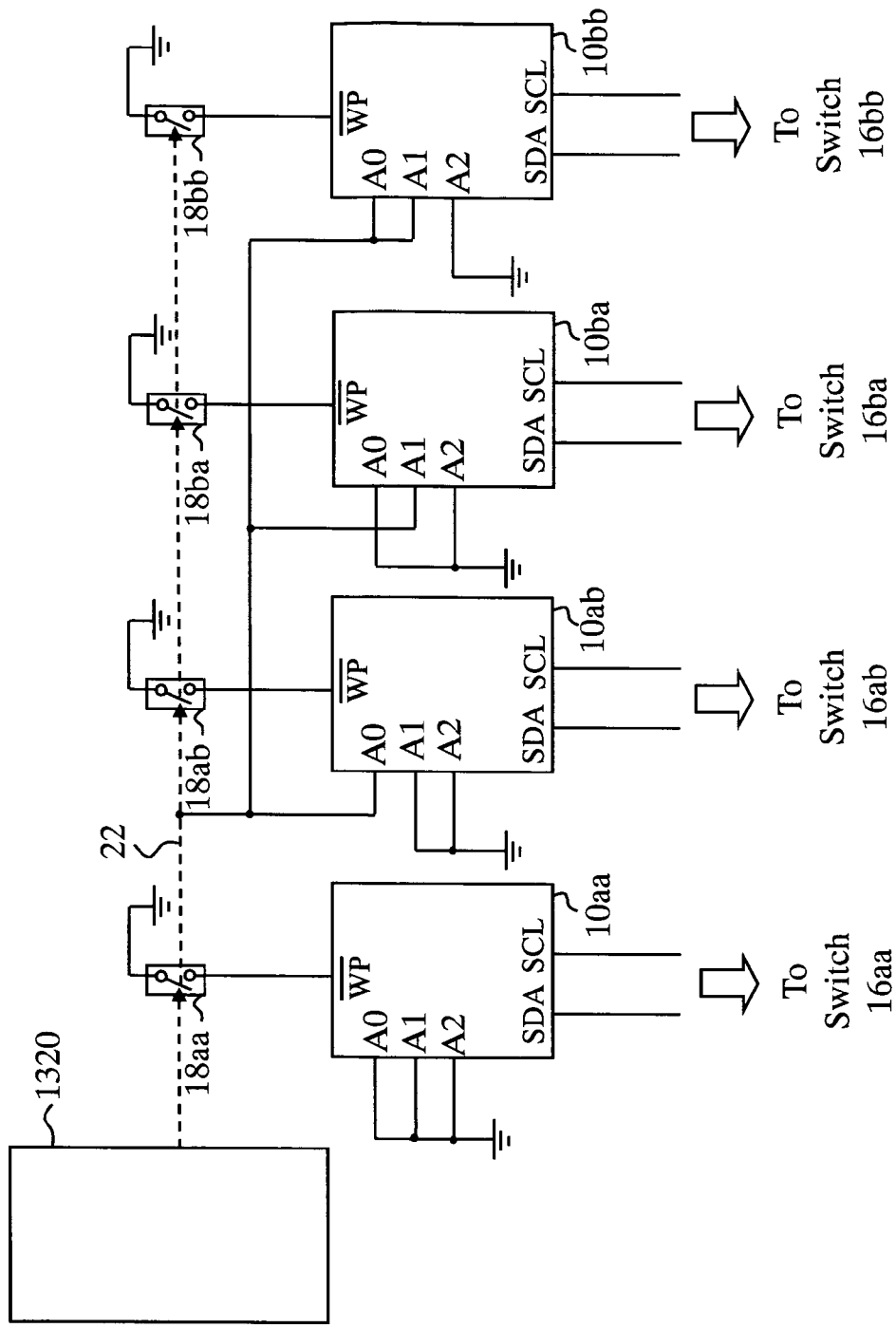
FIG. 23 illustrates a more detailed block diagram of the addressing change logic of the secure KVM of the current invention illustrated in FIGS. 20 to 22 above.

In this arrangement some of the eight DPPEM devices are having address change logic shown in FIG. 23 bellow to change address of devices only in Write Mode.

In Normal Mode, DPPEM devices must be switched to 00h address to comply with EDID standards.

In this FIG. 209, the secure KVM 1305 is in Read Mode.

To enter Read Mode the controller function 1320 drives the KVM Mode select line 22 to perform the following:
1. Position all EDID mode select switches 16aa to 16bd to the left position—all eight DPPEM devices are connected to left-right switches 31 and disconnected from controller function 1320.
2. Close all eight write-protect switches 18aa to 18db to protect the DPPEM devices from writing attempts.
3. Close the two EDID Read switches 24a and 24b to enable controller function 1320 reading displays 2a and 2b EDID EEPROM 28a and 28b.

Once display EEPROM reading is completed controller function 1320 change secure KVM mode to Write Mode as sown in next figure.

Figure 21:
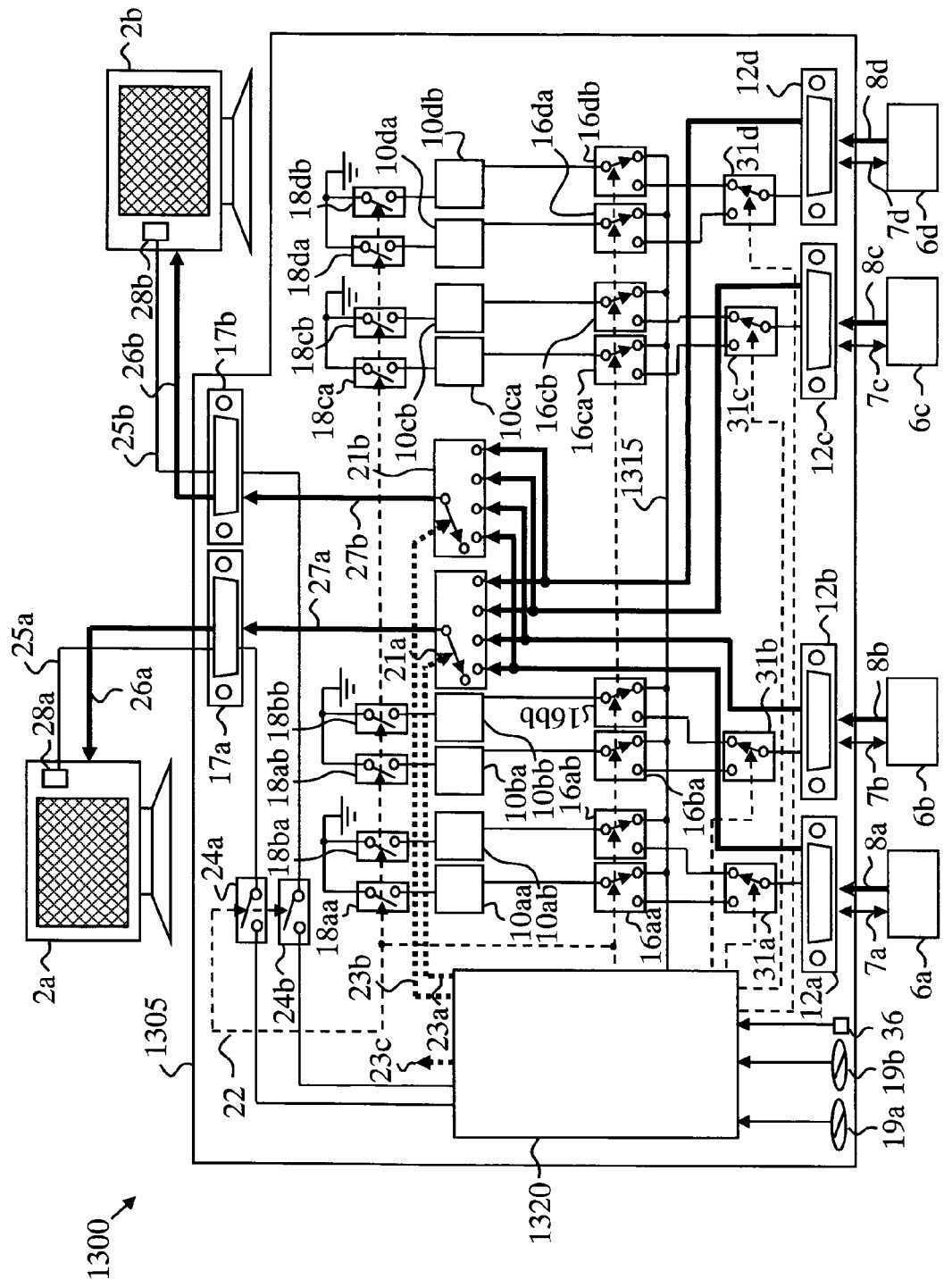
FIG. 21 illustrates a high-level block-diagram of the same preferred embodiment of the present invention illustrated in FIG. 20 above. The secure KVM shown in this figure is in Write Mode.

FIG. 21 illustrates a high-level block diagram of the same preferred embodiment of the present invention illustrated in FIG. 20 above in Write Mode.

To enter the Write Mode the controller function 1320 drives the KVM Mode select line 22 to perform the following:
1. Switch the eight EDID mode select switches 16aa to 16db to isolate the eight DPPEM devices 10aa to 10db from the host video ports 12a to 12d and to connect them to the controller function 1320 common I²C port 1315.
2. Open the eight write-protect switches 18aa to 18db to enable DPPEM 10 writing.
3. Open the two EDID read switches 24a and 24b to isolate the display EDID EEPROM 28a and 28b from the controller function 1320.
4. In this configuration the KVM Mode select line 22 is also used to modify some DPPEM addresses as shown in FIG. 23 bellow.

Controller function 1320 may now access all eight DPPEM sequentially through the common I²C port 1315 at different addresses. Controller function 1320 writes to DPPEM devices 10aa, 10ba, 10ca and 10da the EDID information that it was previously read from EDID EEPROM 28a of left display 2a. Similarly, controller function 1320 writes to DPPEM devices 10ab, 10bb, 10cb and 10db the EDID information that it was previously read from EDID EEPROM 28b of right display 2b. Once all eight DPPEM devices 10 has been written and optionally read and compared for verification, the controller function 1320 switches the Secure KVM device 1105 to Normal Mode.

It should be noted that during Write Mode all Secure KVM peripheral and video functions are disabled.

Figure 22:
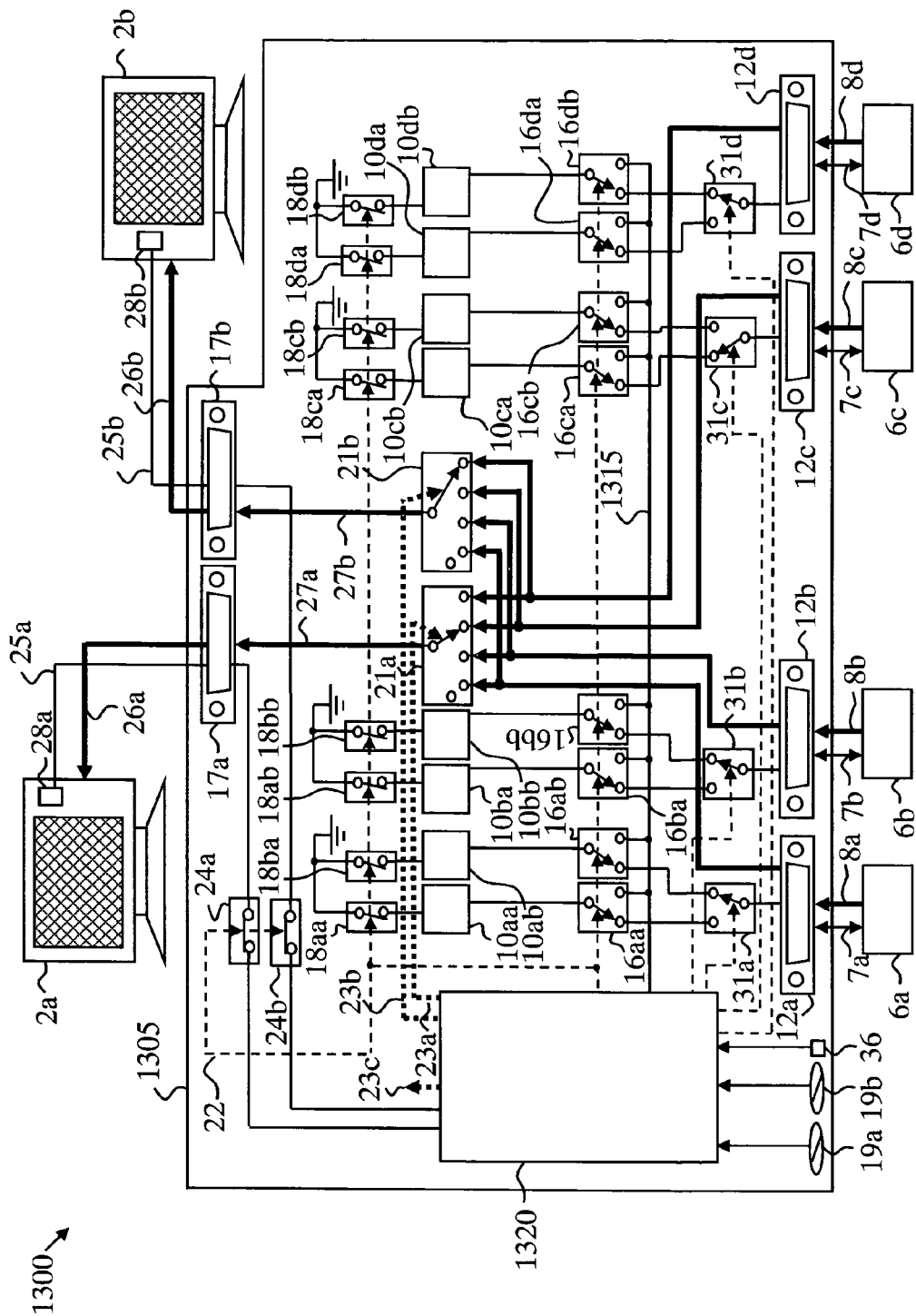
FIG. 22 illustrates a high-level block-diagram of the same preferred embodiment of the present invention illustrated in FIGS. 20 and 21 above. The secure KVM shown in this figure is in Normal Mode.

FIG. 22 illustrates a high-level block diagram of the same preferred embodiment of the present invention illustrated in FIGS. 20 and 21 above in Normal Mode.

To enter the Normal Mode the controller function 1320 drives the KVM Mode select line 22 to perform the following:
1. The eight EDID mode select switches 16aa to 16db are switched to connect the eight DPPEM devices 10aa to 10db back to the host video ports 12a to 12d and to isolate all DPPEM devices from the controller function 1320 I²C ports.
2. Switch respective DPPEM devices write-protect switches 18a to 18d to switch to protected state to disable writing attempts.
3. Close the two EDID Read switches 24a and 24b to connect back displays EDID EEPROM 28a and 28b to controller function 1320.

Connection of the eight DPPEM to the host video ports is done through four left-right switches 31a to 31d to enable controller function 1320 to independently select the DPPEM source for each host.

User may select now left display host through push-buttons 19a and right display host through push-buttons 19b. User may also toggle the keyboard and mouse through peripheral toggle switch 36. This switch allows the user to work on the right selected display or left selected display User may use pre-programmed keys combination to toggle between displays or change hosts for each display. Controller function 1320 uses separate channel select lines 23a, 23b and 23c to control left video switch 21a, right video switch 21b and peripheral switch respectively.

For example in this figure, assuming that display 2a and 2b are different type:
  Host 6a is reading right DPPEM device 10ab reflecting display 2b EDID;
  Host 6b is reading right DPPEM device 10bb reflecting display 2b EDID;
  Host 6c is reading left DPPEM device 10ca reflecting display 2a EDID;
  Host 6d is reading right DPPEM device 10db reflecting display 2b EDID;

In this figure, left display 2a is connected to first host 6c and right display is connected to second host 6d. Controller function 1320 control the four EDID right-left select switches 31a, 31b, 31c and 31d. The control algorithm in controller function 1320 may reduce display changes for attached hosts by leaving last source selected for non-selected hosts. In this figure the two non-selected hosts 6a and 6b are switched to the right DPPEM devices 10ab and 10bb respectively.

FIG. 23 illustrates a more detailed block diagram of the controller function 1320 and four DPPEM 10aa to 10bb of the Secure KVM 1305 shown in FIGS. 20 to 22 above. In this figure three of the four DPPEM devices are further connected to KVM Mode select line 22 to enable address change in Write Mode.

During Normal Mode when KVM Mode select line 22 is in logic 0 state, all four DPPEM device address lines are in logic 0 and therefore devices may be properly read at 00h address by hosts 6. As Secure KVM 1305 changes mode to Write Mode, KVM Mode select line 22 is in logic1 state forcing the three DPPEM devices 10ab to 10bb to read different address and thus enabling controller function 1320 to write to them in sequence. Other four DPPEM devices are connected in a similar way and not shown here for clarity. The A2 address line of the other four DPPEM devices is connected to the KVM Mode select line 22 to enable higher address values. Using all three address lines allow generating eight distinct addresses (binary 000 to 111).

Figure 24:
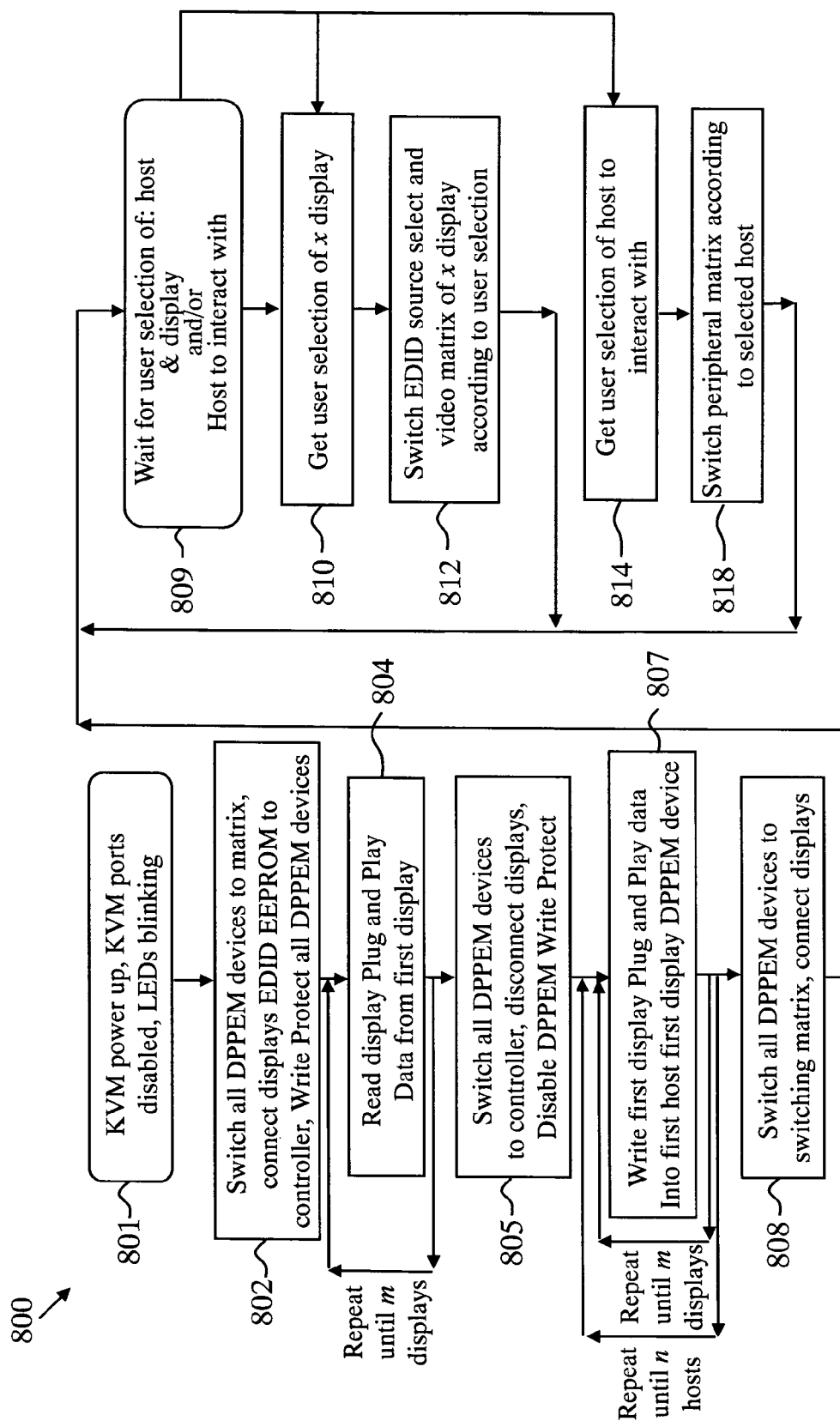
FIG. 24 illustrates a simplified method of operation flow-chart of the preferred embodiment of the present invention similar to the 4-host channels dual displays secure KVM embodiment illustrated in FIGS. 17 to 22. This flow chart is adoptable for secure KVMs having m displays and n hosts.

FIG. 24 illustrates a simplified method of operation flowchart of the preferred embodiment of the present invention similar to the dual display 4 host channel embodiment illustrated in FIGS. 17 to 22 above.

The method 800 illustrated in this figure is adaptable to Secure KVM devices having m displays and n host channels and wherein m>1 and n>2. For clarity, the embodiment is demonstrated herein for the case depicted in FIG. 24

Step 801—Power Up (Disable Ports)

When secure KVM is powered up all KVM inputs and outputs are disabled. Display and peripheral devices are isolated from the hosts. Optionally, controller function 1120 or 1320 may provide user indication that KVM is not ready by blinking panel LEDs.

Step 802—Prepare to Read Display EDID

Following step 801, the controller function performs:
1. Switch all DPPEM devices mode select switches 16 to host video ports or video selection matrix (left position);
2. Close display EDID read switches 24a and 24b (connect the display EDID lines to the controller function); and
3. Close all DPPEM write protection switches 18 to disable writing attempts.

Controller function 1120 or 1320 may drive the above three actions simultaneously through a single control line—the KVM Mode Select line 22 in FIGS. 17 to 22 above.

Step 804—Read EDID (Repeated m Times)

Following step 802 controller function 1120 or 1320 reads display Plug and Play data from connected displays EEPROM 28. As each connected display 2 may have different EDID—step 804 is repeated m times to read all connected displays 2. Controller function 1120 or 1320 may check the validity of data read from displays before it proceeds to the next step (Write Mode).

Step 804 Defined Here as Read Mode.

Step 805—Prepare to Write DPPEM

Following step 804 controller function 1120 or 1320 drives all DPPEM mode selection switches to the controller function (right position), disconnect display EDID read switches 24 to isolate the displays Plug and Play EEPROM devices 28 from the controller function and open DPPEM 10 write protection switches 18 to enable writing. Similarly to step 802 above, controller function 1120 or 1320 may drive these three actions simultaneously through a single control line—the KVM Mode Select line 22.

Step 807—Write DPPEM (Repeated m×n Times)

Following step 805 controller function 1120 or 1320 writes first display EDID data into the first host DPPEM device 10 and repeat this step until all m×n DPPEM 10 devices are written.

Controller function 1120 or 1320 access to each DPPEM device 10 may be implemented through various options such as: a common bus and manipulated address or through switching circuitry to enable programming of one device at a time.

Step 805 Defined Here as Write Mode.

Step 808—Enter Normal Mode

Following step 807 the controller function 1120 or 1320 performs the following:
1. Switch all DPPEM devices mode select switches to their respective hosts (left position);
2. Close display Plug and Play read switches 24 to enable controller function access; and:
3. Close all DPPEM write protection switches 18 to disable write attempts.

Similarly to step 805 above, controller function may trigger these three actions simultaneously through a single control line—the KVM Mode Select line.

The system is now ready for receiving user host/display selection and selection of host to work with.

Step 809—Wait to Receive Host & Display Selection (Repeated as Needed)

In step 809 controller function 1120 or 1320 waits for user selections through push buttons 19 or pre-programmed keys entered through the user keyboard.

A short delay may be inserted in controller function 1120 or 1320 to avoid situations that fast switching between EDID content will not be detected by the attached host.

Step 810—User Selected Host for x Display

User selects a host channel for display x through push buttons 19 or pre-programmed keys entered through the user keyboard.

Step 812—Connect Host to Selected Display

Once the user had selected a host channel for display x, the controller function 1120 or 1320 drives EDID source selection and video matrix of display x accordingly. Controller function 1120 or 1320 may be programmed to avoid user selection of the same host by more than one display by providing a blinking channel selection LED 35.

Step 814—Receive Interacting Host Selection (Repeated as Needed)

In step 814 the user may switch keyboard and mouse to one of the display selected hosts using a push button 36 or pre-programmed keys combination.

For example in case of a dual display system illustrated in FIG. 22 above, the user may use peripheral toggle switch 36 to interact with host 6c previously selected by the user for the left display 2a (peripheral toggle switch 36 positioned to the left or switch 36a pressed), or to interact with host 6d previously selected by the user for the right display 2b (switch 36 positioned to the right or switch 36b pressed).

It should be noted that user may only select a host to interact that is already assigned to a display. Controller function 1120 or 1320 design and front panel design enable the user to select hosts based on active displays. If display is not visible the user—it status LED will blink and user attempt to interact with the host connected to that display shall be prohibited by controller function due to functional and security reasons.

Controller function 1120 or 1320 may be programmed to enable or disable user attempts to select same host for more than one display. In some cases this options may be useful for example to enable desktop display and a projector to show the same host.

Step 818—Connect Selected Host to Peripherals

Once user had selected the to interact with, the host controller function 1120 or 1320 drives the peripheral switching matrix to that selected host.

Steps 809 to 818 Defined Here as Normal Mode.

During all modes if one or more of the following events occurs, the secure KVM may be programmed to become inactive while blinking LEDs:
4. If a display was physically connected or disconnected to the secure KVM 5. If display EDID information found invalid 6. If tampering event was detected In case of tampering event, the inactive state may be irreversible (permanent).

Figure 25:
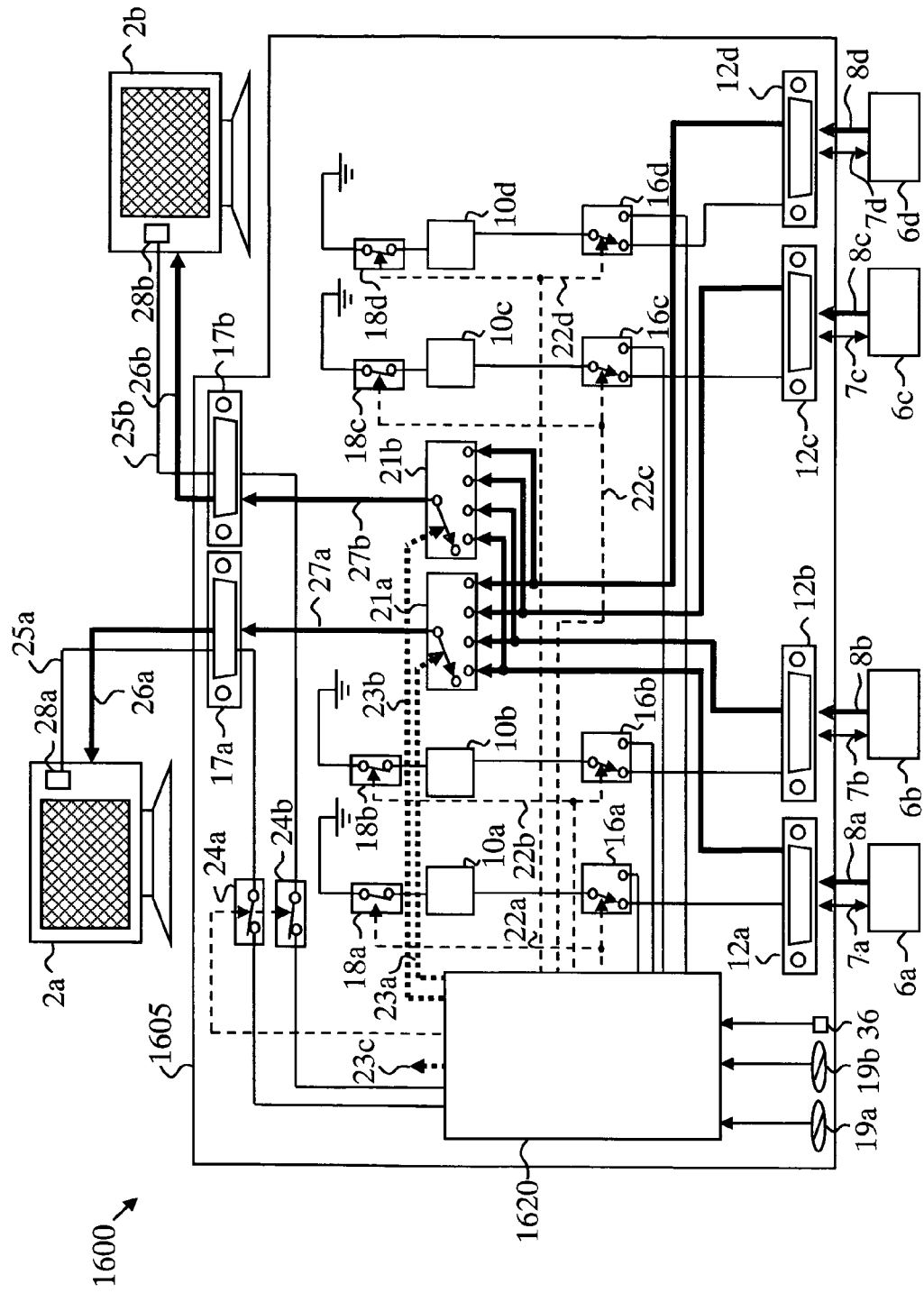
FIG. 25 illustrates a high-level block-diagram of yet another preferred embodiment of the present invention having a secure KVM, four hosts and dual displays and having only 4 EDID emulated memory devices. The secure KVM shown in this figure is in Normal Mode.

FIG. 25 illustrates a high-level block diagram of yet another preferred embodiment of the present invention having two user displays. In this figure system 1600 is a 4-ports Secure KVM embodiment 1605 of the present invention attached to two displays (2a and 2b) simultaneously and having only a single DPPEM device per port. In this figure the peripheral sub-system is not shown for drawing clarity. Peripheral sub-system implementation is similar to the KVM 5, 905 or 1005 of FIGS. 6, 9 and 14 respectively. In this preferred embodiment of the present invention, the four DPPEM devices 10a to 10d may temporarily store a copy of left side display EDID 28a or right side display EDID 28b based on the actual display connected to that host.

Controller function 1620 controls each EDID mode select switch 16a to 16d independently (via lines 22a-22d) to enable DPPEM devices write while other mode select switches 16 are in Normal Mode. Whenever the controller function 1620 finds that there is a need to switch EDID content from right to left display or from left to right, it switches that port to Write Mode and writes the different EDID content.

Since there are less DPPEM devices in this embodiment of the present invention, the cost and complexity of this secure KVM implementation are lower. From security standpoint it is not desirable to change modes of individual host channels while others are in another mode.

In this FIG. 25, the secure KVM 1605 is in Read Mode.

To enter Read Mode the controller function 1620 drives the four independent KVM Mode select lines 22a, 22b, 22c and 22d to:

1. Switch all four EDID mode select switches 16a to 16d to the left position—as a result all four DPPEM devices 10a to 10d are connected to host video ports 12a to 12d respectively and disconnected from controller function 1620.
2. Close all four write-protect switches 18a to 18d to protect the DPPEM devices from writing attempts.
3. Close the two EDID Read switches 24a and 24b to enable controller function 1620 reading displays 2a and 2b EDID EEPROM 28a and 28b.

Once display EEPROM 28 reading is completed controller function 1620 change secure KVM mode to Write Mode as shown in next figure.

Although the Read Mode is short, controller function 1620 may provide user indication such as blinking LEDs to alert the user that KVM is not ready yet.

Figure 26:
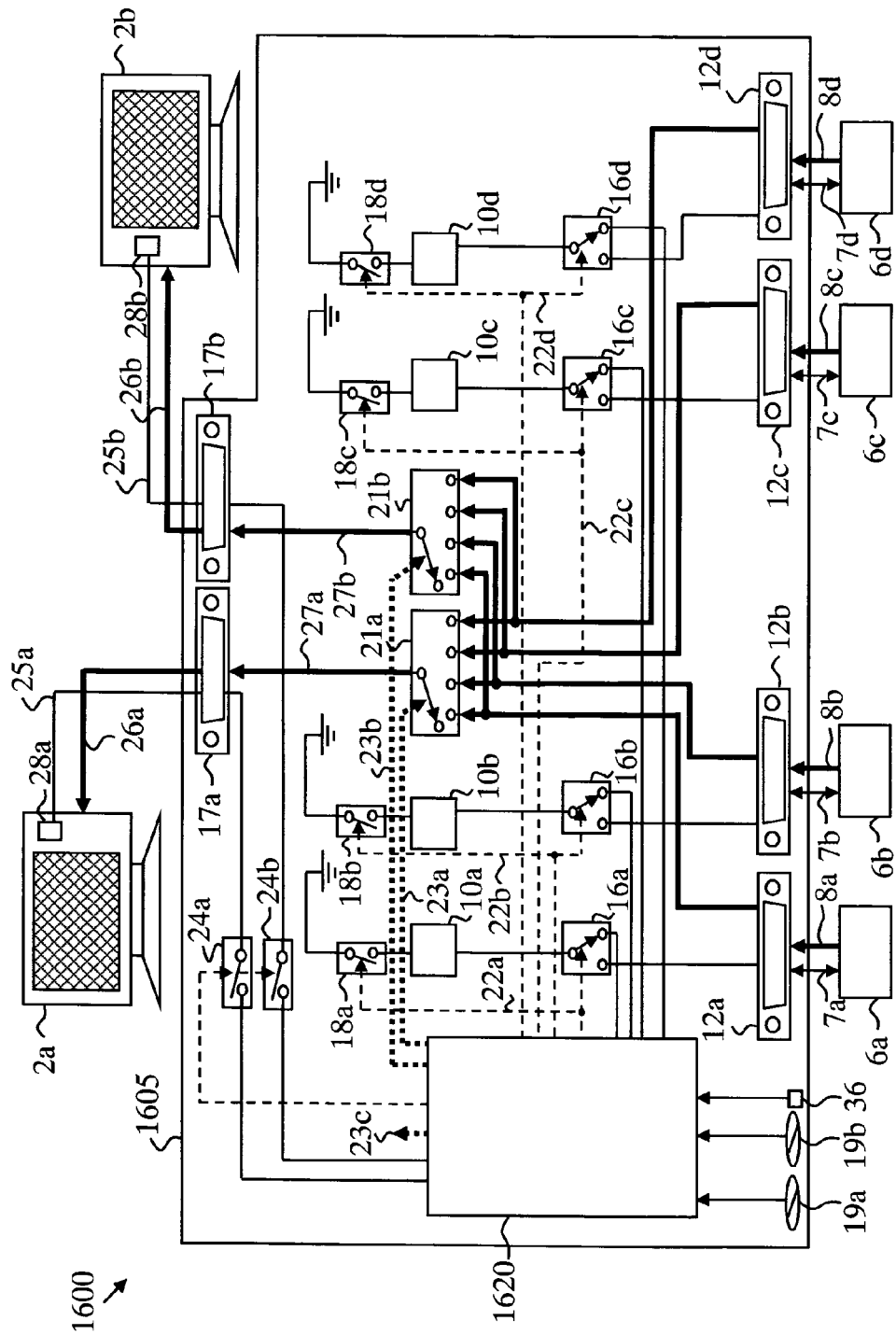
FIG. 26 illustrates a high-level block-diagram of the same preferred embodiment of the present invention illustrated in FIG. 25 above shown here in Write Mode.

FIG. 26 illustrates a high-level block diagram of the secure KVM system 1600 of FIG. 25 above in Write Mode.

To enter the Write Mode the controller function 1620 drives the four independent KVM Mode select lines 22a, 22b, 22c and 22d to:

1. Switch the four EDID mode select switches 16a, 16b, 16c and 16d to the left—connecting respective DPPEM devices 10a to 10d to the controller function 1620 and isolate them from hosts.
2. Open respective DPPEM devices write-protect switches 18a to 18d to enable writing.
3. Open the two EDID Read switches 24a and 24b to isolate displays EDID EEPROM 28a and 28b from controller function 1620.

Once controller function 1620 has positioned all switching it starts writing first display EDID information into each of the four DPPEM devices 10a to 10d.

Once all four DPPEM were programmed with first display EDID the controller function 1620 can switch the KVM to the Normal Mode as shown in next figure.

Although the Write Mode is short, controller function 1620 may provide user indication such as blinking LEDs to alert the user that KVM is not ready yet.

Figure 27:
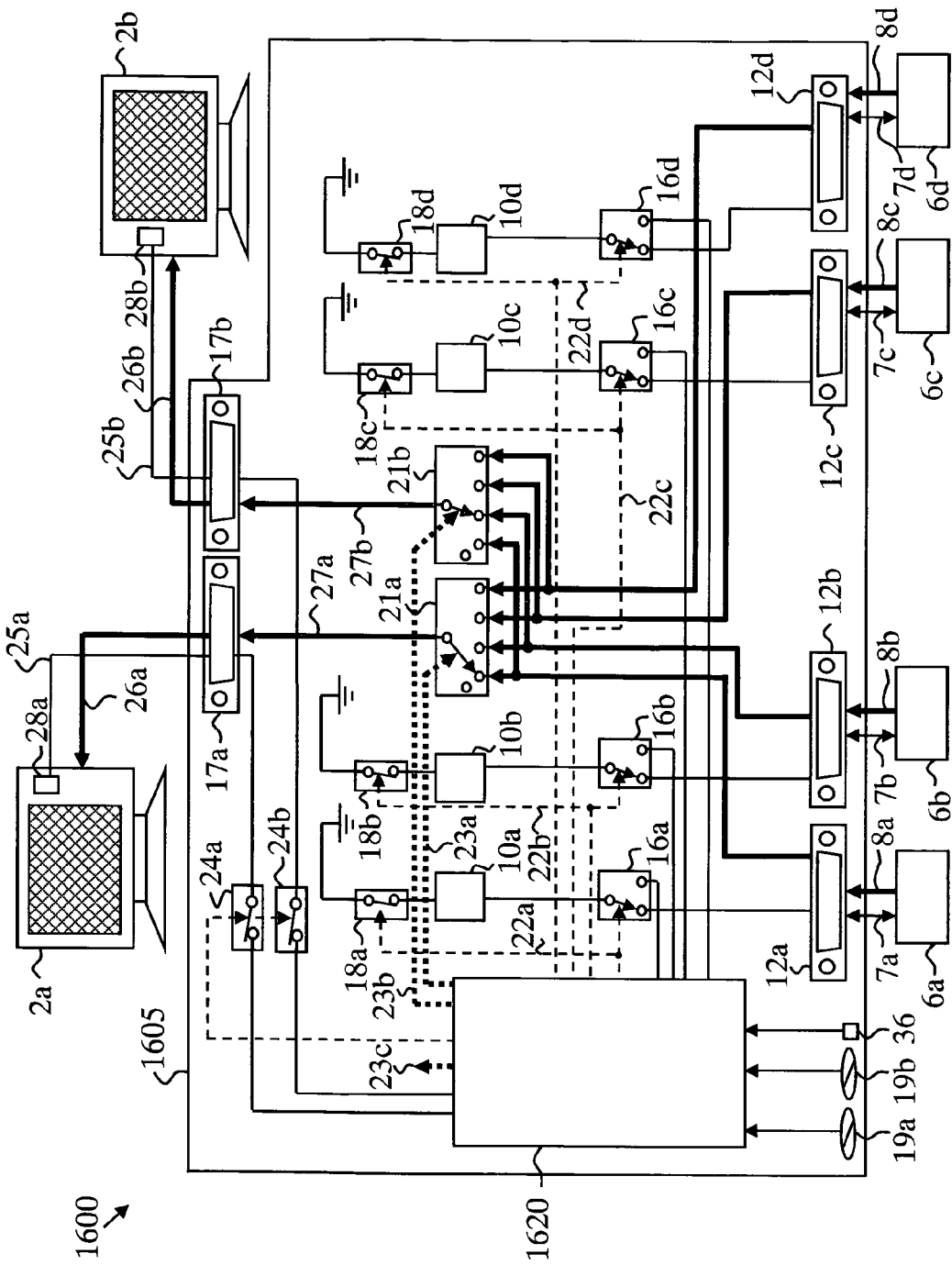
FIG. 27 illustrates a high-level block-diagram of the same preferred embodiment of the present invention illustrated in FIGS. 25 and 26 above. The secure KVM shown in this figure is in Normal Mode.

FIG. 27 illustrates a high-level block diagram of the secure KVM system 1600 of FIGS. 25 and 26 above in Normal Mode.

To enter the Normal Mode the controller function 1620 drives the four independent KVM Mode select lines 22a, 22b, 22c and 22d to:

1. Switch the four EDID mode select switches 16a, 16b, 16c and 16d to the right—connecting respective DPPEM devices 10a to 10d to the host video ports 12a to 12d respectively and isolating them from controller function 1620.
2. Close respective DPPEM devices write-protect switches 18a to 18d to disable writing attempts.
3. Close the two EDID Read switches 24a and 24b to connect back displays EDID EEPROM 28a and 28b to controller function 1620.

In this example the user had selected host 6a for the left display 2a and host 6b for the right display 2b.

Unlike other embodiments of the present invention shown above, in this embodiment the controller function may drive a single KVM mode select line to write a single DPPEM during KVM Normal Mode. Controller function firmware will switch to channel write mode whenever that channel was selected by the user for one of the displays but the current EDID programmed in that specific DPPEM device is the data of the other display. This will be shown in the next figure.

Figure 28:
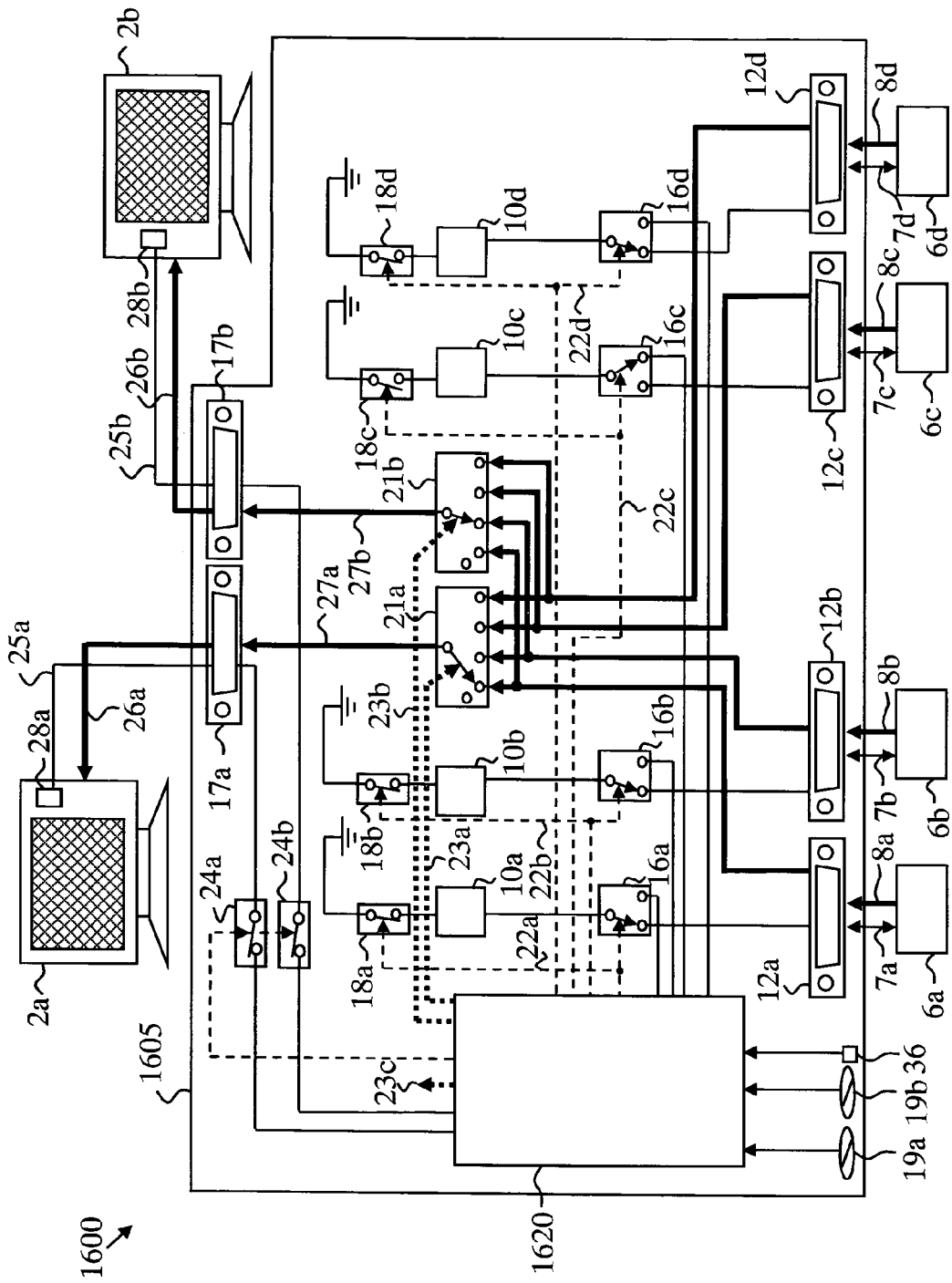
FIG. 28 illustrates a high-level block-diagram of the same preferred embodiment of the present invention illustrated in FIGS. 25 to 27 above. The secure KVM shown in this figure is in Normal Mode while re-writing third DPPEM device.

FIG. 28 illustrates a high-level block diagram of the secure KVM system 1600 of FIGS. 25 to 27 above in Normal Mode. In this example the user has selected a different host to the right display 2b—host 6c and that host DEEPM device 10c was previously programmed with the left display EDID and therefore controller function 1620 needs to write right EDID information into that DEEPM device 10c.

To write DEEPM 10c while the KVM device is in Normal Mode, controller function 1620 drives the third KVM Mode select lines 22c to perform the following:

1. Switch the third EDID mode select switch 16c to the right—connecting third DPPEM device 10c to the controller function 1620 and isolating it from the third host video port 12c.
2. Open third DPPEM device write-protect switch 18c to enable writing.
3. Open the two EDID Read switches 24a and 24b to disconnect displays EDID EEPROM 28a and 28b from controller function 1620.

Only after third DPPEM device write has completed, controller function will change back the third channel to Normal Mode and change the KVM right channel select line 21b to position the right video select switch at the third host position.

It should be noted that with this specific implementation user switching between hosts may be slightly delayed to enable DPPEM re-write.

Figure 29:
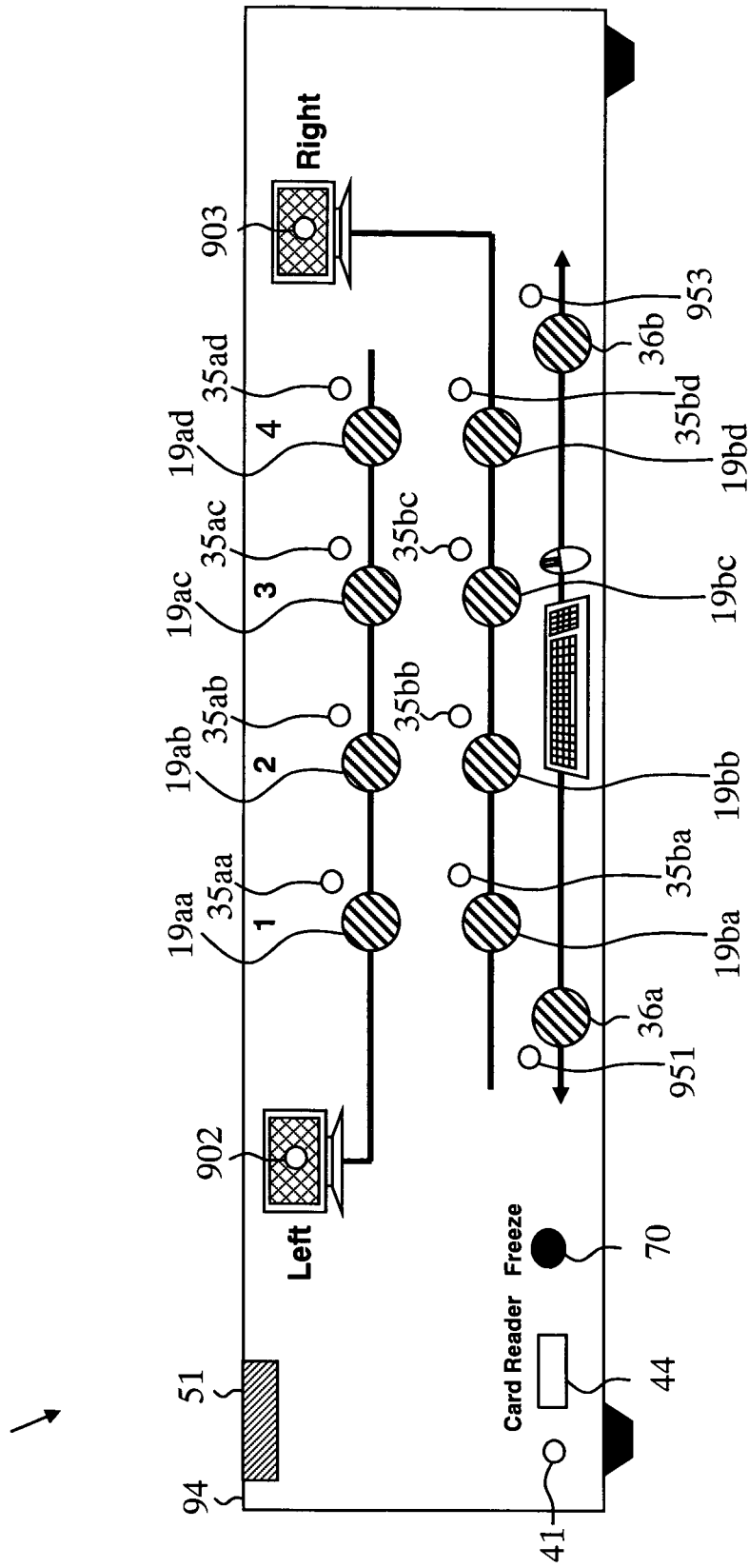
FIG. 29 illustrates a simplified diagram of the front panel of the preferred embodiment of the present invention similar to the 4-host channels and dual displays Secure KVM embodiment illustrated in FIGS. 17 to 28 above.

FIG. 29 illustrates a front panel 94 of the 4-channel dual-display Secure KVM of the preferred embodiment shown in FIGS. 17 to 28 above.

In this figure upper host channel select push buttons 19aa, 19ab, 19ac and 19ad enables user selection of hosts 6a, 6b, 6c and 6d respectively to connect to the left display 2a.

Lower host channel select push buttons 19*ba*, 19*bb*, 19*bc* and 19*bd* enables user selection of hosts 6*a*, 6*b*, 6*c* and 6*d* respectively to connect to the right display 2*b*.

Push buttons may be omitted from the front panel design to increase system security by forcing the user to use the keyboard to perform the host selection, for example using a function key or combination of keys. Using the keyboard clears keyboard entries buffer prior to switching between channels.

Upper LED indicators 35*aa*, 35*ab*, 35*ac* and 35*ad* indicates the left display selected host channel.

Lower LED indicators 35*ba*, 35*bb*, 35*bc* and 35*bd* indicate the right display selected host channel.

Optionally a plurality of indicators, a multi-color indicator such as a bi-color LEDs may be used to indicate attached host status, for example: video signal available/unavailable, selected/not selected.

Left display status LED 902 is used to indicate the status of the left display 2*a*. Similarly right display status LED 903 is used to indicate the status of the right display 2*b*.

Left display keyboard and mouse select switch 36*a* and status LED 951 enable user selection of the left display selected host. Similarly right display keyboard and mouse select switch 36*b* and status LED 953 enable user selection of the right display selected host. Peripheral push button switches 36*a* and 36*b* may be replaced by a single toggle switch 36 with left and right position.

Same switch 36 or switches may be used to select audio source for the user headset or speakers 66. An audio freeze function and switch may be added similar to the dedicated peripheral freeze function illustrated in FIG. 11 above to enable user interaction with one host 6 while performing audio interaction on another host 6.

Card reader or dedicated peripheral port 44 located near the freeze switch 70. Dedicated peripheral port LED 41 located near the port jack 44 to indicate port status.

Front panel 94 may also have audio out jack 67 and audio freeze push button 72 and status LED.

Optional tamper evident label 51 located between the front panel surface and the enclosure cover to indicate possible tampering attempt.

Figure 30:
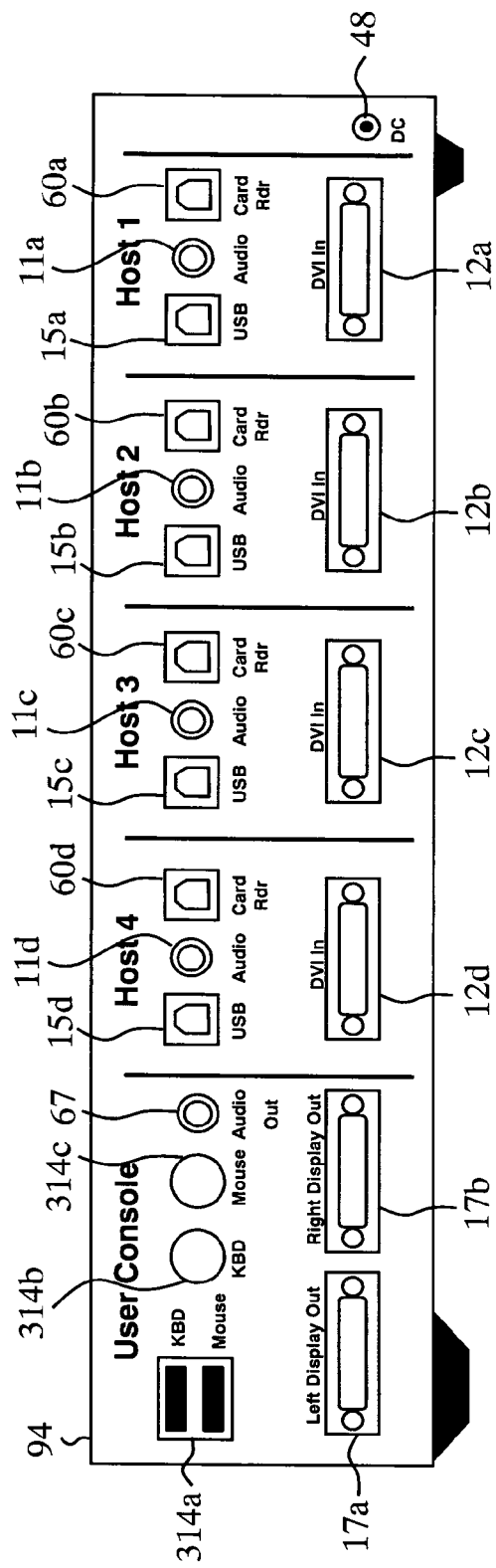
FIG. 30 illustrates a simplified diagram of the rear panel of the preferred embodiment of the present invention similar to the 4-host channels and dual displays Secure KVM embodiment illustrated in FIGS. 17 to 28 above.

FIG. 30 illustrates a rear panel 96 of the 4-channel dual-display Secure KVM of the preferred embodiment shown in FIGS. 17 to 28 above.

In this figure host interfaces comprises of host video ports 12*a*, 12*b*, 12*c* and 12*d*, audio input jacks 11*a*, 11*b*, 11*c* and 11*d*, optional card reader ports 60*a*, 60*b*, 60*c* and 60*d* are coupled to hosts 6*a*, 6*b*, 6*c* and 6*d* respectively.

User console panel area comprises of:
keyboard and mouse stacked USB jacks comprises of:
USB keyboard jack 314*a*; and
USB mouse jack 314*b*;
PS/2 keyboards jack 314*a*;
PS/2 mouse jack 314*b*;
audio out jack 67; and
two display video output ports 17*a* and 17*b*.
DC or AC power jack 48 also located at the rear panel.

Figure 31:
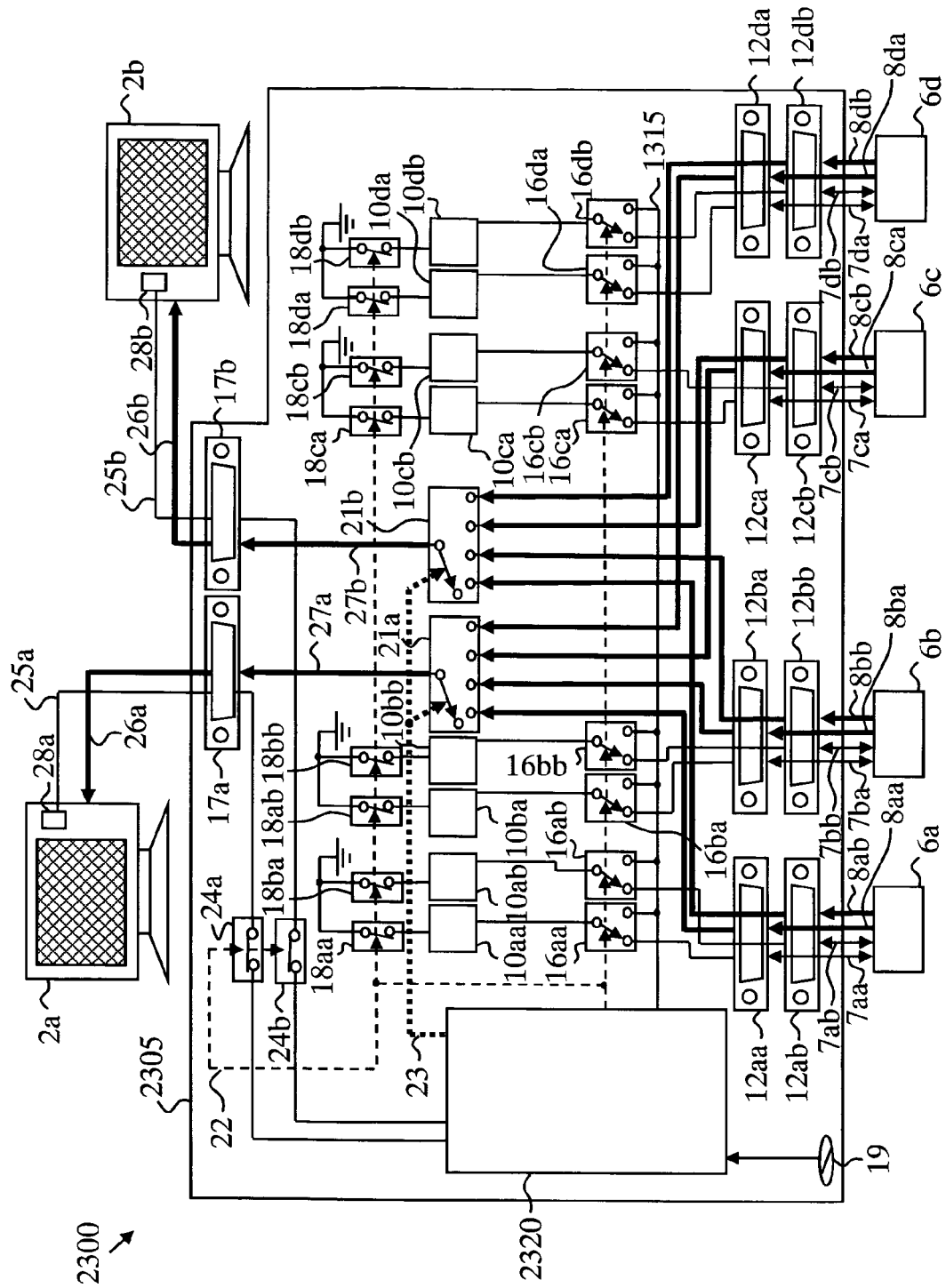
FIG. 31 illustrates a high-level block-diagram of yet another preferred embodiment of the present invention having a 4-host channels, dual-heads secure KVM. The secure KVM shown in this figure is in Normal Mode.

FIG. 31 illustrates a high-level block diagram of yet another preferred embodiment of the present invention having two user displays and two Plug and Play emulated memory devices per host channel and also two host video interfaces for each host channel.

In this FIG. 31 system 1300 is a 4-ports dual head Secure KVM embodiment 2305 of the present invention attached to two displays (2*a* and 2*b*) simultaneously. In this FIG. 31 the peripheral sub-system is not shown for drawing clarity.

Peripheral sub-system implementation is similar to the secure KVM 5, 905 or 1005 of FIGS. 6, 9 and 14 respectively.

User may select host source to display on user displays 2*a* and 2*b* using selector switch or push-buttons 19. Once a host is selected by the user, both host displays are shown on the two user displays 2*a* and 2*b*. For example if user selects host 6*b*, the left display 2*a* will receive video from host video port 12*ba* and the right display 2*b* will receive video from host video port 12*bb*. Host selection may be done also through pre-programmed key combinations detected by controller function 2320.

The upper four host video ports 12*aa*, 12*ba*, 12*ca* and 12*da* are connected to the left video switch or multiplexer 21*a* select host source to the left display 2*a* attached through video output port 17*a*.

The upper lower host video ports 12*ab*, 12*bb*, 12*cb* and 12*db* are connected to the right video switch or multiplexer 21*b* select host source to the right display 2*b* attached through video output port 17*b*.

Both left video switch 21*a* and right video select switch 21*b* are derived by the controller function 2320 through KVM channel select line 23.

Each host channel is connected to two isolated DPPEM devices programmed with the EDID of the left and right displays EDID information. For example host 6*a* first video port 12*aa* connected through EDID mode select switch 16*aa* to the left DPPEM device 10*aa* programmed with left display 2*a* EDID information. Same host second video port 12*ab* connected through EDID mode select switch 16*ab* to the right DPPEM device 10*ab* programmed with right display 2*b* EDID information.

There are eight write-protect switches 18*aa* to 18*db* in this embodiment to support the eight independent DPPEM devices 10*xa* and 10*xb* of each port. For example DPPEM device 10*ab* is connected to mode switch 16*ab* and write-protect switch 18*ab* etc.

In this FIG. 31, the secure KVM 2305 is in Read Mode.

To enter Read Mode the controller function 2320 drives the KVM mode select line 22 to perform the following:
1. Switch all eight EDID mode select switches 16*aa* to 16*db* to the left position—to connect DPPEM devices 10*aa* to 10*db* to their respective host video ports 12*aa* to 12*db* and disconnect it from controller function 2320 common I$^2$C bus 1315.
2. Close all eight write-protect switches 18*aa* to 18*db* to protect the DPPEM devices from writing attempts.
3. Close the two EDID Read switches 24*a* and 24*b* to enable controller function 2320 reading displays 2*a* and 2*b* EDID EEPROM 28*a* and 28*b*.

The Secure KVM 2305 in this figure is shown in Read Mode. The Secure KVM 2305 enters this mode at initial power on or when displays are connected for the first time. In this mode the controller function 2320 is reading the two EDID EEPROM devices 28*a* and 28*b*. Both video switches 21*a* and 21*b* and the peripheral switch (not shown here) are positioned to KVM inactive state. When display EDID reading is completed, controller function 2320 switches the secure KVM 2305 to Write Mode as shown in FIG. 32 below.

Figure 32:
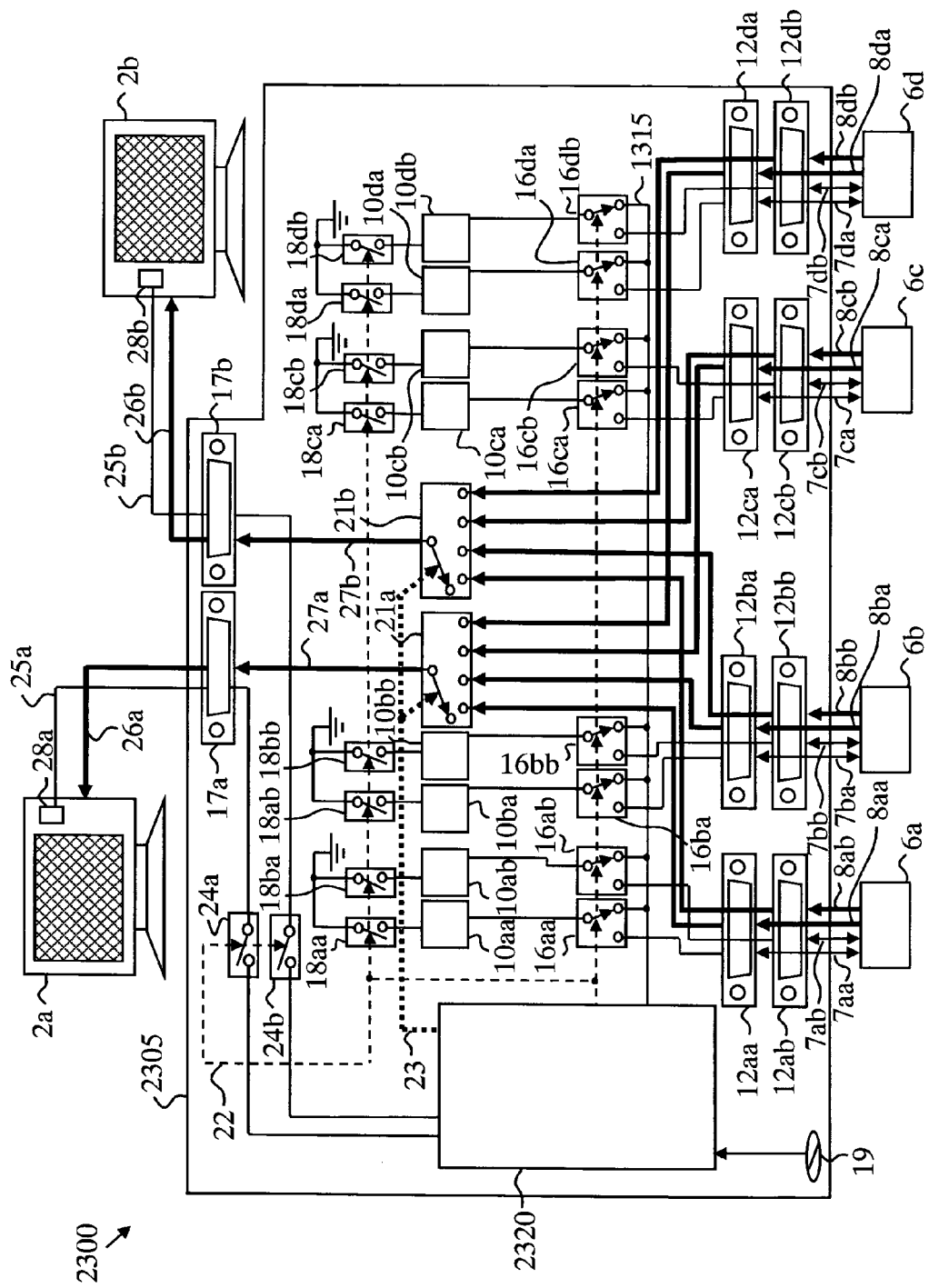
FIG. 32 illustrates a high-level block-diagram of the same preferred embodiment of the present invention illustrated in FIG. 31 above shown here in Write Mode.

FIG. 32 illustrates a high-level block diagram of the same preferred embodiment of the present invention illustrated in FIG. 31 above in Write Mode.

To enter Write Mode the controller function 2320 drives the KVM mode select line 22 to perform the following:
1. Switch the eight EDID mode select switches 16*aa* to 16*db* to isolate the eight DPPEM devices 10*aa* to 10*db* from the host video ports 12*da* to 12*d* and to connect them to the controller function 2320 common I²C bus 1315.
2. Open the eight write-protect switches 18*aa* to 18*db* to enable DPPEM 10 writing.
3. Open the two EDID read switches 24*a* and 24*b* to isolate the display EDID EEPROM 28*a* and 28*b* from the controller function 2320.

Controller function 2320 may now access all eight DPPEM sequentially through common I²C bus 1315 and address switching similar to the detailed view shown in FIG. 23 above.

Controller function 2320 first write left display 2*a* EDID information into DPPEM devices 10*aa*, 10*ba*, 10*ca* and 10*da*. Then it writes right display 2*b* EDID information into DPPEM devices 10*ab*, 10*bb*, 10*cb* and 10*db*

Once all eight DPPEM devices 10*aa* to 10*db* has been written and optionally read and compared for verification, the controller function 2320 switches the Secure KVM device 1305 to Normal Mode.

During Write Mode all Secure KVM peripheral and video functions are disabled.

Figure 33:
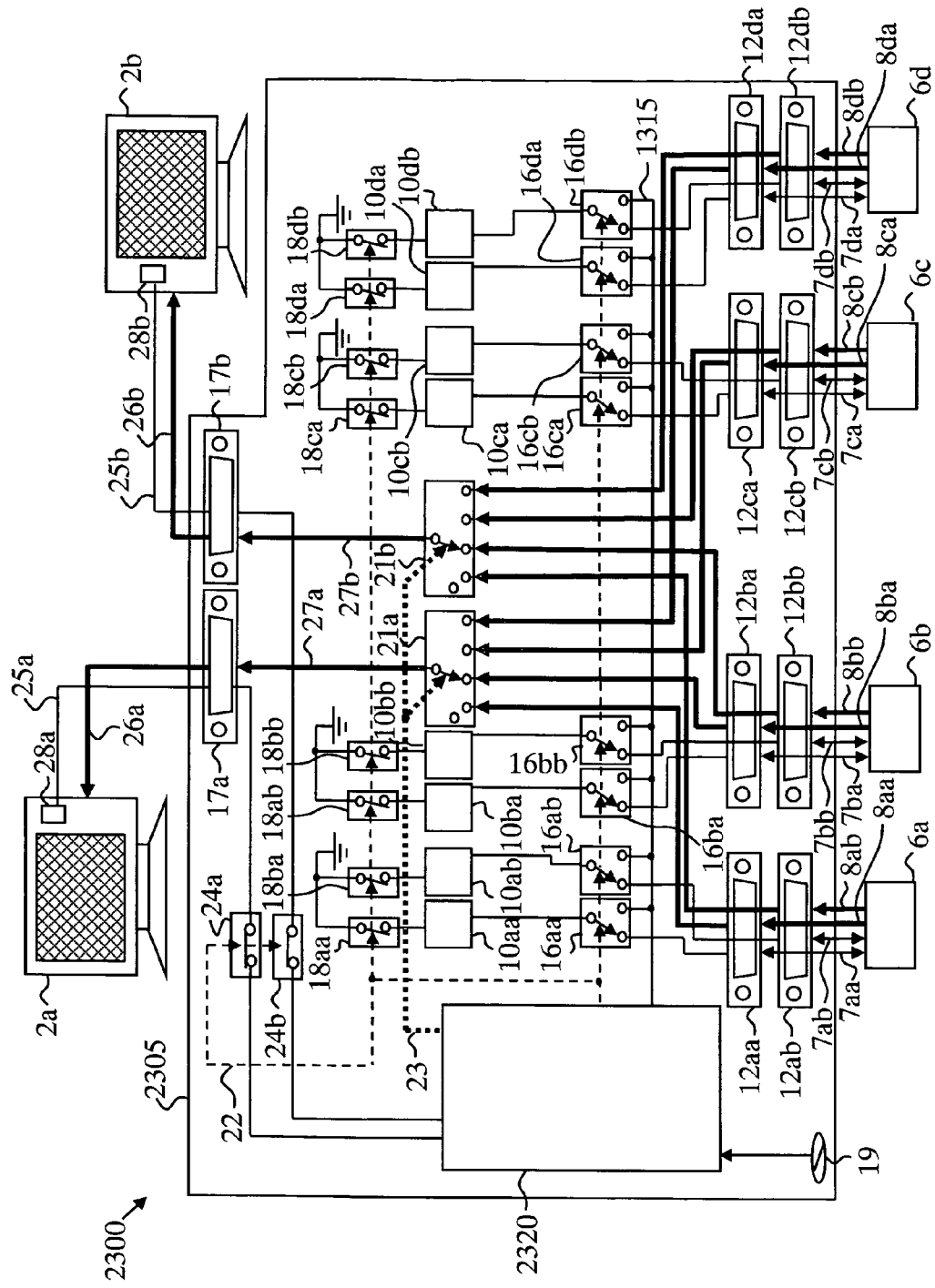
FIG. 33 illustrates a high-level block-diagram of the same preferred embodiment of the present invention illustrated in FIGS. 31 and 32 above. The secure KVM shown in this figure is in Normal Mode.

FIG. 33 illustrates a high-level block diagram of the same preferred embodiment of the present invention illustrated in FIGS. 31 and 32 above in Normal Mode.

To enter this mode the controller function 2320 drives the KVM Mode select line 22 to perform the following:
1. Switch the eight EDID mode select switches 16*aa* to 16*db* to connect the eight DPPEM devices 10*aa* to 10*db* back to the host video ports 12*aa* to 12*db* and to isolate all DPPEM devices 10*aa* to 10*db* from the controller function 2320 common I²C bus 1315.
2. Close the eight write-protect switches 18*aa* to 18*db* to disable DPPEM 10 writing attempts.
3. Close the two EDID read switches 24*a* and 24*b* to reconnect the display EDID EEPROM 28*a* and 28*b* to the controller function 2320.

User may now select left and right displays host source through push-buttons 19 or through pre programmed key combinations. When user selected a host source that host first display will be shown on left display 2*a* and that host second display will be shown on right display 2*b*.

Controller function 2320 uses one channel select line 23 to control left video switch 21*a*, right video switch 21*b* and peripheral switch simultaneously.

In this figure the second host 6*b* selected by the user. Left display 2*a* is connected to second host 6*b* first display output and right display 2*b* is connected to second host 6*b* second display output.

Figure 34:
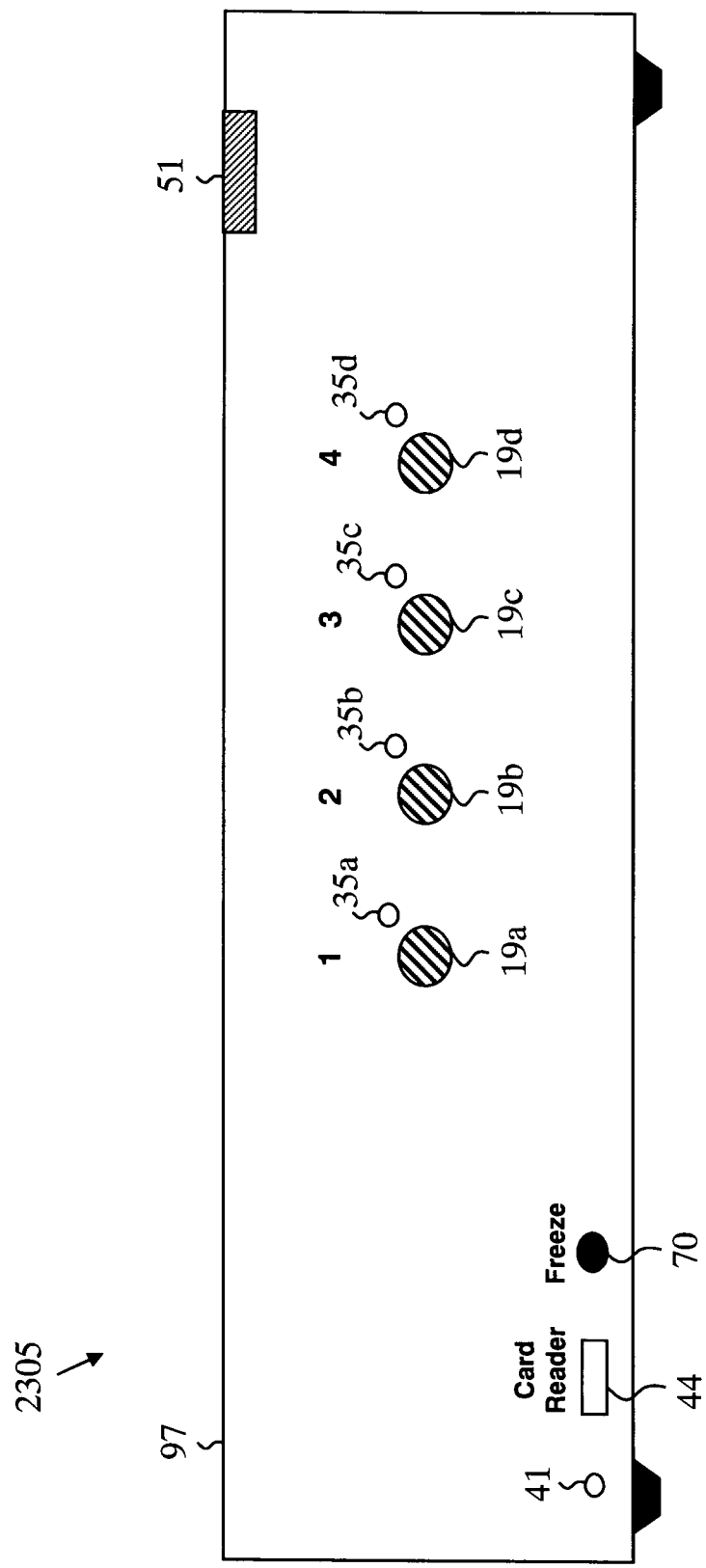

FIG. 34 illustrates a front panel 97 of the 4-channel dual-head Secure KVM 2305 of the preferred embodiment shown in FIGS. 31 to 33 above.

In this figure host channel select push buttons 19*a*, 19*b*, 19*c* and 19*d* enables user selection of hosts 6*a*, 6*b*, 6*c* and 6*d* respectively to connect to both left display 2*a* and right display 2*b*. Optionally, push buttons 19*a*, 19*b*, 19*c* and 19*d* may be replaced by a rotary selector.

Push buttons may be omitted from the front panel design to increase system security by forcing the user to clear keyboard entries buffer prior to switching between channels.

In some embodiments of this configuration, selecting a host by any of push buttons 19*a*, 19*b*, 19*c* and 19*d* preferably also selects the same host to be connected to the other peripherals such as the keyboard, mouse, card reader and audio input/output.

Optional LED indicators 35*a*, 35*b*, 35*c* and 35*d* indicate the selected host channel and optionally KVM status (Tempered, not ready etc).

Bi-color LEDs may be used to indicate attached host status.

Card reader or dedicated peripheral port 44 located near the freeze switch 70. Dedicated peripheral port LED 41 located near the port jack 44 to indicate port status.

Front panel 97 may also have audio out jack 67 and audio freeze push button 72 and status LED.

Optional tamper evident label 51 located between the front panel surface and the enclosure cover to indicate possible tampering attempt.

Figure 35:
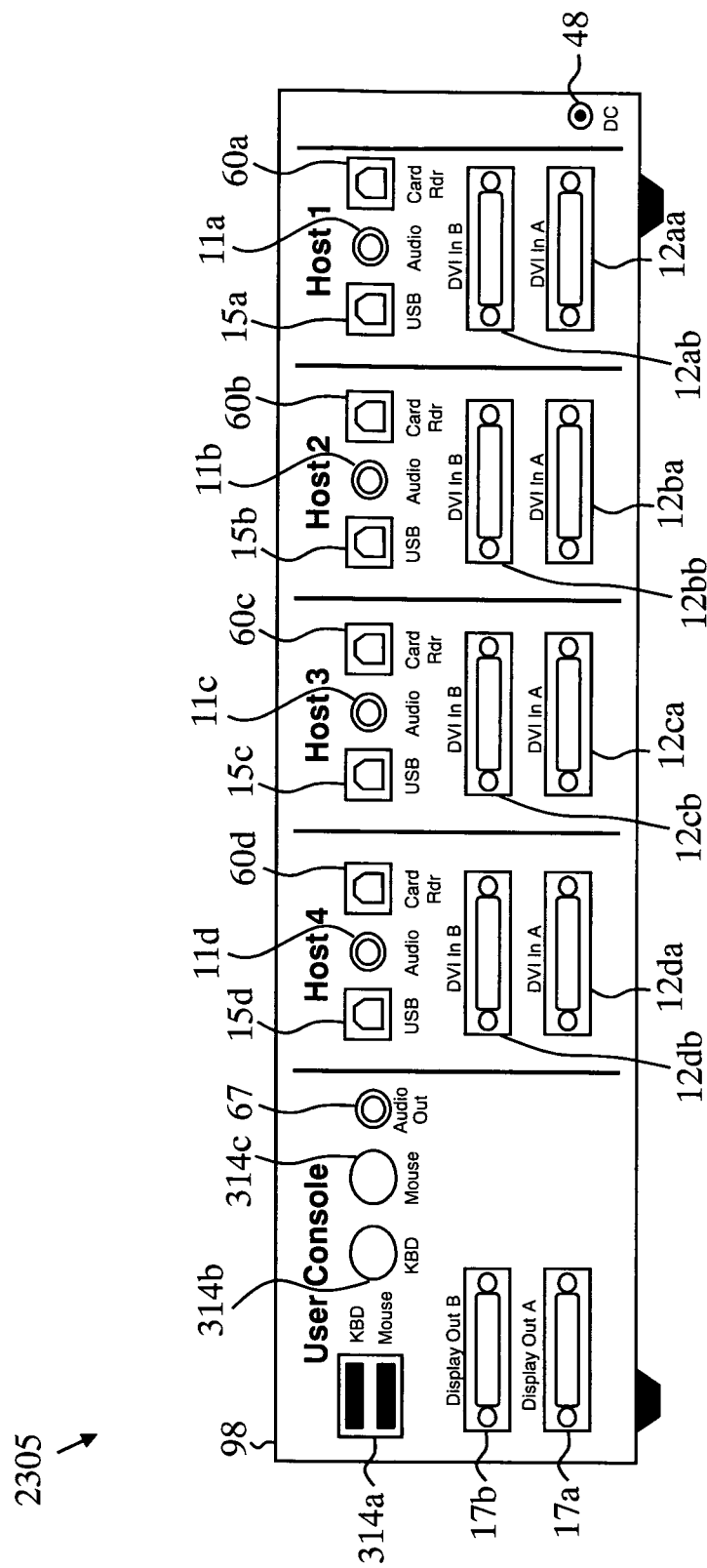
FIG. 35 illustrates a simplified diagram of the rear panel of the preferred embodiment of the present invention similar to the 4-host channels and dual-heads Secure KVM embodiment illustrated in FIGS. 31 to 33 above.

FIG. 35 illustrates a rear panel 96 of the 4-channel dual-head Secure KVM 2305 of the preferred embodiment shown in FIGS. 31 to 33 above.

In this figure host interfaces comprises of first host video ports 12*aa*, 12*ab*, 12*ac* and 12*ad*, second host video ports 12*ab*, 12*bb*, 12*cb* and 12*db*, audio input jacks 11*a*, 11*b*, 11*c* and 11*d*, optional card reader ports 60*a*, 60*b*, 60*c* and 60*d* are coupled to hosts 6*a*, 6*b*, 6*c* and 6*d* respectively through cables.

User console panel area comprises of:
keyboard and mouse stacked USB jacks comprises of:
USB keyboard jack 314*a* and
USB mouse jack 314*b*;
PS/2 keyboards jack 314*a*;
PS/2 mouse jack 314*b*;
audio out jack 67; and
two display video output ports 17*a* and 17*b*.

DC or AC power jack 48 also located at the rear panel.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

Figure 36:
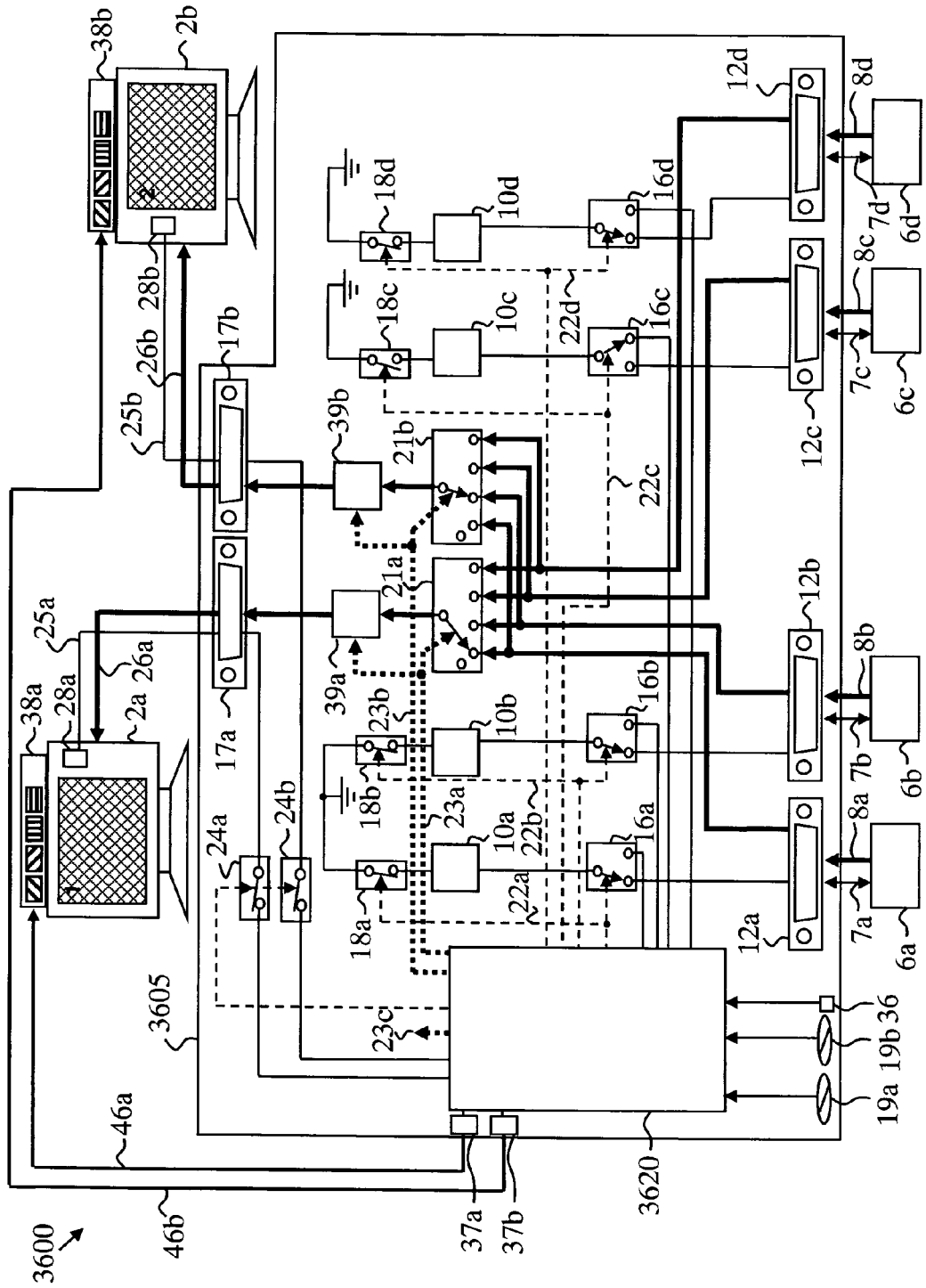
FIG. 36 illustrates a high-level block-diagram of a similar preferred embodiment of the present invention illustrated in FIGS. 31 to 33 above, having optional Display Mounted Channel Select Indicators and On Screen Display (OSD) generators.

FIG. 36 illustrates a high-level block-diagram of a similar preferred embodiment of the present invention illustrated in FIGS. 31 to 33 above having optional left and right Display Mounted Channel Select Indicators 38*a* and 38*b* respectively and left and right OSD generators 39*a* and 39*b* respectively.

User situation awareness is one of the most challenging aspects of Secure KVM deployment. There is a constant risk that the user will operate in the wrong environment. One particular security threat scenario is that attacker will use low-security computer to emulate a higher security screen in an attempt to fool the user. For example—a full screen web page that looks like a secret environment logon screen may temporarily confuse the user that may inadvertently use that page in an attempt to logon into the secret environment. Therefore there is a need to provide a clear visual indication to the user what network is currently showed on the particular display. This clear visual indication becoming more critical in multiple displays KVM where the number of options may increase user confusion.

One preferred option to increase user situation awareness is by adding On Screen Display (OSD) of the selected channel number or pre-programmed network name. In this preferred embodiment of the present invention the left and right Video output signals from the right and left video switch or multiplexer 21a and 21b are passed trough the left and right On Screen Display (OSD) generators 39a and 39b respectively. OSD generators 39a and 39b overlays a colored frame, channel number or text on their respective video output based on left and right KVM channel select line/s 23a and 23b respectively. Left and right OSD generator image 39a and 39b is visible to the user on left and right user displays 2a and 2b respectively.

Another preferred option to increase user situation awareness is by adding left and right Display Mounted Channel Select Indicators 38a and 38b coupled to the controller function 1620 through cables 46a and 46b and connectors 37a and 37b respectively. Controller 1620 is coupled to the left and right Display Mounted Channel Select Indicators 38a and 38b to light a specific colored sign with the network color or name.

The interface protocol between the controller function 1620 and the Display Mounted Channel Select Indicators 38a and 38b may be serial protocol such as RS-232 or $I^2C$ or parallel with discrete or encoded address selection. The internal structure of the Display Mounted Channel Select Indicator is shown in the next FIG. 37

Power to the Display Mounted Channel Select Indicators 38 may be provided by the secure KVM device 1605 or by external power supply.

Figure 37:
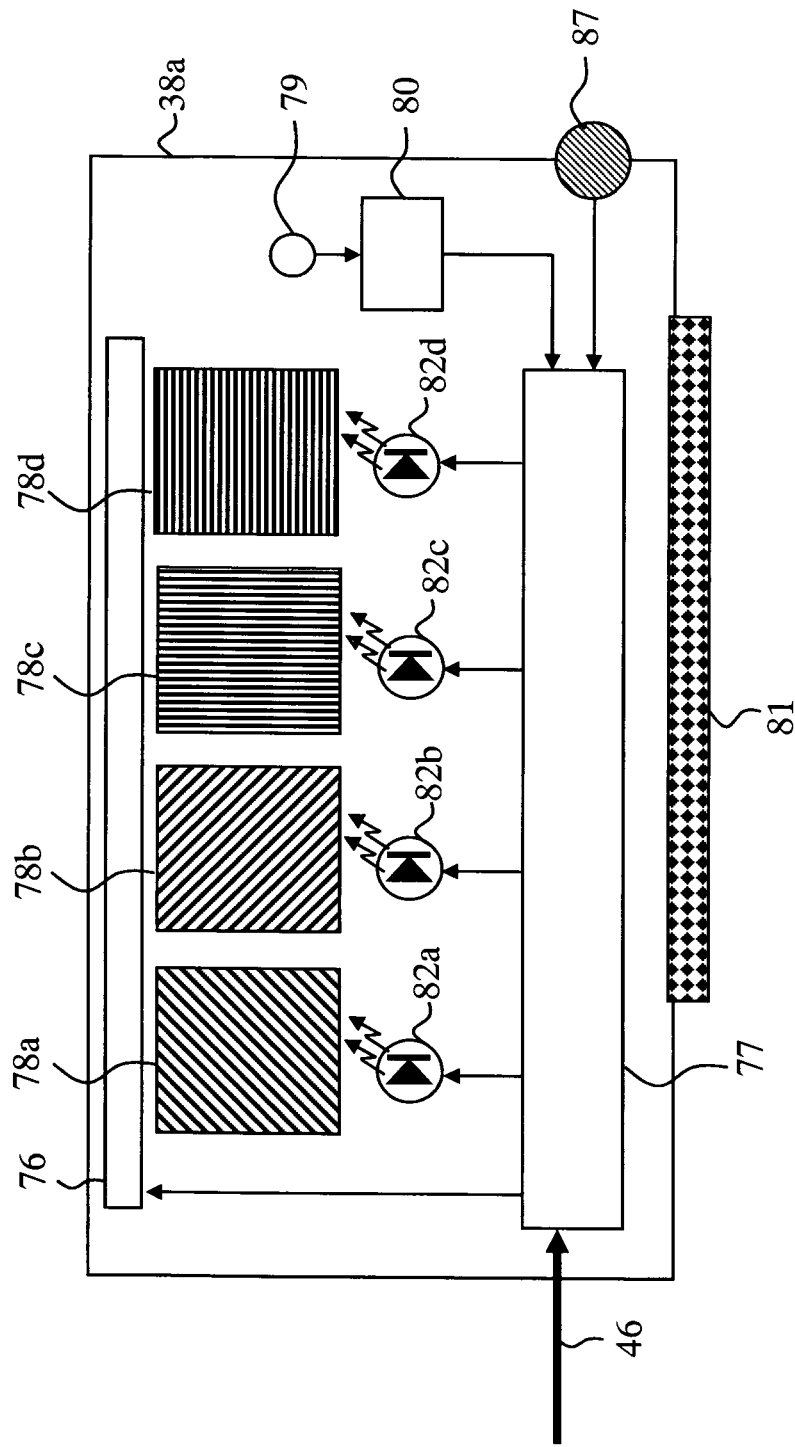
FIG. 37 illustrates a high-level block-diagram of the optional Display Mounted Channel Select Indicator of the referred embodiment of the present invention.

FIG. 37 illustrates a high-level block-diagram of the optional Display Mounted Channel Select Indicator 38 illustrated in FIG. 36 above of the referred embodiment of the present invention.

Display Mounted Channel Select Indicator 38 comprising of cable 46 to enable remote connection to the secure KVM device. Cable 46 may be used to deliver power from the secure KVM to the Display Mounted Channel Select Indicator 38. Controller 77 get channel selection information from secure KVM controller function through serial or parallel protocol and drives the four indicator lights 82a to 82d accordingly. Lights 82 may be lamps or LEDs coupled with a colored filter 78. Colored LEDs may be used to generate basic colors like red, amber, green, blue and white without colored filter 78. White LEDs 82 may be used with colored filters 78 to generate other selectable colors. Tri-color LEDs may be used as indicators 82 to enable controller defined colors. In tri-color LEDs implementation the controller 77 may drive the four LEDs 82 three colors to generate required color mix and thus generating required colors. A single tri-color LED may be used instead of four discrete LEDs to generate color mix based on secure KVM selected channel pre-programmed color. Optional ambient light sensor 79 may be used with analog to digital converter 80 to provide ambient light information to the controller 77. Ambient light information may be used by controller 77 to provide automatic dimming function enable automatic adaptation of indicator lights 82 based on room ambient light conditions.

Optional LCD panel 76 may be used in front of the colored indicators wherein lights 82 serves as back-light to allow monochrome LCD to display channel text or number while background show channel color. Optional LCD panel 76 is driven by controller 77.

LCD panel 76 may be useful to enable remote installation of KVM in an area not visible to the user and/or to simplify KVM front panel interaction and complexity.

One or more optional rotary encoders 87 may be used to enable remote user selection of variety of operational options such as user selection of hosts (for each one of the attached displays), user selection of host to interact with, user selection of host for smart card reader and for audio etc. In this case, unidirectional line 46 is replaced with a bi-directional cable. Optionally, this configuration replaces the selection switches on front panes. Alternatively, front panel or dimply mounted switched have priority to override selection made by the other. Optionally, selection switches are momentary switches and last selection takes affect. Preferably, indicators on both front panel (if present) are updated to indicate the current selection.

Mounting bracket, Velcro tape or adhesive tape 81 may be used to enable removable installation on top or sides of the user display 2.

It should be noted that secure KVM according to the current invention may optionally be connected in series (cascaded) to increase the number of hosts that may be interfaced with a set of display(s) and peripherals.

A specifically cascadeable exemplary embodiment is presented in the flowing figure.

Figure 38:
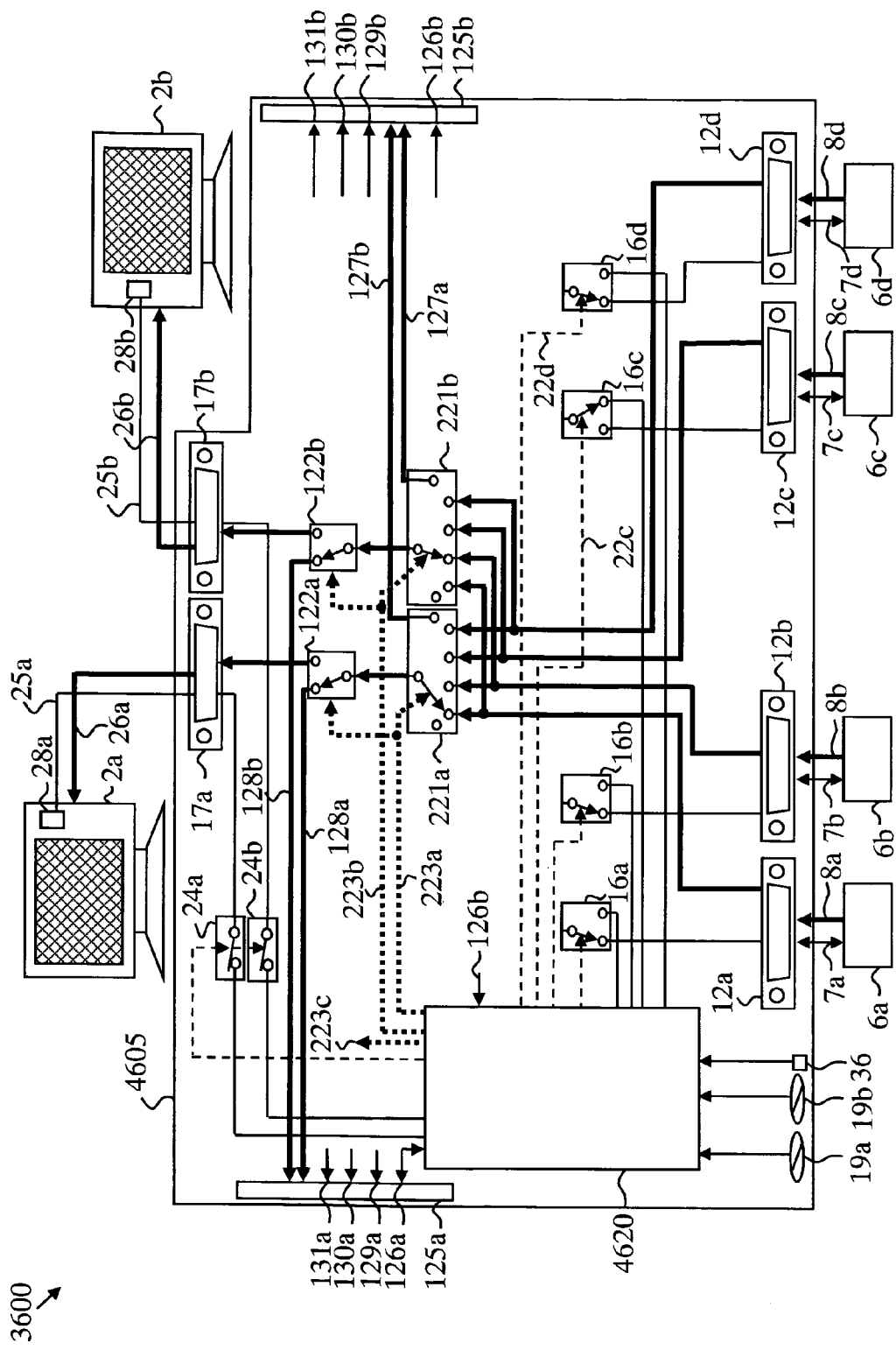
FIG. 38 illustrates a high-level block-diagram of a similar preferred embodiment of the present invention illustrated in FIGS. 31 to 33 above, having optional cascading ports to enable up to four chained KVMs to share same user peripherals.

FIG. 38 illustrates a high-level block-diagram of a similar preferred embodiment of the present invention illustrated in FIGS. 31 to 33 above having optional cascading ports to enable up to four chained KVMs to share same user peripherals.

In this figure the DPPEM 10 and the DPPEM write protection switches 18 were removed for clarity.

Cascading connectors 125a and 125b enable secure KVM 4605 chaining through interconnect cables (not shown here). Secure KVM 4605 allows identical Secure KVMs to be interconnected from left and right side to extend the number of attached hosts to up to 16. Controller function 4620 interfaces with the neighboring secure KVM on the left side through serial bus 126a and with the neighboring secure KVM on the right side through serial bus 126b. Controller function interfacing enables the left secured most KVM in the chain to become the master and all other to become slaves. Only master KVM is capable of interfacing with displays 2a and 2b through output ports 17a and 17b. Slave secure KVM 4605 are having video output ports 17 and user peripheral ports disabled.

The following text describes video cascading, similar method may be implemented to cascade peripherals through lines 129a and 129b, audio out through lines 130a and 130b, dedicated peripheral port through lines 131a and 131b etc.

Controller function 4620 drives the extended left video selection switch 221a through extended KVM channel select lines 223a. Extended left video selection switch 221a is similar to switch 21a of FIGS. 31 to 33 above but with additional $6^{th}$ position for cascading. Extended KVM channel select lines 223a are similar to KVM channel select lines 23 of FIGS. 31 to 33 above but with line to indicate that host selected is local or cascaded. If host selected is local then left video selection switch 221a can access the 5 left position. If host selected by user is cascaded then left video selection switch 221a positioned to cascaded ($6^{th}$) position to couple video to cascading connectors 125a and 125b.

Video cascading switches 122a and 122b enables video signals to be routed through the secure KVM as required for cascading by using commands from extended KVM channel select lines 223a and 224b respectively.

For example if $10^{th}$ host was selected by the user for the left display 2a and $7^{th}$ host was selected by the user for the right display then:

Left most secure KVM (Master—both cascaded)
  Left video selection switch 221a is positioned in cascading position as selected host is not local but in one of the slave secure KVMs.
  Left video cascading switch 122a is positioned in right position to feed video signals to the left display 2a attached to the Master secure KVM.
  Right video selection switch 221b is positioned in cascading position as selected host is not local but in one of the slave secure KVMs.
  Right video cascading switch 122b is positioned in right position to feed video signals to the right display 2b attached to the Master secure KVM.
Second cascaded secure KVM (Slave—right local)
  Left video selection switch 221a is positioned in cascading position as selected host is not local but in one of the next slave secure KVMs.
  Left video cascading switch 122a is positioned in left position to disable local left display output port 17a and to bridge video signal between left cascading connector 125a left video line 128a and right cascading connector 128b left video signal 128b to bypass that secure KVM.
  Right video selection switch 221b is positioned in third local position as selected host the third local host 6c.
  Right video cascading switch 122b is positioned in left position to disable local right display output port 17b and to deliver third host 6c video signals through right video cascading switch 122b into left cascading connector 125a right video line 128b
Third cascaded secure KVM (Slave—left local)
  Left video selection switch 221a is positioned in second local position as selected host the second local host 6b.
  Left video cascading switch 122a is positioned in left position to disable local left display output port 17a and to deliver second host 6b video signals through left video cascading switch 122a into left cascading connector 125a left video line 128a
  Right video selection switch 221b is positioned in cascading position as selected host is not local.
  Right video cascading switch 122b is positioned in left position to disable local right display output port 17b.
Fourth cascaded secure KVM (Slave—non selected)
  Left video selection switch 221a is positioned in cascading position as selected host is not local.
  Left video cascading switch 122a is positioned in left position to disable local left display output port 17a.
  Right video selection switch 221b is positioned in cascading position as selected host is not local.
  Right video cascading switch 122b is positioned in left position to disable local right display output port 17b.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for interacting with a plurality of host computers while maintaining isolation of the plurality of host computers, the method comprising:
   providing a secure Keyboard Video Mouse (KVM) device;
   connecting at least a first user display, a user keyboard and a user mouse to the secure KVM device;
   assigning a Display Plug and Play Emulated Memory (DPPEM) device within the secure KVM for each of the plurality of host computers;
   performing a preparation sequence comprising the steps of:
     a) reading display Plug and Play data from the first user display by a controller function in the secure KVM device;
     b) switching the DPPEM device in the secure KVM device to connect to said controller function;
     c) writing display Plug and Play data into said DPPEM device by said controller function;
     d) switching said DPPEM device from said controller function to a corresponding one of the plurality of host computers to which said DPPEM device was assigned, to enable the assigned host computer reading of said written display Plug and Play data from said DPPEM devices;
   entering normal mode, wherein said normal mode comprises the step of:
     e) waiting for user selection of a host channel;
     coupling a selected host computer to said first user display, said user keyboard, and said user mouse when said user selection is detected;
     returning to step e),
   f) checking by said controller function to determine if a user selected DPPEM device coupled to the user selected host computer is programmed with a user selected display Plug and Play data:
     A) if said user selected DPPEM device is not programmed with the user selected display Plug and Play data, then said controller function performs the next five steps i) to v), and
     B) if said user selected DPPEM device is programmed with the user selected display Plug and Play data, then said controller function skips the next five steps i) to v);
     i) switching the user selected DPPEM device from a corresponding one of the plurality of host computers to said controller function;
     ii) disabling write protection in said user selected DPPEM device;
     iii) writing the user selected display Plug and Play data into said user selected DPPEM device;
     iv) write protecting the user selected DPPEM device;
     v) switching the user selected DPPEM device from said controller function back to the user selected host computer;
   wherein mutual isolation of each of the plurality of host computers is maintained at all times.

2. A method for interacting with a plurality of host computers while maintaining isolation of the plurality of host computers, the method comprising:
- providing a secure Keyboard Video Mouse (KVM) device;
- connecting at least a first user display and a second display, a user keyboard and a user mouse to said secure KVM device;
- connecting the plurality of host computers to said secure KVM device;
- assigning a first and a second Display Plug and Play Emulated Memory (DPPEM) device within the secure KVM for each of said plurality of host computers;
- performing a system preparation sequence comprising the steps of:
  - a) reading first display Plug and Play data from said first user display by a controller function within said secure KVM device;
  - b) reading second display Plug and Play data from said second user display by said controller function;
  - c) switching said first and second DPPEM device in the secure KVM device to connect to said controller function;
  - d) writing said first display Plug and Play data into each of said first DPPEM device of a corresponding host video port;
  - e) writing said second display Plug and Play data into said second DPPEM device of the corresponding host video port;
  - f) switching said first and second DPPEM devices from said controller function to said corresponding host video port to enable a corresponding one of the plurality of host computers to read said written display Plug and Play data;
- entering normal mode comprising repeating the steps of:
  - g) waiting for user selection of one of said plurality of host computers to be coupled to said first user display or said second user display;
  - h) when detecting a user selection, coupling the selected one of said plurality of host computer to the DPPEM devices of the selected host computer, and to a selected user display;
- returning to step g),
- f) checking by said controller function to determine if a user selected DPPEM device coupled to the user selected host computer is programmed with a user selected display Plug and Play data:
  - A) if said user selected DPPEM device is not programmed with the user selected display Plug and Play data, then said controller function performs the next five steps i) to v), and
  - B) if said user selected DPPEM device is programmed with the user selected display Plug and Play data, then said controller function skips the next five steps i) to v);
    - i) switching the user selected DPPEM device from a corresponding one of the plurality of host computers to said controller function;
    - ii) disabling write protection in said user selected DPPEM device;
    - iii) writing the user selected display Plug and Play data into said user selected DPPEM device;
    - iv) write protecting the user selected DPPEM device;
    - v) switching the user selected DPPEM device from said controller function back to the user selected host computer;

wherein mutual isolation of each of the plurality of host computers is maintained at all times.

3. A method for coupling n host computers to m user displays, while maintaining isolation of the n host computers comprising:
- providing a secure Keyboard Video Mouse (KVM) device and performing the following steps;
  - a) connecting the secure KVM device to m user displays, n host computers, a user keyboard and a user mouse;
  - b) reading m display Plug and Play data from one of said m user displays by a controller function within the secure KVM device;
  - c) repeating step b) until said controller function has completed reading all of the m display Plug and Play data from all of the m displays;
  - d) switching n DPPEM devices within said secure KVM device to said controller function;
  - e) disabling write protection in said n DPPEM devices;
  - f) writing display Plug and Play data into one of said n DPPEM devices;
  - g) repeating step f) until said controller function has completed writing display Plug and Play data into all of the n DPPEM devices;
  - h) enabling write protection in all said n DPPEM devices;
  - i) switching said n DPPEM devices to said m host computers;
  - j) receiving user selection of a selected host computer to be coupled to a selectable display;
  - k) checking by said controller function to determine if one of the n DPPEM device coupled to the user selected host computer is programmed with a user selected display Plug and Play data:
    - A) if said one of the n DPPEM devices is not programmed with the user selected display Plug and Play data, then said controller function performs the next five steps i) to v), and
    - B) if said one of the n DPPEM devices is programmed with the user selected display Plug and Play data, then said controller function skips the next five steps i) to v);
      - i) switching a user selected DPPEM device from a corresponding one of the n host computers to said controller function;
      - ii) disabling write protection in said a user selected DPPEM device;
      - iii) writing the user selected display Plug and Play data into said user selected DPPEM device;
      - iv) write protecting the user selected DPPEM device;
      - v) switching the user selected DPPEM device from said controller function back to the user selected host computer;
  - l) switching the user selected display to the user selected host computer;
  - m) receiving user selection of an active display to enable a corresponding host coupled to said user selected active display to interact with said user mouse and said user keyboard;
  - n) switching said user mouse and said user keyboard to said user selected host computer;
  - and, o) returning to step j), wherein mutual isolation of each of the plurality of host computers is maintained at all times.

4. The method of claim 3, wherein each of said DPPEM devices is coupled to a mode select switch logic to enable selection between at least
- one of the host computers and a switching matrix within said secure KVM device;
- or said or said controller function mode select.

5. The method of claim 4, wherein said mode select switch logic for all said DPPEM devices are electrically tied together to assure synchronous operation.

6. The method of claim 4, wherein each of said DPPEM devices is write protected when the DPPEM devices switched to one of: said host computers or said switching matrix.

7. The method of claim 6, wherein each of said DPPEM devices is further write-protected when said controller function is reading said display plug and play data from any one of said m user displays.

8. The method of claim 6, wherein circuitry in said secure KVM assures that when a DPPEM device is switched to any one of said n host computers the DPPEM device is write-protected and isolated from said controller function.

9. The method of claim 8, wherein said assurance is achieved through a single controller function output that controls said DPPEM mode select switch logic and write protection of said DPPEM devices.

10. The method of claim 3, wherein circuitry in said secure KVM electrically isolates said controller function from any of said m user displays when said controller function is writing said display Plug and Play data into said DPPEM devices.

11. The method of claim 10 wherein said electrical isolation of said m user displays is achieved by driving isolation circuitry from a single controller function output that controls said DPPEM mode select switch logic and write protection of said DPPEM devices.

12. The method of claim 10, wherein said electrical isolation of said display Plug and Play devices is achieved by driving isolation circuitry from a single controller function output that controls said DPPEM mode select switch logic and write protection of said DPPEM devices.

13. The method of claim 3, wherein all of said DPPEM devices are coupled to said controller function through a selector switch logic controlled by said controller function to enable all of the DPPEM devices to be coupled to a single controller function bus.

14. The method of claim 13, wherein said selector switch logic is controlled by a secure KVM channel selection lines that control video and peripheral channel selection.

15. The method of claim 3, wherein all of said DPPEM are coupled to said controller function through a single bus and wherein a DPPEM address is controlled by said controller function to enable addressed access to each of said DPPEM devices.

16. The method of claim 3, wherein while the secure KVM is performing said preparation sequence steps, video and peripheral switching are disabled.

17. The method of claim 3, wherein after said controller function reading of display Plug and Play data, and prior to writing said display Plug and Play data into one of said DPPEM devices, said controller function checks the validity of the data and stops if data was found invalid.

18. A secure Keyboard Video Mouse (KVM) device for supporting n mutually isolated host computers, m user displays, a keyboard, and a mouse, the KVM device comprising:
  a controller function;
  m×n Display Plug and Play Emulated Memory (DPPEM) devices, wherein m DPPEM devices are assigned to each one of n host computers;
  a switching matrix configured to enable connection of said m DPPEM devices to each one of the n host computers; and
  a circuitry configured to switch said m×n DPPEM devices from said controller function to the switching matrix,
  wherein the secure KVM device is configured to:
  a) reading display Plug and Play data from a first display by said controller function;
  b) repeat step a) until said controller function has completed reading all m displays Plug and Play data from all said m user displays;
  c) switch all said m×n DPPEM devices from said switching matrix to said controller function;
  d) disable write protection of said m×n DPPEM devices;
  e) write first display Plug and Play data into a corresponding one of said m DPPEM device assigned to a first host computer;
  f) repeat step e) for other one of said display Plug and Play data until writing all the m display DPPEM devices associated with the first host computer, each with data associated with a corresponding display;
  g) repeat steps e) and f) for all of the m DPPEM devices associated with the n host computers;
  h) enable all m DPPEM devices write protection;
  i) switch all said m DPPEM devices to said switching matrix;
  j) switch a first display to a first user selected host computer;
  k) switch said switching matrix to connect the first user selected host computer to a first DPPEM device;
  l) repeat step j) and k) for all of said m displays; and,
  L1) checking by said controller function to determine if a user selected DPPEM device coupled to a user selected host computer is programmed with a user selected display Plug and Play data:
    A) if said user selected DPPEM device is not programmed with the user selected display Plug and Play data, then said controller function performs the next five steps i) to v), and
    B) if said user selected DPPEM device is programmed with the user selected display Plug and Play data, then said controller function skips the next five steps i) to v);
    i) switching the user selected DPPEM device from a corresponding one of n host computers to said controller function;
    ii) disabling write protection in said user selected DPPEM device;
    iii) writing the user selected display Plug and Play data into said user selected DPPEM device;
    iv) write protecting the user selected DPPEM device;
    v) switching the user selected DPPEM device from said controller function back to the user selected host computer;
  m) switch a user peripheral devices to the first user selected host computer, wherein mutual isolation of each of the host computers is maintained at all times.

19. A secure Keyboard Video Mouse (KVM) device for supporting n mutually isolated host computers, m user displays, a keyboard, and a mouse, the KVM device comprising:
  a controller function;
  m×n Display Plug and Play Emulated Memory (DPPEM) devices, wherein m DPPEM devices are assigned to each one of the n host computers;
  a switching matrix configured to enable connecting said m×n DPPEM devices to each one of the n host computers; and a circuitry configured to switch switching said m×n DPPEM devices from said controller function to said switching matrix, wherein said secure KVM device is configured to:
  read m display Plug and Play data from said m user displays by the said controller function;
  write by said controller function said m display Plug and Play data, each into a corresponding DPPEM device associated with one of said n host computers while said corresponding DPPEM device is write enabled;
  switch all said DPPEM devices to said switching matrix and isolating said switching matrix from said controller function;
  enable write protection of all of said DPPEM devices;
  receive user selection desired coupling of host computers to corresponding user selected displays;
  switch said switching matrix to connect each user selected coupled host computers to the corresponding user selected display, and each of said user selected host computers to a DPPEM device assigned to said each user selected host computers which has been written with said display Plug and Play data of the corresponding user selected display; and
L1) checking by said controller function to determine if a user selected DPPEM device coupled to a user selected host computer is programmed with a user selected display Plug and Play data:
  A) if said user selected DPPEM device is not programmed with the user selected display Plug and Play data, then said controller function performs the next five steps i) to v), and
  B) if said user selected DPPEM device is programmed with the user selected display Plug and Play data, then said controller function skips the next five steps i) to v);
  i) switching the user selected DPPEM device from a corresponding one of n host computers to said controller function;
  ii) disabling write protection in said user selected DPPEM device;
  iii) writing the user selected display Plug and Play data into said user selected DPPEM device;
  iv) write protecting the user selected DPPEM device;
  v) switching the user selected DPPEM device from said controller function back to the user selected host computer;
  switch user peripheral devices to the user selected host computers, wherein mutual isolation of each of the host computers is maintained at all times.

\* \* \* \* \*